United States Patent
Wu et al.

(10) Patent No.: US 12,489,576 B2
(45) Date of Patent: Dec. 2, 2025

(54) UPLINK REFERENCE SIGNAL SENDING METHOD, UPLINK REFERENCE SIGNAL RECEIVING METHOD, AND COMMUNICATION APPARATUS

(71) Applicant: HUAWEI TECHNOLOGIES CO., LTD., Shenzhen (CN)

(72) Inventors: Ye Wu, Shenzhen (CN); Liuliu Ji, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 446 days.

(21) Appl. No.: 18/053,356

(22) Filed: Nov. 7, 2022

(65) Prior Publication Data
US 2023/0078895 A1 Mar. 16, 2023

Related U.S. Application Data

(63) Continuation of application No. PCT/CN2020/088690, filed on May 6, 2020.

(51) Int. Cl.
H04L 5/00 (2006.01)

(52) U.S. Cl.
CPC .................. H04L 5/0048 (2013.01)

(58) Field of Classification Search
None
See application file for complete search history.

(56) References Cited

U.S. PATENT DOCUMENTS

| | | | |
|---|---|---|---|
| 2012/0140851 A1* | 6/2012 | Zhang | H04L 25/0222 375/296 |
| 2017/0373809 A1 | 12/2017 | Kim et al. | |
| 2019/0109679 A1 | 4/2019 | Liu et al. | |
| 2019/0356364 A1 | 11/2019 | Maamari et al. | |
| 2020/0106647 A1* | 4/2020 | Chen | H04W 72/04 |
| 2020/0195330 A1* | 6/2020 | Huang | H04L 5/0094 |
| 2021/0152307 A1* | 5/2021 | Takeda | H04L 25/0224 |

(Continued)

FOREIGN PATENT DOCUMENTS

| | | |
|---|---|---|
| CN | 102244557 A | 11/2011 |
| CN | 108282207 A | 7/2018 |
| CN | 108809578 A | 11/2018 |

(Continued)

OTHER PUBLICATIONS

Qualcomm Incorporated, Maintenance for Non-Codebook Based UL Transmission. 3GPP TSG RAN WG1 Meeting #92bis, Apr. 16-20, 2018, Sanya, China, R1-1804784, 4 pages.

*Primary Examiner* — Maharishi V Khirodhar

(57) ABSTRACT

This application provides a method including: determining, according to a resource allocation rule, downlink reference signal resources corresponding to a plurality of first resources used to carry an uplink reference signal in a plurality of uplink reference signal resources, where each uplink reference signal resource includes one or more first resources; determining, based on the downlink reference signal resource corresponding to each first resource, a precoding matrix corresponding to each first resource; and then sending a precoded uplink reference signal, where the precoded uplink reference signal is obtained by precoding the uplink reference signal based on the precoding matrix corresponding to each first resource.

18 Claims, 22 Drawing Sheets

(56) References Cited

U.S. PATENT DOCUMENTS

2021/0337568 A1* 10/2021 Xu .................... H04W 72/0453
2023/0163913 A1* 5/2023 Manolakos ........... H04L 5/0094
  370/329

FOREIGN PATENT DOCUMENTS

| CN | 111082905 A | 4/2020 | | |
|---|---|---|---|---|
| EP | 3598676 A1 | 1/2020 | | |
| WO | WO-2020019317 A1 * | 1/2020 | ............. | H04B 7/024 |

* cited by examiner

UPLINK REFERENCE SIGNAL SENDING METHOD, UPLINK REFERENCE SIGNAL RECEIVING METHOD, AND COMMUNICATION APPARATUS

CROSS-REFERENCE TO RELATED APPLICATIONS

This application is a continuation of International Application No. PCT/CN2020/088690, filed on May 6, 2020, the disclosure of which is hereby incorporated by reference in its entirety.

BACKGROUND

Multi-user multiple-input multiple-output (MU-MIMO) can support communication between a network device and a plurality of terminal devices. To improve uplink transmission performance, the terminal device may cancel interference through precoding. To improve transmission performance, the terminal device may select, in a manner such as precoder cycling or random precoding selection, a precoding matrix used for uplink data transmission.

Uplink transmission of the terminal device may be usually scheduled by the network device. The network device makes a decision for uplink scheduling based on a measurement result of an uplink channel. The terminal device may send an uplink reference signal, for example, a sounding reference signal (SRS), to the network device, so that the network device measures the uplink channel. Therefore, a technical problem to be resolved is how to configure the uplink reference signal to obtain an accurate measurement result of the uplink channel, so that the network device makes an appropriate decision for uplink scheduling.

SUMMARY

This application provides an uplink reference signal sending method, an uplink reference signal receiving method, and a communication apparatus, to appropriately configure an uplink reference signal to obtain an accurate measurement result of an uplink channel.

According to a first aspect, an uplink reference signal sending method is provided. The method may be performed by a terminal device, or may be performed by a component (such as a circuit, a chip, or a chip system) disposed in the terminal device. This is not limited in this application.

Specifically, the method includes: determining, according to a resource allocation rule, downlink reference signal resources corresponding to a plurality of first resources used to carry an uplink reference signal in a plurality of uplink reference signal resources, where each uplink reference signal resource includes one or more first resources, a time domain or frequency domain size of the first resource is determined based on a first precoding granularity, and the first precoding granularity indicates a time domain or frequency domain size of contiguous resources corresponding to a same precoding matrix in one uplink reference signal resource; determining, based on the downlink reference signal resource corresponding to each first resource, a precoding matrix corresponding to each first resource; and sending a precoded uplink reference signal, where the precoded uplink reference signal is obtained by precoding the uplink reference signal based on the precoding matrix corresponding to each first resource.

The resource allocation rule may be a rule that may be used to determine a correspondence between a first resource in a time-frequency resource used to transmit an uplink reference signal and a downlink reference signal resource. Based on different dimensions, the resource allocation rule may be used to determine a correspondence between the first resource and the downlink reference signal resource in frequency domain or a correspondence between the first resource and the downlink reference signal resource in time domain. Correspondingly, the resource allocation rule includes a frequency domain resource allocation rule and a time domain resource allocation rule. This application includes but is not limited to what is described herein.

Optionally, the resource allocation rule includes a frequency domain resource allocation rule, and the frequency domain resource allocation rule is used to determine a correspondence between a plurality of frequency division multiplexed first resources and downlink reference signal resources. The resource allocation rule includes a time domain resource allocation rule, and the time domain resource allocation rule is used to determine a correspondence between a plurality of time division multiplexed first resources and downlink reference signal resources.

In an implementation, the method further includes: receiving indication information of the resource allocation rule. To be specific, the resource allocation rule may be indicated by a network device. In another implementation, the resource allocation rule is predefined, for example, predefined in a protocol. This is not limited in this application.

The first precoding granularity may be understood as a granularity based on which the terminal device precodes an uplink reference signal. The first precoding granularity may be less than or equal to one uplink reference signal resource. In other words, one uplink reference signal resource may include one or more first resources.

In an implementation, the method further includes: receiving indication information of the first precoding granularity. To be specific, the first precoding granularity may be configured by the network device. In another implementation, the first precoding granularity is predefined, for example, predefined in a protocol. This is not limited in this application.

Based on the foregoing technical solution, the terminal device may predetermine the downlink reference signal resources corresponding to the plurality of first resources in the uplink reference signal resources, determine a correspondence between the precoding matrix and the first resource, and then precode, based on the correspondence between the precoding matrix and the first resource, an uplink reference signal carried on the uplink reference signal resource, so that subsequently transmitted precoded uplink reference signals have different arrangement manners. Because the precoded uplink reference signal transmitted based on the method in this embodiment of this application is precoded based on the first precoding granularity, the precoding matrix used for the uplink reference signal no longer depends on a granularity of the uplink reference signal resource, and more possible arrangement manners of precoding matrices for the uplink reference signal resource may be obtained based on the first precoding granularity. To be specific, a granularity based on which the uplink reference signal is precoded is decoupled from a size of the uplink reference signal resource, to obtain a larger quantity of more flexible configurations of the uplink reference signal resource. This helps the network device obtain an accurate channel measurement result, and perform appropriate scheduling for subsequent uplink data transmission.

With reference to the first aspect, in some possible implementations of the first aspect, the method further includes: determining a plurality of precoding matrices used for uplink reference signal transmission, where the plurality of precoding matrices are determined based on measurement of a plurality of downlink reference signal resources, and the plurality of downlink reference signal resources correspond to the plurality of uplink reference signal resources; and the determining a precoding matrix corresponding to each first resource includes: determining, based on the plurality of precoding matrices, the precoding matrix corresponding to each first resource.

In other words, the terminal device may perform measurement based on the plurality of downlink reference signal resources corresponding to the plurality of uplink reference signal resources, to determine the plurality of precoding matrices used for uplink reference signal transmission. For each first resource in the uplink reference signal resource, one or more of the plurality of precoding matrices may be further determined to precode the uplink reference signal.

With reference to the first aspect, in some possible implementations of the first aspect, the determining, based on the plurality of precoding matrices, the precoding matrix corresponding to each first resource includes: determining, based on a precoding selection rule and the plurality of precoding matrices, the precoding matrix corresponding to each first resource.

In other words, the terminal device may voluntarily determine, from the plurality of precoding matrices, the precoding matrix corresponding to each first resource. The precoding selection rule is a rule according to which each first resource is determined. When each first resource corresponds to a plurality of precoding matrices, the terminal device may determine, according to the precoding selection rule, the precoding matrices corresponding to each first resource.

By way of example but not limitation, the precoding selection rule includes: precoder cycling, random selection, or throughput maximization. This application includes but is not limited to what is described herein.

In an implementation, the method further includes: receiving indication information of the precoding selection rule. To be specific, the precoding selection rule is indicated by the network device. In another implementation, the precoding selection rule is predefined, for example, predefined in a protocol. This is not limited in this application.

With reference to the first aspect, in some possible implementations of the first aspect, the method further includes: receiving first indication information, where the first indication information is used to indicate a correspondence between the plurality of uplink reference signal resources and the plurality of downlink reference signal resources.

To be specific, the correspondence between the plurality of uplink reference signal resources and the plurality of downlink reference signal resources may be indicated by the network device by using the first indication information.

With reference to the first aspect, in some possible implementations of the first aspect, each of the plurality of downlink reference signal resources corresponds to at least one of the plurality of uplink reference signal resources, each of the at least one uplink reference signal resource corresponds to one or more of the plurality of precoding matrices, and the precoding matrix corresponding to each uplink reference signal resource is obtained based on measurement of the corresponding downlink reference signal resource.

Each downlink reference signal resource may correspond to one or more uplink reference signal resources. A same uplink reference signal resource may correspond to one or more downlink reference signal resources. The precoding matrix corresponding to each uplink reference signal resource may be obtained based on measurement of one or more downlink reference signal resources corresponding to the uplink reference signal resource.

In a possible design, the precoding matrix corresponding to each uplink reference signal resource is obtained based on measurement of one corresponding downlink reference signal resource.

That is, each uplink reference signal resource corresponds to one downlink reference signal resource. One or more precoding matrices may be obtained based on measurement of one downlink reference signal resource. The one or more precoding matrices may be used to precode an uplink reference signal on an uplink reference signal resource corresponding to the downlink reference signal resource.

With reference to the first aspect, in some possible implementations of the first aspect, the downlink reference signal resource is a non-zero power channel state information reference signal (NZP CSI-RS) resource, and the uplink reference signal resource is a sounding reference signal (SRS) resource.

In a possible design, at least one SRS resource corresponding to each of a plurality of NZP CSI-RS resources is included in one SRS resource set.

One or more uplink reference signal resources corresponding to a same downlink reference signal resource may be referred to as one uplink reference signal resource set. One downlink reference signal resource corresponds to one uplink reference signal resource set, so that one downlink reference signal resource corresponds to one or more uplink reference signal resources in one uplink reference signal resource set.

It should be understood that the correspondence between one downlink reference signal resource and one uplink reference signal resource set is merely a possible implementation, and should not constitute any limitation on this application.

It should be understood that the NZP CSI-RS resource used as an example of the downlink reference signal resource and the SRS resource used as an example of the uplink reference signal resource are merely examples, and should not constitute any limitation on this application. The downlink reference signal resource and the uplink reference signal resource are not limited in this application.

With reference to the first aspect, in some possible implementations of the first aspect, the method further includes: receiving second indication information, where the second indication information is used to indicate one or more SRS resources in each of a plurality of SRS resource sets, and a precoding matrix corresponding to the one or more SRS resources is a precoding matrix used for uplink data transmission.

The network device may determine, based on measurement of the uplink reference signal resource, a precoding matrix used for subsequent uplink data transmission. It can be learned from the foregoing correspondence between the first resource and the precoding matrix and the foregoing relationship between the first resource and the uplink reference signal resource that, there is a correspondence between each SRS resource and the precoding matrix. Therefore, the network device indicates the SRS resource by using the second indication information, that is, indirectly indicates the precoding matrix selected for subsequent uplink data transmission.

With reference to the first aspect, in some possible implementations of the first aspect, the method further includes: determining, based on the SRS resource indicated by the second indication information and the precoding matrices corresponding to the plurality of first resources, precoding matrices corresponding to a plurality of second resources in an uplink transmission resource, where the uplink transmission resource is used to carry uplink data, a time domain or frequency domain size of each second resource is determined based on a second precoding granularity, and the second precoding granularity indicates a time domain or frequency domain size of contiguous resources corresponding to a same precoding matrix in the uplink transmission resource; and sending precoded uplink data, where the precoded uplink data is obtained by precoding the uplink data based on the precoding matrix corresponding to each second resource in the uplink transmission resource.

When sending the uplink reference signal, the terminal device has determined the precoding matrix corresponding to each first resource, that is, has determined the precoding matrix corresponding to each SRS resource. Therefore, the terminal device may determine, based on the SRS resource indicated by the second indication information, the precoding matrix used for uplink data transmission. The terminal device may further map, to the plurality of second resources based on a correspondence between the plurality of first resources and the plurality of precoding matrices, the precoding matrix selected for uplink transmission, so that a correspondence between the plurality of second resources and the plurality of precoding matrices corresponds to the correspondence between the plurality of first resources and the plurality of precoding matrices.

In other words, a correspondence between the plurality of second resources and the downlink reference signal resources may also be determined according to the foregoing resource allocation rule. The resource allocation rule followed for determining the correspondence between the plurality of second resources and the downlink reference signal resources is the same as the foregoing resource allocation rule followed for determining the correspondence between the plurality of first resources and the downlink reference signal resources.

Therefore, the precoding matrix corresponding to each second resource is determined based on measurement of the precoded uplink reference signal. In a design of the precoding matrices corresponding to the plurality of first resources used to carry the precoded uplink reference signal, different resource allocation that may be performed during subsequent uplink data transmission is considered, and a finer precoding granularity is defined for the uplink reference signal resource, to obtain a larger quantity of more flexible correspondences between uplink reference signal resources and precoding matrices. This helps the network device obtain an accurate channel measurement result, and perform appropriate scheduling for subsequent uplink data transmission.

With reference to the first aspect, in some possible implementations of the first aspect, the second indication information is further used to indicate a quantity of transport layers used for uplink data transmission, each of the one or more SRS resources in each SRS resource set corresponds to one transport layer, and the precoding matrix corresponding to each SRS resource is used for uplink data transmission at the corresponding transport layer.

Further, the second indication information is further used to indicate one or more demodulation reference signal (DMRS) ports corresponding to one or more transport layers, and the one or more transport layers are transport layers used for uplink data transmission.

The terminal device may establish a mapping relationship between the SRS resource indicated in the second indication information and the transport layer and the DMRS port that correspond to the SRS resource. Each SRS resource may be mapped to one transport layer, and corresponds to one DMRS port.

In an implementation, the method further includes: receiving indication information of the second precoding granularity. To be specific, the second precoding granularity is configured by the network device. In another implementation, the second precoding granularity is predefined, for example, predefined in a protocol. This is not limited in this application.

Optionally, the first precoding granularity is the same as the second precoding granularity. In this case, the indication information of the first precoding granularity and the indication information of the second precoding granularity may be a same piece of indication information.

Optionally, the first precoding granularity is different from the second precoding granularity.

According to a second aspect, an uplink reference signal receiving method is provided. The method may be performed by a network device, or may be performed by a component (such as a circuit, a chip, or a chip system) disposed in the network device. This is not limited in this application.

Specifically, the method includes: receiving a precoded uplink reference signal, where the precoded uplink reference signal is obtained by precoding an uplink reference signal based on a precoding matrix corresponding to each first resource, the first resource is a resource used to carry the uplink reference signal in a plurality of uplink reference signal resources, the precoding matrix corresponding to each first resource is determined based on measurement of a corresponding downlink reference signal resource, a downlink reference signal corresponding to each first resource is determined according to a resource allocation rule, a time domain or frequency domain size of the first resource is determined based on a first precoding granularity, and the first precoding granularity indicates a time domain or frequency domain size of contiguous resources corresponding to a same precoding matrix in one uplink reference signal resource; and determining, based on the precoded uplink reference signal, a precoding matrix used for uplink data transmission, where the precoding matrix used for uplink data transmission is at least a part of a plurality of precoding matrices.

The resource allocation rule may be a rule that may be used to determine a correspondence between a first resource in a time-frequency resource used to transmit an uplink reference signal and a downlink reference signal resource. Based on different dimensions, the resource allocation rule may be used to determine a correspondence between the first resource and the downlink reference signal resource in frequency domain or a correspondence between the first resource and the downlink reference signal resource in time domain. Correspondingly, the resource allocation rule includes a frequency domain resource allocation rule and a time domain resource allocation rule. This application includes but is not limited to what is described herein.

Optionally, the resource allocation rule includes a frequency domain resource allocation rule, and the frequency domain resource allocation rule is used to determine a correspondence between a plurality of frequency division multiplexed first resources and downlink reference signal resources. The resource allocation rule includes a time domain resource allocation rule, and the time domain resource allocation rule is used to determine a correspondence between a plurality of time division multiplexed first resources and downlink reference signal resources.

In an implementation, the method further includes: receiving indication information of the resource allocation rule. To be specific, the resource allocation rule may be indicated by the network device. In another implementation, the resource allocation rule is predefined, for example, predefined in a protocol. This is not limited in this application.

The first precoding granularity may be understood as a granularity based on which a terminal device precodes an uplink reference signal. The first precoding granularity may be less than or equal to one uplink reference signal resource. In other words, one uplink reference signal resource may include one or more first resources.

In an implementation, the method further includes: receiving indication information of the first precoding granularity. To be specific, the first precoding granularity may be configured by the network device. In another implementation, the first precoding granularity is predefined, for example, predefined in a protocol. This is not limited in this application.

Based on the foregoing technical solution, the terminal device may predetermine the downlink reference signal resources corresponding to the plurality of first resources in the uplink reference signal resources, determine a correspondence between the precoding matrix and the first resource, and then precode, based on the correspondence between the precoding matrix and the first resource, an uplink reference signal carried on the uplink reference signal resource, so that subsequently transmitted precoded uplink reference signals have different arrangement manners. Because the precoded uplink reference signal transmitted based on the method in this embodiment of this application is precoded based on the first precoding granularity, the precoding matrix used for the uplink reference signal no longer depends on a granularity of the uplink reference signal resource, and more possible arrangement manners of precoding matrices for the uplink reference signal resource may be obtained based on the first precoding granularity. To be specific, a granularity based on which the uplink reference signal is precoded is decoupled from a size of the uplink reference signal resource, to obtain a larger quantity of more flexible configurations of the uplink reference signal resource. This helps the network device obtain an accurate channel measurement result, and perform appropriate scheduling for subsequent uplink data transmission.

With reference to the second aspect, in some possible implementations of the second aspect, the method further includes: sending first indication information, where the first indication information is used to indicate a correspondence between the plurality of uplink reference signal resources and a plurality of downlink reference signal resources.

To be specific, the correspondence between the plurality of uplink reference signal resources and the plurality of downlink reference signal resources may be indicated by the network device by using the first indication information.

With reference to the second aspect, in some possible implementations of the second aspect, each of the plurality of downlink reference signal resources corresponds to at least one of the plurality of uplink reference signal resources, each of the at least one uplink reference signal resource corresponds to one or more of the plurality of precoding matrices, and the precoding matrix corresponding to each uplink reference signal resource is obtained based on measurement of the corresponding downlink reference signal resource.

Each downlink reference signal resource may correspond to one or more uplink reference signal resources. A same uplink reference signal resource may correspond to one or more downlink reference signal resources. The precoding matrix corresponding to each uplink reference signal resource may be obtained based on measurement of one or more downlink reference signal resources corresponding to the uplink reference signal resource.

In a possible design, the precoding matrix corresponding to each uplink reference signal resource is obtained based on measurement of one corresponding downlink reference signal resource.

That is, each uplink reference signal resource corresponds to one downlink reference signal resource. One or more precoding matrices may be obtained based on measurement of one downlink reference signal resource. The one or more precoding matrices may be used to precode an uplink reference signal on an uplink reference signal resource corresponding to the downlink reference signal resource.

With reference to the second aspect, in some possible implementations of the second aspect, the downlink reference signal resource is an NZP CSI-RS resource, and the uplink reference signal resource is an SRS resource.

In a possible design, at least one SRS resource corresponding to each of a plurality of NZP CSI-RS resources is included in one SRS resource set.

One or more uplink reference signal resources corresponding to a same downlink reference signal resource may be referred to as one uplink reference signal resource set. One downlink reference signal resource corresponds to one uplink reference signal resource set, so that one downlink reference signal resource corresponds to one or more uplink reference signal resources in one uplink reference signal resource set.

It should be understood that the correspondence between one downlink reference signal resource and one uplink reference signal resource set is merely a possible implementation, and should not constitute any limitation on this application.

It should be understood that the NZP CSI-RS resource used as an example of the downlink reference signal resource and the SRS resource used as an example of the uplink reference signal resource are merely examples, and should not constitute any limitation on this application. The downlink reference signal resource and the uplink reference signal resource are not limited in this application.

With reference to the second aspect, in some possible implementations of the second aspect, the method further includes: sending second indication information, where the second indication information is used to indicate one or more SRS resources in each of a plurality of SRS resource sets, and a precoding matrix corresponding to the one or more SRS resources is a precoding matrix used for uplink data transmission.

The network device may determine, based on measurement of the uplink reference signal resource, a precoding matrix used for subsequent uplink data transmission. It can be learned from the foregoing correspondence between the first resource and the precoding matrix and the foregoing relationship between the first resource and the uplink reference signal resource that, there is a correspondence between each SRS resource and the precoding matrix. Therefore, the network device indicates the SRS resource by using the second indication information, that is, indirectly indicates the precoding matrix selected for subsequent uplink data transmission.

With reference to the second aspect, in some possible implementations of the second aspect, the second indication information is further used to indicate a quantity of transport layers used for uplink data transmission, each of the one or more SRS resources in each SRS resource set corresponds to one transport layer, and the precoding matrix corresponding to each SRS resource is used for uplink data transmission at the corresponding transport layer.

Further, the second indication information is further used to indicate one or more demodulation reference signal DMRS ports corresponding to one or more transport layers, and the one or more transport layers are transport layers used for uplink data transmission.

The terminal device may establish a mapping relationship between the SRS resource indicated in the second indication information and the transport layer and the DMRS port that correspond to the SRS resource. Each SRS resource may be mapped to one transport layer, and corresponds to one DMRS port.

With reference to the second aspect, in some possible implementations of the second aspect, the method further includes: receiving precoded uplink data, where the precoded uplink data is obtained by precoding uplink data based on a precoding matrix corresponding to each second resource, the precoding matrix corresponding to each second resource is determined based on the SRS resource indicated by the second indication information and precoding matrices corresponding to a plurality of first resources, a time domain or frequency domain size of the second resource is determined based on a second precoding granularity, and the second precoding granularity indicates a time domain or frequency domain size of contiguous resources corresponding to a same precoding matrix in an uplink transmission resource.

The second precoding granularity may be understood as a granularity based on which the terminal device precodes uplink data.

In an implementation, the method further includes: sending indication information of the second precoding granularity. To be specific, the second precoding granularity is configured by the network device. In another implementation, the second precoding granularity is predefined, for example, predefined in a protocol. This is not limited in this application.

Optionally, the first precoding granularity is the same as the second precoding granularity. In this case, the indication information of the first precoding granularity and the indication information of the second precoding granularity may be a same piece of indication information.

Optionally, the first precoding granularity is different from the second precoding granularity.

When sending the uplink reference signal, the terminal device has determined the precoding matrix corresponding to each first resource, that is, has determined the precoding matrix corresponding to each SRS resource. Therefore, the terminal device may determine, based on the SRS resource indicated by the second indication information, the precoding matrix used for uplink data transmission. The terminal device may further map, to the plurality of second resources based on a correspondence between the plurality of first resources and the plurality of precoding matrices, the precoding matrix selected for uplink transmission, so that a correspondence between the plurality of second resources and the plurality of precoding matrices corresponds to the correspondence between the plurality of first resources and the plurality of precoding matrices.

In other words, a correspondence between the plurality of second resources and the downlink reference signal resources may also be determined according to the foregoing resource allocation rule. The resource allocation rule followed for determining the correspondence between the plurality of second resources and the downlink reference signal resources is the same as the foregoing resource allocation rule followed for determining the correspondence between the plurality of first resources and the downlink reference signal resources.

Therefore, the precoding matrix corresponding to each second resource is determined based on measurement of the precoded uplink reference signal. In a design of the precoding matrices corresponding to the plurality of first resources used to carry the precoded uplink reference signal, different resource allocation that may be performed during subsequent uplink data transmission is considered, and a finer precoding granularity is defined for the uplink reference signal resource, to obtain a larger quantity of more flexible correspondences between uplink reference signal resources and precoding matrices. This helps the network device obtain an accurate channel measurement result, and perform appropriate scheduling for subsequent uplink data transmission.

With reference to the second aspect, in some possible implementations of the second aspect, when there are a plurality of precoding matrices determined through measurement of the downlink reference signal resource corresponding to each first resource, the precoding matrix corresponding to each first resource is further determined according to a precoding selection rule.

In other words, the terminal device may voluntarily determine, from the plurality of precoding matrices, the precoding matrix corresponding to each first resource. The precoding selection rule is a rule according to which each first resource is determined. When each first resource corresponds to a plurality of precoding matrices, the terminal device may determine, according to the precoding selection rule, the precoding matrices corresponding to each first resource.

By way of example but not limitation, the precoding selection rule includes: precoder cycling, random selection, or throughput maximization. This application includes but is not limited to what is described herein.

In an implementation, the method further includes: sending indication information of the precoding selection rule. To be specific, the precoding selection rule is indicated by the network device. In another implementation, the precoding selection rule is predefined, for example, predefined in a protocol. This is not limited in this application.

According to a third aspect, a communication apparatus is provided. The communication apparatus may be a terminal device or a component in the terminal device. The communication apparatus may include modules or units configured to perform the method according to any one of the first aspect and the possible implementations of the first aspect.

According to a fourth aspect, a communication apparatus is provided. The communication apparatus includes a processor. The processor is coupled to a memory, and may be configured to execute instructions in the memory, to implement the method according to any one of the possible implementations of the first aspect. Optionally, the communication apparatus further includes the memory. Optionally, the communication apparatus further includes a communication interface. The processor is coupled to the communication interface. The communication interface is configured to input and/or output information. The information includes at least one of an instruction and data.

In an implementation, the communication apparatus is a terminal device. When the communication apparatus is the terminal device, the communication interface may be a transceiver or an input/output interface.

Optionally, the transceiver may be a transceiver circuit. Optionally, the input/output interface may be an input/output circuit.

In another implementation, the communication apparatus is a chip or a chip system disposed in a terminal device. When the communication apparatus is the chip or the chip system disposed in the terminal device, the communication interface may be an input/output interface, an interface circuit, an output circuit, an input circuit, a pin, a related circuit, or the like. The processor may alternatively be embodied as a processing circuit or a logic circuit.

According to a fifth aspect, a communication apparatus is provided. The communication apparatus may be a network device or a component in the network device. The communication apparatus may include modules or units configured to perform the method according to any one of the second aspect and the possible implementations of the second aspect.

According to a sixth aspect, a communication apparatus is provided. The communication apparatus includes a processor. The processor is coupled to a memory, and may be configured to execute an instruction in the memory, to implement the method according to any one of the possible implementations of the second aspect. Optionally, the communication apparatus further includes the memory. Optionally, the communication apparatus further includes a communication interface. The processor is coupled to the communication interface. The communication interface is configured to input and/or output information. The information includes at least one of an instruction and data.

In an implementation, the communication apparatus is a network device. When the communication apparatus is the network device, the communication interface may be a transceiver or an input/output interface.

Optionally, the transceiver may be a transceiver circuit. Optionally, the input/output interface may be an input/output circuit.

In another implementation, the communication apparatus is a chip or a chip system disposed in a network device. When the communication apparatus is the chip or the chip system disposed in the network device, the communication interface may be an input/output interface, an interface circuit, an output circuit, an input circuit, a pin, a related circuit, or the like. The processor may alternatively be embodied as a processing circuit or a logic circuit.

According to a seventh aspect, a processor is provided. The processor includes an input circuit, an output circuit, and a processing circuit. The processing circuit is configured to receive a signal by using the input circuit, and transmit a signal by using the output circuit, to enable the processor to perform the method according to any one of the possible implementations of the first aspect and the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to an eighth aspect, a processing apparatus is provided. The processing apparatus includes a communication interface and a processor. The communication interface is coupled to the processor. The communication interface is configured to input and/or output information. The information includes at least one of an instruction and data. The processor is configured to execute a computer program, to enable the processing apparatus to perform the method according to any one of the possible implementations of the first aspect and the second aspect.

Optionally, there are one or more processors, and there are one or more memories.

According to a ninth aspect, a processing apparatus is provided. The processing apparatus includes a processor and a memory. The processor is configured to read instructions stored in the memory, and may receive a signal through a receiver, and transmit a signal through a transmitter, to enable the processing apparatus to perform the method according to any one of the possible implementations of the first aspect and the second aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

It should be understood that in a related information exchange process, for example, sending indication information may be a process of outputting the indication information from the processor, and receiving the indication information may be a process of inputting the received indication information to the processor. Specifically, the information output by the processor may be output to the transmitter, and the input information received by the processor may be from the receiver. The transmitter and the receiver may be collectively referred to as a transceiver.

The apparatuses in the eighth aspect and the ninth aspect may be chips. The processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor, and exists independently.

According to a tenth aspect, a computer program product is provided. The computer program product includes a computer program (which may also be referred to as code or an instruction). When the computer program is run, a computer is enabled to perform the method according to any one of the possible implementations of the first aspect and the second aspect.

According to an eleventh aspect, a computer-readable medium is provided. The computer-readable medium stores a computer program (which may also be referred to as code or an instruction). When the computer program is run on a computer, the computer is enabled to perform the method according to any one of the possible implementations of the first aspect and the second aspect.

According to a twelfth aspect, a communication system is provided. The communication system includes the foregoing terminal device and network device.

DESCRIPTION OF EMBODIMENTS

Figure 1:
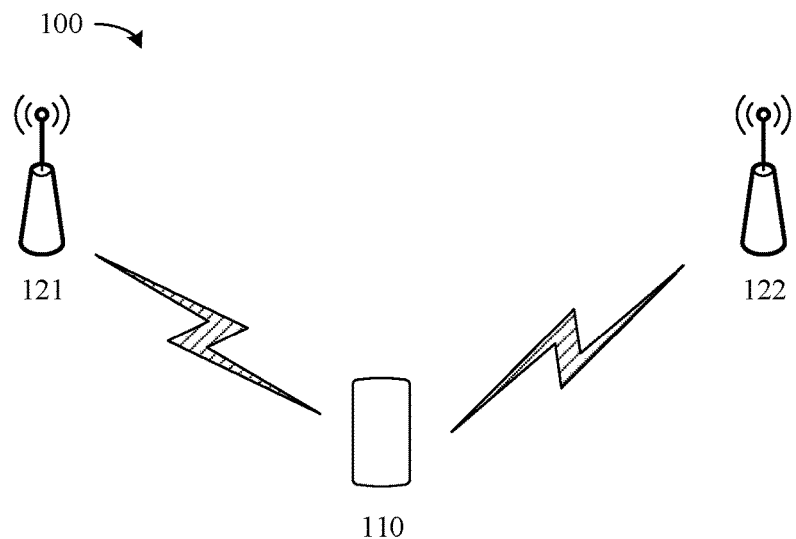
FIG. 1 is a schematic diagram of a communication system to which a method according to an embodiment of this application is applicable.

The following describes technical solutions in this application with reference to the accompanying drawings.

The technical solutions provided in this application may be applied to a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a fifth generation (5G) mobile communication system or a new radio access technology (NR) system, or a next generation communication system, for example, a 6G system. The 5G mobile communication system may be a non-standalone (NSA) communication system or a standalone (SA) communication system. The present disclosure should not be explicity limited to the above named technologies.

The technical solutions provided in this application may be further applied to machine type communication (MTC), a long term evolution-machine type communication technology (LTE-M), a device-to-device (D2D) network, a machine to machine (M2M) network, an internet of things (IoT) network, or another network. The IoT network may include, for example, an internet of vehicles. Communication modes in an internet of vehicles system are collectively referred to as vehicle to another device (vehicle to X, V2X, where X may represent anything). For example, V2X may include vehicle to vehicle (V2V) communication, vehicle to infrastructure (V2I) communication, vehicle to pedestrian (V2P) communication, and vehicle to network (V2N) communication.

The technical solutions provided in this application may be further applied to a future communication system, for example, a sixth generation (6G) mobile communication system. This is not limited in this application.

In embodiments of this application, a network device may be any device having a wireless transceiver function. The device includes but is not limited to: an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like; may be a gNB or a transmission point (TRP or TP) in a 5G system, for example, an NR system, or one antenna panel or a group of antenna panels (including a plurality of antenna panels) of a base station in a 5G system; or may be a network node, for example, a baseband unit (BBU) or a distributed unit (DU), included in a gNB or a transmission point, a base station in a next generation 6G communication system, or the like.

In some deployments, a gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is changed from information at the PHY layer. Therefore, in this architecture, higher-layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device serves a cell, and a terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have characteristics of small coverage and low transmit power, and are applicable to providing a high-rate data transmission service.

In embodiments of this application, the terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data connectivity for a user, for example, a hand-held device or a vehicle-mounted device that has a wireless connection function. Currently, some examples of the terminal may be: a mobile phone, a tablet computer (pad), a computer (for example, a notebook computer or a palmtop computer) having a wireless transceiver function, a mobile internet device (MID), a virtual reality (VR) device, an augmented reality (AR) device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a 5G network, and a terminal device in a future evolved public land mobile network (PLMN).

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, such as smart watches or smart glasses, and devices that focus on only one type of application and need to work with other devices such as smartphones, such as various smart bands or smart jewelry for monitoring physical signs.

In addition, the terminal device may alternatively be a terminal device in an internet of things (IoT) system. The IoT is an important part of future information technology development. A main technical feature of the IoT is to connect things to a network by using a communication technology, to implement an intelligent network for human-machine interconnection and thing-thing interconnection. An IoT technology may implement massive connections, deep coverage, and terminal power saving by using, for example, a narrow band (NB) technology.

In addition, the terminal device may alternatively include sensors such as an intelligent printer, a train detector, and a gas station, and main functions of the terminal device include: collecting data (which is a function of some terminal devices), receiving control information and downlink data of a network device, sending an electromagnetic wave, and transmitting uplink data to the network device.

For ease of understanding of embodiments of this application, the following descriptions are provided first.

First, in embodiments of this application, a correspondence between a plurality of precoding matrices and a plurality of first resources, and a correspondence between a plurality of precoding matrices and a plurality of uplink reference signal resources are described with reference to a plurality of accompanying drawings. Resources in these accompanying drawings may use a resource multiplexing manner of frequency division multiplexing (FDM) or time division multiplexing (TDM). The accompanying drawings are merely examples, and FDM or TDM is used as an example for description. However, this should not constitute any limitation on this application. Based on a same idea, a person skilled in the art may change resources that use FDM in the figures to use the resource multiplexing manner of TDM, or change resources that use TDM in the figures to use the resource multiplexing manner of FDM.

Second, the terms "first", "second", and various numbers in the following embodiments are merely used for differentiation for ease of description, and are not intended to limit the scope of embodiments of this application. For example, the terms are used to distinguish between different indication information.

Third, "predefinition" may be implemented by prestoring corresponding code or a corresponding table in a device (for example, including a terminal device and a network device), or may be implemented in another manner that may be used to indicate related information. A specific implementation thereof is not limited in this application. "Storage" may be storage in one or more memories. The one or more memories may be separately disposed, or may be integrated into an encoder or a decoder, a processor, or a communication apparatus. Alternatively, some of the one or more memories may be separately disposed, and some of the one or more memories are integrated into a decoder, a processor, or a communication apparatus. A type of the memory may be a storage medium in any form. This is not limited in this application.

Fourth, a "protocol" in embodiments of this application may be a standard protocol in the communication field, for example, may include an LTE protocol, an NR protocol, and a related protocol applied to a future communication system. This is not limited in this application.

Fifth, in this application, "being used to indicate" may include "being used to directly indicate" and "being used to indirectly indicate". When a piece of indication information is described as being used to indicate A, the indication information may directly indicate A or indirectly indicate A, but it does not necessarily indicate that the indication information carries A.

Information indicated by indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. The to-be-indicated information may alternatively be indirectly indicated by indicating other information, where there is an association relationship between the other information and the to-be-indicated information. Alternatively, only a part of the to-be-indicated information may be indicated, and the other part of the to-be-indicated information is known or pre-agreed on. For example, specific information may alternatively be indicated based on an arrangement sequence of a plurality of pieces of information that is pre-agreed on (for example, stipulated in a protocol), to reduce indication overheads to some extent. In addition, a common part of all pieces of information may be further identified and indicated in a unified manner, to reduce indication overheads caused by separately indicating same information.

Furthermore, specific indication manners may alternatively be various existing indication manners, for example, but not limited to, the foregoing indication manners and various combinations thereof. For details of the various indication manners, refer to the conventional technology. The details are not described in this specification. It can be learned from the foregoing descriptions that, for example, when a plurality of pieces of information of a same type need to be indicated, different information may be indicated in different manners. In a specific implementation process, a required indication manner may be selected based on a specific requirement. The selected indication manner is not limited in embodiments of this application. In this way, the indication manner in embodiments of this application should be understood as covering various methods that can enable a to-be-indicated party to learn of the to-be-indicated information.

The to-be-indicated information may be sent as a whole, or may be divided into a plurality of pieces of sub-information for separate sending. In addition, sending periodicities and/or sending occasions of these pieces of sub-information may be the same or may be different. A specific sending method is not limited in this application. The sending periodicities and/or the sending occasions of these pieces of sub-information may be predefined, for example, predefined according to a protocol, or may be configured by a transmit end device by sending configuration information to a receive end device. By way of example but not limitation, the configuration information may include one or a combination of at least two of radio resource control signaling, media access control (MAC) layer signaling, and physical layer signaling. The radio resource control signaling includes, for example, radio resource control (RRC) signaling. The MAC layer signaling includes, for example, a MAC control element (CE). The physical layer signaling includes, for example, downlink control information (DCI).

Sixth, in embodiments of this application, descriptions such as "when", "in a case", and "if" mean that a device (for example, a terminal device or a network device) performs corresponding processing in an objective situation, and are not intended to limit time, and the device (for example, the terminal device or the network device) is not required to perform a determining action during implementation; and do not mean any other limitation.

Seventh, in embodiments of this application, a plurality of examples are described by using an example in which an SRS is an uplink reference signal, an example in which an SRS resource is an uplink reference signal resource, an example in which an NZP CSI-RS is a downlink reference signal, and an example in which an NZP CSI-RS resource is a downlink reference signal resource. However, this should not constitute any limitation on this application. Specific content of the uplink reference signal, the uplink reference signal resource, the downlink reference signal, and the downlink reference signal resource is not limited in this application.

Eighth, a process in which a terminal device determines a precoding matrix used for an uplink reference signal and sends a precoded uplink reference signal is described in detail in embodiments of this application. In consideration of integrity of the solutions, the foregoing process is described in detail by using a network device #1 and a network device #2 as an example in embodiments of this application. However, it should be noted that the terminal device does not perceive an internal implementation of the network device and a quantity of network devices. Although the network device #1 and the network device #2 are listed in this specification, a specific behavior of the network device and a quantity of network devices are not limited in this application.

For example, in the following embodiments, first indication information may be sent by the network device #1 and/or the network device #2; indication information of a resource allocation rule may be sent by the network device #1 and/or the network device #2; and indication information of a precoding selection rule may also be sent by the network device #1 and/or the network device #2.

For another example, different downlink reference signal resources may be configured by a same network device, for example, one of the network device #1 and the network device #2; or may be separately configured by different network devices, for example, separately configured by the network device #1 and the network device #2. Different downlink reference signal resources may be from a same network device, for example, from one of the network device #1 and the network device #2; or may be from different network devices, for example, from the network device #1 and the network device #2. It should be noted that configuration and sending of downlink reference signal resources are two different processes, and correspondences between the processes and network devices are not necessarily consistent. For example, different downlink reference signal resources may be configured by a same network device, but sent by different network devices.

When receiving uplink reference signals sent by the terminal device, different network devices may receive uplink reference signals on uplink reference signal resources corresponding to downlink reference signal resources sent by the network devices, or may receive uplink reference signals on all uplink reference signal resources. This is not limited in this application.

For another example, a operation of performing channel measurement based on an uplink reference signal may be performed by the network device #1 and/or the network device #2, and second indication information and fifth indication information may be sent, for example, by the network device that performs channel measurement, or may be sent by one of the network device #1 and the network device #2.

For another example, when receiving uplink data sent by the terminal device, different network devices may separately receive, on uplink transmission resources, uplink data sent to the network devices, or may receive all the uplink data on uplink transmission resources. This is not limited in this application.

For brevity, descriptions of a same or similar case are omitted below.

For ease of understanding of embodiments of this application, a communication system shown in FIG. 1 is first used as an example to describe in detail a communication system to which embodiments of this application are applicable. FIG. 1 is a schematic diagram of a wireless communication system 100 to which embodiments of this application are applicable. As shown in the figure, the wireless communication system 100 may include at least one terminal device, for example, a terminal device 110 shown in FIG. 1. The wireless communication system 100 may further include at least one network device, for example, a network device 121 and a network device 122 shown in FIG. 1.

A plurality of antennas may be configured for each communication device, for example, the terminal device 110, the network device 121, and the network device 122 in FIG. 1. The plurality of antennas configured for each communication device may include at least one transmit antenna configured to send a signal and at least one receive antenna configured to receive a signal. In addition, each communication device additionally includes a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

The terminal device 110 may communicate, by using a same time-frequency resource, with a plurality of network devices, for example, the network device 121 and the network device 122 in the figure. For example, the terminal device 110 may multiplex a same time-frequency resource in a manner such as frequency division multiplexing (FDM) or time division multiplexing (TDM), to communicate with the plurality of network devices.

Optionally, the terminal device 110 may send same data to the plurality of network devices by using a same time-frequency resource, to obtain a diversity gain, so that data transmission reliability is improved.

Optionally, the terminal device 110 may send different data to the plurality of network devices by using a same time-frequency resource, to implement spatial multiplexing, so that a data transmission throughput is improved.

Although not shown in the figure, it may be understood that the communication system 100 may further include another quantity of terminal devices. For example, the communication system 100 may further include more terminal devices and more network devices. This is not limited in this application.

For example, the terminal device may send an uplink signal to the network device by using a physical uplink control channel (PUCCH) and a physical uplink shared channel (PUSCH), for example, transmit uplink control information (UCI) by using the PUCCH or transmit uplink data by using the PUSCH.

As described above, the terminal device may send uplink data to the plurality of network devices by using a same time-frequency resource, for example, send a PUSCH. However, this may cause mutual interference between a plurality of terminal devices, and quality of receiving the uplink data by the network device is poor, affecting system transmission performance.

The terminal device may cancel the interference through precoding. Transmission of a physical uplink shared channel (PUSCH) is used as an example. Currently, uplink (UL) transmission schemes that can be supported by the PUSCH include codebook based uplink transmission (codebook based UL transmission) and non-codebook based uplink transmission (non-codebook based UL transmission). Regardless of codebook based uplink transmission or non-codebook based uplink transmission, the terminal device performs a precoding operation on uplink data, to eliminate interference between terminal devices and improve data transmission quality.

In codebook based uplink transmission, the terminal device may determine, based on an indication of the network device, a precoding matrix used for uplink transmission. For example, the network device indicates, by using a transmission precoding matrix indicator (TPMI), a precoding matrix used for PUSCH transmission.

In non-codebook based uplink transmission, a precoding matrix used by the terminal device is transparent to the network device. The terminal device may use a precoded uplink reference signal, for example, a precoded SRS. Each SRS resource may be used to send one precoded SRS, that is, each SRS resource may correspond to one precoding matrix. Subsequently, the network device may indirectly indicate, by indicating an SRS resource, a precoding matrix used for the PUSCH. In other words, if the terminal device precodes an SRS by using one precoding matrix, an obtained precoded SRS may be transmitted by using one SRS resource. In other words, there is a one-to-one correspondence between a precoding matrix and an SRS resource. If the network device subsequently indicates the SRS resource, it is equivalent to indicating the terminal device to use the precoding matrix corresponding to the SRS resource for PUSCH transmission.

To improve transmission performance, the terminal device may determine, by using, for example, a rule such as precoder cycling, random selection, or throughput maximization, or by using a combination of a plurality of rules, the precoding matrix used for PUSCH transmission. The foregoing listed rules such as precoder cycling, random selection, and throughput maximization may be referred to as precoding selection rules. In other words, the precoding matrix used for PUSCH transmission may be determined according to the precoding selection rule. Certainly, the precoding selection rule includes but is not limited to what is described herein. This is not limited in this application. The precoding selection rule is described in detail below with reference to a specific example. For brevity, details are not described herein.

Uplink transmission of the terminal device may be usually scheduled by the network device. The network device usually makes a decision for uplink scheduling based on a measurement result of an uplink channel. The terminal device may send an uplink reference signal (such as an SRS) to the network device, so that the network device measures an uplink channel.

However, the foregoing precoding selection rule according to which data transmission is performed is not considered in a current SRS resource configuration. For example, when the terminal device determines, through precoder cycling, the precoding matrix used for PUSCH transmission, the SRS may still not be processed through precoder cycling.

Figure 2:
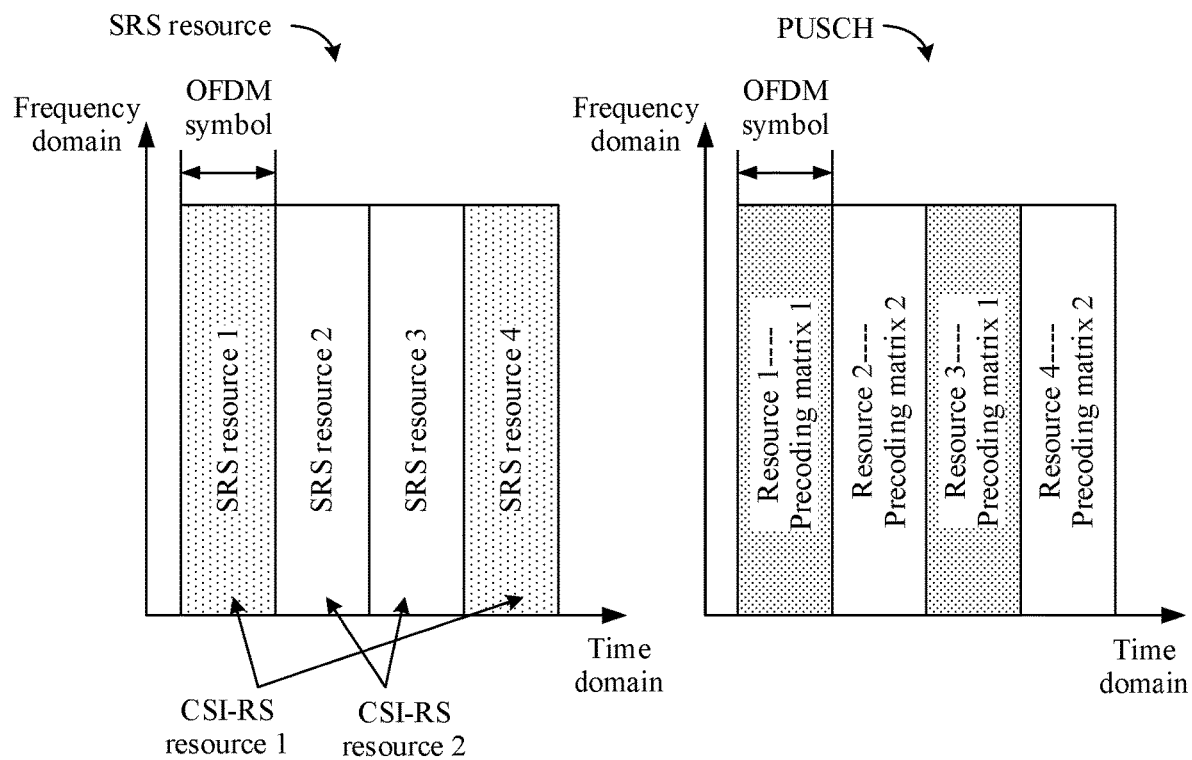
FIG. 2 is a schematic diagram of an SRS resource and a PUSCH.

FIG. 2 shows an example of an SRS resource and a PUSCH. The SRS resource is used as an example of an uplink reference signal resource, and the PUSCH is used as an example of a transmission resource of uplink data. It should be understood that FIG. 2 is merely an example, and the uplink reference signal resource and the transmission resource of the uplink data are not limited in this application.

As shown in the figure, the left part in FIG. 2 shows a plurality of SRS resources, for example, including an SRS resource 1 to an SRS resource 4. As shown in the figure, the plurality of SRS resources occupy a same frequency domain resource and different time domain resources. Specifically, each SRS resource occupies one orthogonal frequency division multiplexing (OFDM) symbol in time domain. In other words, a resource multiplexing manner of the plurality of SRS resources is time division multiplexing (TDM).

It should be understood that, that the SRS resource occupies one OFDM symbol in time domain in FIG. 2 is merely an example of a time domain granularity of the SRS resource. The resource multiplexing manner of the plurality of SRS resources and time domain and frequency domain sizes of each SRS resource are not limited in this application. For example, each SRS resource may alternatively occupy a plurality of OFDM symbols, or occupy one or more slots, or occupy one or more mini slots in time domain. For another example, the resource multiplexing manner of the plurality of SRS resources may alternatively be frequency division multiplexing (FDM). Each SRS resource may occupy one or more physical resource blocks (PRBs), or occupy a plurality of RB groups (RBGs), or occupy a precoding resource block group (RBG) in frequency domain. One RBG may include a plurality of PRBs. Based on a same naming manner, a plurality of slots may be referred to as, for example, a slot group, a plurality of mini slots may be referred to as, for example, a mini slot group, and a plurality of OFDM symbols may be referred to as, for example, an OFDM symbol group. It should be understood that the foregoing listed names are merely examples, and a specific name is not limited in this application.

The plurality of SRS resources may be associated with or correspond to a plurality of downlink reference signal resources (for example, channel state information reference signal resource (CSI-RS resources). For example, the plurality of CSI-RS resources may be configured by one or more network devices, and the plurality of CSI-RS resources may be used by the one or more network devices to send CSI-RSs. This is not limited in this application.

For example, the SRS resource 1 and the SRS resource 4 in the figure correspond to a CSI-RS resource 1 sent by the network device #1, and the SRS resource 2 and the SRS resource 3 correspond to a CSI-RS resource 2. The terminal device may determine, based on measurement of the CSI-RS resource 1, a precoding matrix 1 used for SRSs transmitted on the SRS resource 1 and the SRS resource 4, and may also determine, based on measurement of the CSI-RS resource 2, a precoding matrix 2 used for SRSs transmitted on the SRS resource 2 and the SRS resource 3.

It should be understood that a correspondence between an SRS resource and a CSI-RS resource and a correspondence between a CSI-RS resource and a precoding matrix are not limited in this application. It should be further understood that a correspondence between a CSI-RS resource and a network device is not limited in this application. For example, a plurality of CSI-RS resources may be sent by a same network device. For example, the CSI-RS resource 1 and the CSI-RS resource 2 may be sent by a same network device. For another example, one SRS resource may alternatively correspond to a plurality of CSI-RS resources. For example, the SRS resource 1 may correspond to the CSI-RS resource 1 and the CSI-RS resource 2.

The right part in FIG. 2 shows an example of the PUSCH. As shown in the figure, the PUSCH may be divided into a plurality of resources in time domain, for example, including a resource 1 to a resource 4. In the PUSCH, each resource may correspond to one precoding matrix. For example, the precoding matrix corresponding to each resource is determined through precoder cycling. The resource 1 corresponds to a precoding matrix 1, the resource 2 corresponds to a precoding matrix 2, the resource 3 corresponds to the precoding matrix 1, and the resource 4 corresponds to the precoding matrix 2.

In a possible design, the plurality of resources may be alternately arranged, to cycle precoding matrices obtained through measurement of different corresponding CSI-RS resources, so as to obtain a diversity gain. For example, a precoding matrix used for uplink data transmitted on the resource 1 and the resource 3 may be the precoding matrix 1, and a precoding matrix used for uplink data transmitted on the resource 2 and the resource 4 may be the precoding matrix 2.

It should be understood that the foregoing listed correspondence between each resource and a precoding matrix is merely an example, and should not constitute any limitation on this application.

In addition, the plurality of resources in the PUSCH shown in the figure occupy a same frequency domain resource and different time domain resources. Specifically, each resource occupies one OFDM symbol in time domain, and uses the resource multiplexing manner of TDM. However, it should be understood that the correspondence between each resource in the PUSCH shown in the figure and one OFDM symbol in time domain is merely an example. The resource multiplexing manner and time domain and frequency domain sizes of the PUSCH are not limited in this application. For example, each resource may alternatively occupy a plurality of OFDM symbols, or occupy one or more slots, or occupy one or more mini slots in time domain. For another example, the resources in the PUSCH may alternatively be multiplexed in the FDM manner. Each resource may include one or more RBs, one or more RBGs, or the like.

With reference to the foregoing descriptions of FIG. 2, it can be learned that the correspondence between the SRS resource and the CSI-RS resource that is shown in the left part in the figure is inconsistent with the correspondence between each resource in the PUSCH and the CSI-RS resource that is shown in the right part in the figure. The SRS resource 1 and the SRS resource 4 shown in the left part in the figure correspond to the CSI-RS resource 1, and the SRS resource 2 and the SRS resource 3 shown in the left part in the figure correspond to the CSI-RS resource 1. Uplink data to be transmitted on the resource 1 and the resource 3 shown in the right part in the figure is obtained through precoding based on the precoding matrix 1, and the precoding matrix 1 is obtained based on measurement of the CSI-RS resource 1. In other words, the resource 1 and the resource 3 correspond to the CSI-RS resource 1. Uplink data to be transmitted on the resource 2 and the resource 4 shown in the right part in the figure is obtained through precoding based on the precoding matrix 2, and the precoding matrix 2 is obtained based on measurement of the CSI-RS resource 2. In other words, the resource 2 and the resource 4 correspond to the CSI-RS resource 2.

However, the network device usually measures an uplink channel based on a received SRS, to schedule the PUSCH based on a measurement result.

For example, the network device may determine a channel quality indicator (CQI) of the uplink channel based on signal quality of the received SRS, and further determine an MCS used for uplink transmission. It may be understood that, if the network device measures the uplink channel based on the SRS received on the SRS resource shown in FIG. 2, because precoder cycling used for subsequent uplink data transmission is not considered for the SRS transmitted on each SRS resource, the MCS determined by the network device may not be applicable to a PUSCH that is subsequently transmitted through precoder cycling, affecting PUSCH transmission performance.

In view of this, this application provides an uplink reference signal sending and receiving method, to obtain an accurate measurement result of an uplink channel, so that a network device makes an appropriate decision for uplink scheduling, to improve transmission performance.

The following describes in detail the uplink reference signal sending and receiving method provided in embodiments of this application with reference to the accompanying drawings.

It should be understood that, merely for ease of understanding and description, interaction between devices is used as an example in the following to describe in detail the method provided in embodiments of this application. However, this should not constitute any limitation on an execution body of the method provided in this application. For example, a terminal device described in the following embodiments may be replaced with a component (such as a circuit, a chip, a chip system, or another functional module that can invoke and execute a program) disposed in the terminal device, and a network device described in the following embodiments may be replaced with a component (such as a circuit, a chip, a chip system, or another functional module that can invoke and execute a program) disposed in the network device, provided that the program that records code of the method provided in embodiments of this application can be run, to send and receive an uplink reference signal according to the method provided in embodiments of this application.

It should be further understood that a scenario to which the provided uplink reference signal sending and receiving method is applicable is not limited in this application. For example, the uplink reference signal sending and receiving method provided in embodiments of this application may be applied to a non-codebook based uplink transmission scheme, or may be applied to a codebook based uplink transmission scheme. In the following method 300 shown in FIG. 3A and FIG. 3B, a non-codebook based uplink transmission scheme is used as an example to describe a specific procedure of the method. However, this should not constitute any limitation on this application.

Figure 3A:
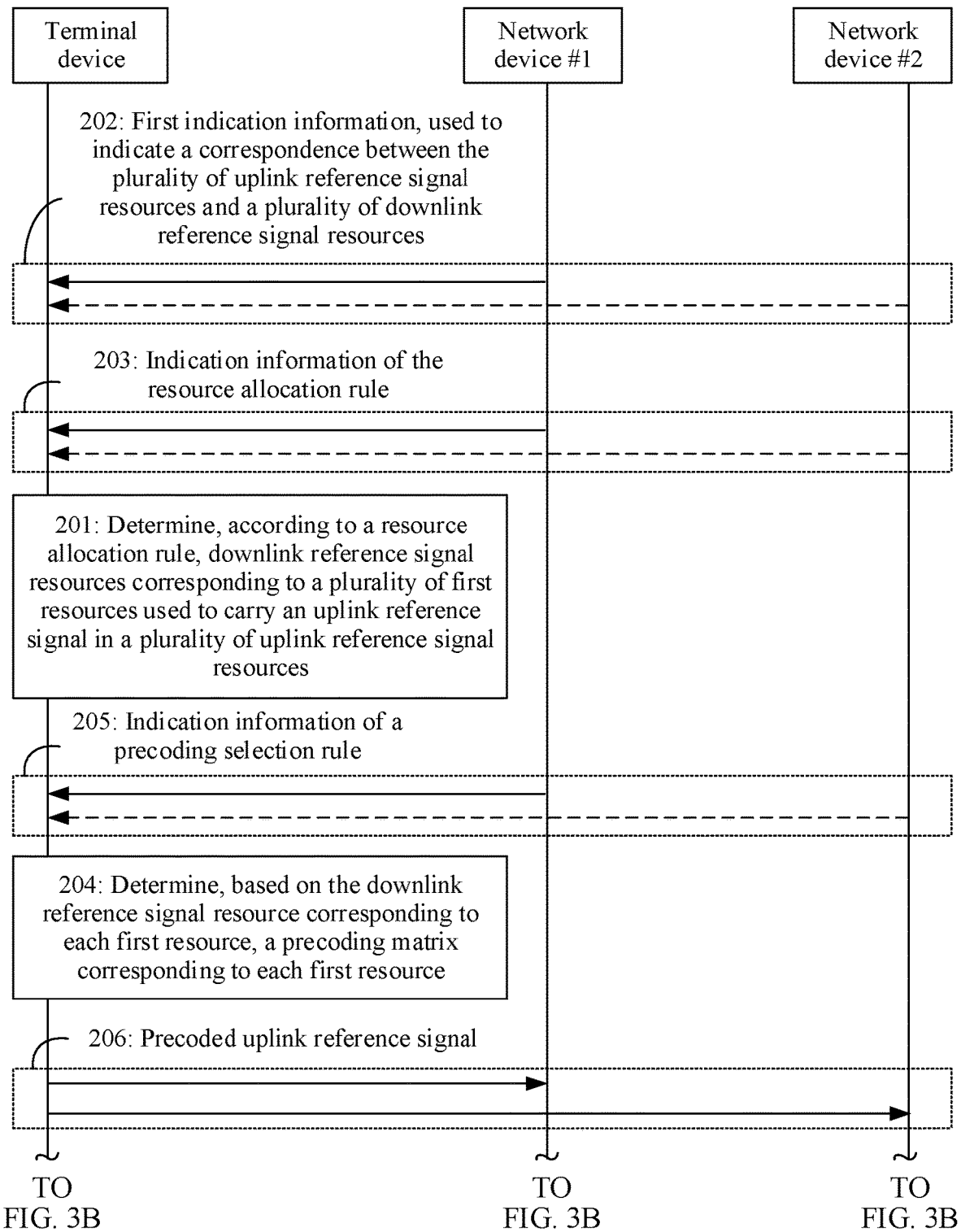
FIG. 3A and FIG. 3B are a schematic flowchart of an uplink reference signal sending and receiving method according to an embodiment of this application.
Figure 3B:
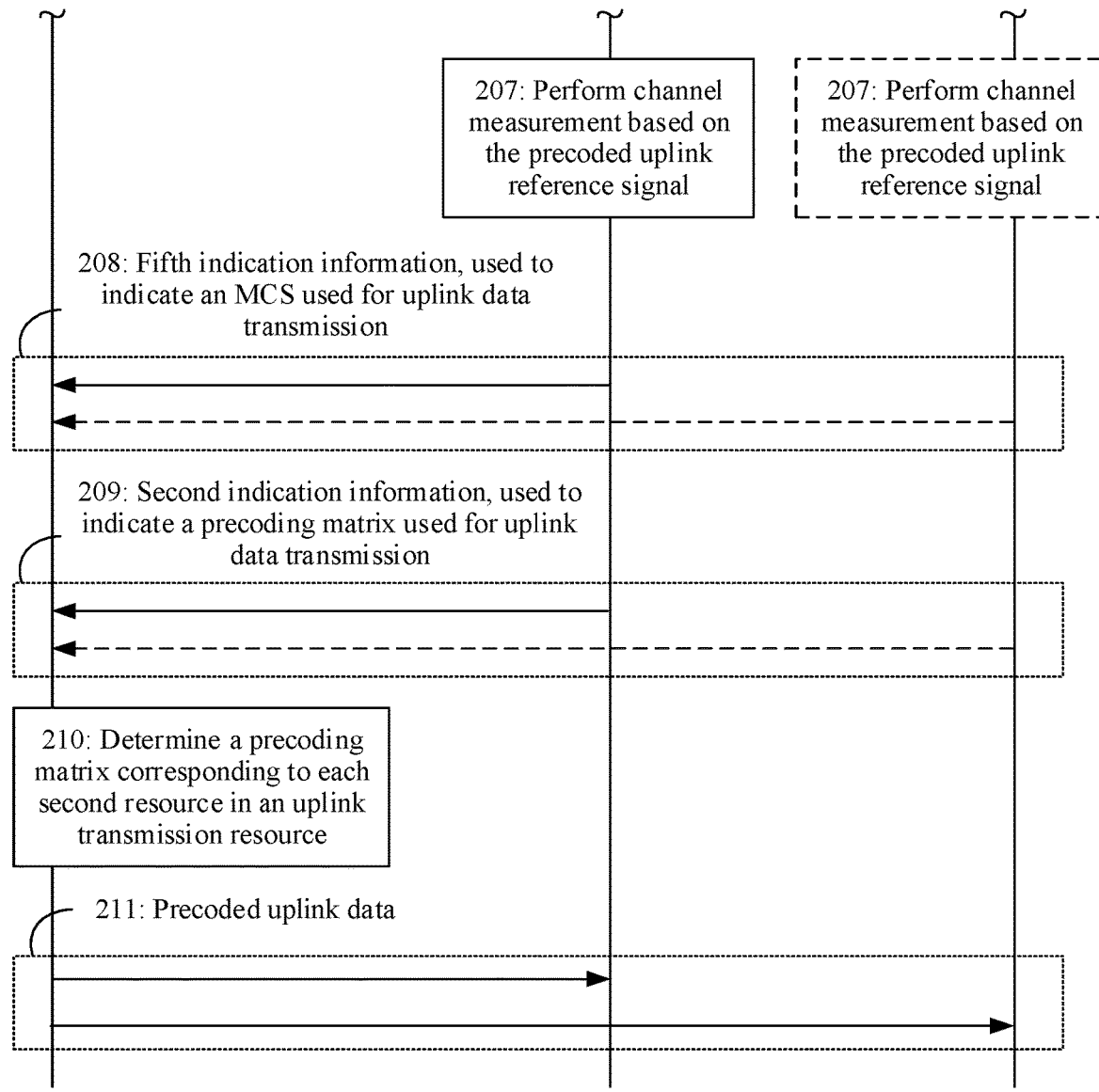

FIG. 3A and FIG. 3B are a schematic flowchart of an uplink reference signal sending and receiving method 200 according to an embodiment of this application. As shown in FIG. 3A and FIG. 3B, the method 200 may include operation 201 to operation 211. The following describes the operations in the method 200 in detail.

It should be noted that some operations in FIG. 3A and FIG. 3B may be performed by a network device #1, or may be performed by a network device #2, or may be performed by the network device #1 and the network device #2. An execution process of the network device #1 is mainly described in detail in the following embodiment, and is shown by solid lines in the figure, and an operation performed by the network device #2 is shown by a dashed line.

Step 201: A terminal device determines, according to a resource allocation rule, downlink reference signal resources corresponding to a plurality of first resources used to carry an uplink reference signal in a plurality of uplink reference signal resources.

Herein, the first resource belongs to the uplink reference signal resource, and may be used to carry the uplink reference signal. The first resource is a resource determined based on a precoding granularity. A time domain or frequency domain size of the first resource may be determined based on the precoding granularity. The precoding granularity herein is a time domain or frequency domain size of contiguous resources corresponding to a same precoding matrix in one uplink reference signal resource. In other words, the precoding granularity corresponds to the uplink reference signal. For ease of distinguishing from a precoding granularity used for uplink data transmission in the following, the precoding granularity corresponding to the uplink reference signal is denoted as a first precoding granularity herein.

The first precoding granularity may be a granularity in frequency domain, which is referred to as a frequency domain granularity for short; or may be a granularity in time domain, which is referred to as a time domain granularity for short. If the first precoding granularity is the frequency domain granularity, the frequency domain size of the first resource may be a size of the first precoding granularity. If the first precoding granularity is the time domain granularity, the time domain size of the first resource may be a size of the first precoding granularity.

By way of example but not limitation, if the first precoding granularity is the frequency domain granularity, the first precoding granularity may be one or more physical resource blocks (PRBs), one or more RB groups (RB groups, RBGs, where each RBG may include a plurality of PRBs), or a precoding resource block group (PRG). If the first precoding granularity is the time domain granularity, the first precoding granularity may be one or more slots (which are, for example, referred to as a slot group), one or more mini slots (which are, for example, referred to as a mini slot group), or one or more OFDM symbols (which are also referred to as an OFDM symbol group). It should be understood that specific names of the frequency domain granularities and the time domain granularities are not limited in this application.

The first precoding granularity may be indicated by a network device, or may be predefined in a protocol. This is not limited in this application.

If the first precoding granularity is indicated by the network device, optionally, the method further includes: The terminal device receives indication information of the first precoding granularity. Correspondingly, the network device sends the indication information of the first precoding granularity. The network device that sends the indication information of the first precoding granularity may be, for example, the network device #1 or the network device #2 shown in FIG. 3A and FIG. 3B. This is not limited in this application.

It should be understood that when the first precoding granularity is the frequency domain granularity, it may be considered that a resource multiplexing manner is frequency division multiplexing (FDM); or when the first precoding granularity is the time domain granularity, it may be considered that a resource multiplexing manner is time division multiplexing (TDM). Therefore, when the network device indicates the first precoding granularity, it may also be considered that the resource multiplexing manner is implicitly indicated.

Alternatively, when the first precoding granularity is predefined in the protocol, for example, the time domain granularity and the frequency domain granularity are predefined in the protocol, the network device may indicate, by indicating the resource multiplexing manner, whether the currently used first precoding granularity is the time domain granularity or the frequency domain granularity. In this case, it may also be considered that the first precoding granularity is implicitly indicated by indicating the resource multiplexing manner.

Optionally, the method further includes: The terminal device receives third indication information, where the third indication information is used to indicate the resource multiplexing manner.

Optionally, the resource multiplexing manner may be predefined in a protocol. This is not limited in this application.

The size of the first precoding granularity may be less than or equal to a size of one uplink reference signal resource. The terminal device may divide each uplink reference signal resource into one or more first resources based on the first precoding granularity. Specifically, if the size of the first precoding granularity is less than the size of one uplink reference signal resource, one uplink reference signal resource may include a plurality of first resources; or if the size of the first precoding granularity is equal to the size of one uplink reference signal resource, one uplink reference signal resource is one first resource. Therefore, the terminal device may determine the plurality of first resources from the plurality of uplink reference signal resources.

To determine the plurality of first resources in the plurality of uplink reference signal resources, positions of the uplink reference signal resources may be first determined. In this embodiment of this application, the plurality of uplink reference signal resources may correspond to a plurality of downlink reference signal resources, and each downlink reference signal resource may be associated with one or more uplink reference signal resources. When configuring the plurality of uplink reference signal resources associated with the plurality of downlink reference signal resources, the network device may indicate only an approximate range of the plurality of uplink reference signal resources in a time-frequency resource, but cannot determine specific positions of the plurality of uplink reference signal resources in the time-frequency resource. The terminal device may determine, based on the downlink reference signal resource corresponding to each first resource, the uplink reference signal resource to which each first resource belongs, and may further determine the specific position of each uplink reference signal resource.

The downlink reference signal resource may be used to transmit a downlink reference signal. The uplink reference signal resource may be used to transmit an uplink reference signal. In this embodiment of this application, by way of example but not limitation, the uplink reference signal resource may be an SRS resource, the uplink reference signal may be an SRS, the downlink reference signal resource may be a CSI-RS resource, and may be a non-zero power (NZP) CSI-RS resource, and the downlink reference signal may be an NZP CSI-RS.

Optionally, the method 200 further includes: Step 202: The terminal device receives first indication information, where the first indication information is used to indicate a correspondence between the plurality of uplink reference signal resources and the plurality of downlink reference signal resources.

The plurality of downlink reference signal resources may be resources used by different network devices to transmit downlink reference signals to the terminal device, and the plurality of uplink reference signal resources may be resources used to transmit uplink reference signals to the different network devices. In other words, the plurality of downlink reference signal resources may correspond to a plurality of network devices, and the plurality of uplink reference signal resources may also correspond to the plurality of network devices.

In this case, for example, the correspondence between the plurality of uplink reference signal resources and the plurality of downlink reference signal resources may be configured by the plurality of network devices, and each network device configures a downlink reference signal resource used by the network device and an uplink reference signal resource corresponding to the downlink reference signal resource. For example, the network device #1 and the network device #2 separately send the first indication information to the terminal device, to indicate a correspondence between an uplink reference signal resource and a downlink reference signal resource that is configured by each network device. Alternatively, the plurality of downlink reference signal resources and the uplink reference signal resources corresponding to the plurality of downlink reference signal resources may be configured by a same network device. For example, the network device #1 or the network device #2 in FIG. 3A and FIG. 3B sends the first indication information to the terminal device, to indicate a correspondence between an uplink reference signal resource and a downlink reference signal resource that is configured by each network device.

Alternatively, the plurality of downlink reference signal resources may be resources used by a same network device to transmit a downlink reference signal to the terminal device, and the plurality of uplink reference signal resources may be resources used by the terminal device to transmit an uplink reference signal to the network device. In other words, the plurality of downlink reference signal resources may correspond to one network device, and the plurality of uplink reference signal resources may also correspond to one network device.

Neither a correspondence between the plurality of downlink reference signal resources and a network device nor a correspondence between the plurality of uplink reference signal resources and a network device is limited in this application.

In a possible design, one NZP CSI-RS resource may correspond to one SRS resource set, and each SRS resource set includes at least one SRS resource. For example, the network device may configure one or more SRS resource sets in SRS configuration signaling (for example, an SRS configuration information element (SRS-Config information element)), indicate, in each SRS resource set, one or more SRS reference signal resources included in the SRS resource set, for example, indicate an identifier (SRS resource indicator) of the SRS reference signal resource included in the SRS resource set, and further indicate an NZP CSI-RS resource associated with each SRS resource set, for example, indicate an identifier (NZP CSI-RS resource indicator) of the NZP CSI-RS resource associated with the SRS resource set. In other words, one or more SRS resources may be associated with one NZP CSI-RS resource by using the SRS configuration signaling. To be specific, the SRS configuration signaling may include the first indication information.

It should be understood that the foregoing specific manner of associating the NZP CSI-RS resource with the SRS resource by using the SRS resource set is merely an example, and should not constitute any limitation on this application. For example, the network device may alternatively directly associate the NZP CSI-RS resource with the SRS resource. This specific manner is not limited in this application.

The terminal device may determine, based on the first indication information, a start position and an end position of each uplink reference signal resource corresponding to each downlink reference signal resource in the time-frequency resource, that is, an occupied area in the time-frequency resource. In this embodiment of this application, the terminal device may determine a total quantity of PRBs occupied in the time-frequency resource by the plurality of uplink reference signal resources corresponding to the plurality of downlink reference signal resources. For example, the total quantity of PRBs may be denoted as $n_{PRB}$, where $n_{PRB}$ is a positive integer.

It should be understood that areas occupied by the plurality of uplink reference signal resources configured by the network device for the terminal device in the time-frequency resource may be contiguous or discontiguous, for example, contiguous or discontiguous in time domain, contiguous or discontiguous in frequency domain, or contiguous or discontiguous in both time domain and frequency domain. This is not limited in this application.

Then, the terminal device may further determine, according to the resource allocation rule, the downlink reference signal resource corresponding to each first resource in the plurality of uplink reference signal resources.

Herein, the resource allocation rule may be a rule that may be used to determine a correspondence between a first resource determined based on the precoding granularity in a time-frequency resource used to transmit an uplink reference signal and a downlink reference signal resource. Based on different dimensions, the resource allocation rule may be used to determine a correspondence between the first resource and the downlink reference signal resource in frequency domain or a correspondence between the first resource and the downlink reference signal resource in time domain. For example, the resource allocation rule may include a frequency domain resource allocation (FDRA) rule or a time domain resource allocation (TDRA) rule. The FDRA rule may be used to determine a correspondence between a plurality of first resources that use FDM and a downlink reference signal resource in frequency domain. The TDRA rule may be used to determine a correspondence between a plurality of first resources that use TDM and a downlink reference signal resource in time domain.

It should be understood that determining, by the terminal device according to the resource allocation rule, the downlink reference signal resource corresponding to each first resource is equivalent to determining a position of each first resource in each uplink reference signal resource, so that the position of each uplink reference signal resource may also be determined.

The terminal device may determine, according to different resource allocation rules, the downlink reference signal resource corresponding to each first resource in the plurality of uplink reference signal resources. The following separately uses FDRA and TDRA as examples.

If the first precoding granularity is the frequency domain granularity, the terminal device may determine, with reference to the FDRA rule, the downlink reference signal resources corresponding to the plurality of first resources used to carry the uplink reference signal.

In a possible design, when the first precoding granularity is the frequency domain granularity, and the frequency domain granularity is a preset value, the $n_{PRB}$ PRBs may be first divided into a plurality of first resources based on the first precoding granularity. Then, an odd-numbered first resource and an even-numbered first resource in the plurality of first resources may be respectively assigned to two different downlink reference signal resources, that is, associated with the two different downlink reference signal resources. Because there is a correspondence between the downlink reference signal resource and the uplink reference signal resource, the terminal device may determine that the odd-numbered first resource belongs to one uplink reference signal resource, and the even-numbered first resource belongs to another uplink reference signal resource.

For example, when the first precoding granularity is the frequency domain granularity, and the frequency domain granularity is one of preset values {2, 4}, the plurality of first resources may be determined according to the foregoing method. For example, assuming that the first precoding granularity is the frequency domain granularity, and a value of the first precoding granularity is 2, it indicates that the first precoding granularity, namely, the frequency domain granularity is two PRBs. In this case, the $n_{PRB}$ PRBs in the plurality of uplink reference signal resources may be divided into $n_{PRB}/2$ first resources. An odd-numbered first resource and an even-numbered first resource in the plurality of first resources are respectively assigned to two different downlink reference signal resources, that is, associated with the two different downlink reference signal resources.

Figure 4:
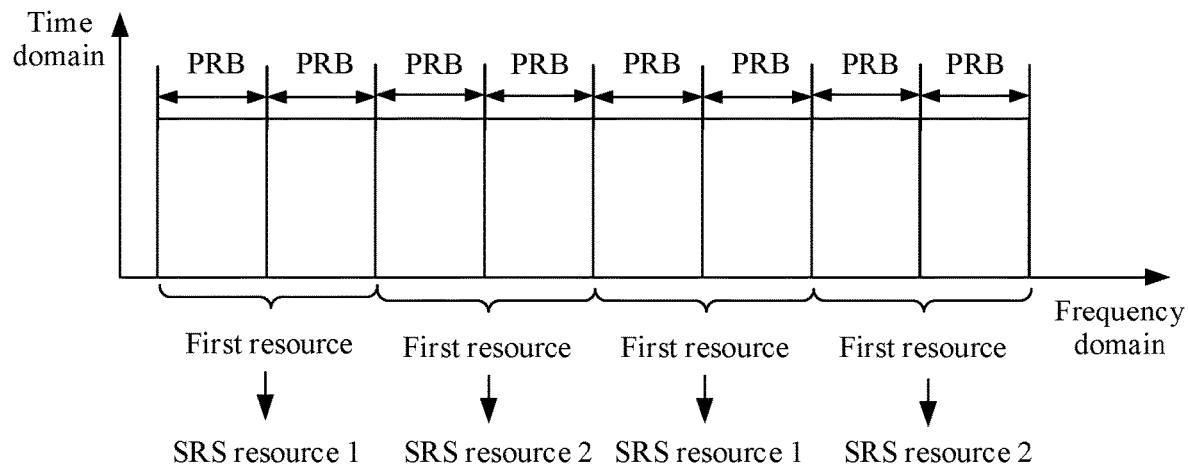
FIG. 4 and FIG. 5 each are a schematic diagram of a plurality of first resources in an uplink reference signal resource that are determined according to a resource allocation rule.

FIG. 4 shows downlink reference signal resources that correspond to the plurality of first resources in the uplink reference signal resources and that are determined according to the FDRA rule. FIG. 4 shows eight PRBs, that is, $n_{PRB}$ is, for example, 8. If the value of the first precoding granularity is 2, every two PRBs are one first resource. The figure shows four first resources in total. An odd-numbered first resource belongs to an SRS resource 1 and corresponds to an NZP CSI-RS resource 1, and an even-numbered first resource block belongs to an SRS resource 2 and corresponds to an NZP CSI-RS resource 2. It can be learned that the first resource belonging to the SRS resource 1 and the first resource belonging to the SRS resource 2 are alternately arranged in frequency domain, to form a plurality of periodicities. Although FIG. 4 shows only the eight PRBs and two periodicities, this should not constitute any limitation on this application. A quantity of PRBs included in the uplink reference signal resource, a quantity of PRBs included in the first precoding granularity, and a quantity of periodicities are not limited in this application.

In a possible case, each downlink reference signal resource corresponds to one network device, and an uplink reference signal resource associated with each downlink reference signal resource also corresponds to one network device. When the SRS resource 1 corresponds to one network device and the SRS resource 2 corresponds to another network device, distribution of the first resources is equivalent to cycling of the two network devices in frequency domain, and there are a plurality of cycling periodicities.

In another possible design, when the first precoding granularity is the frequency domain granularity, and the frequency domain granularity is defined as "wideband", the first $\lceil n_{PRB}/2 \rceil$ PRBs in the uplink reference signal resource are assigned to one downlink reference signal resource, that is, associated with the downlink reference signal resource; and remaining PRBs are assigned to another downlink reference signal resource, that is, associated with the another downlink reference signal resource. Because there is a correspondence between the downlink reference signal resource and the uplink reference signal resource, the terminal device may determine that the first $\lceil n_{PRB}/2 \rceil$ PRBs are one first resource, and belong to one uplink reference signal resource, and the remaining PRBs are one first resource, and belongs to another uplink reference signal resource.

Figure 5:
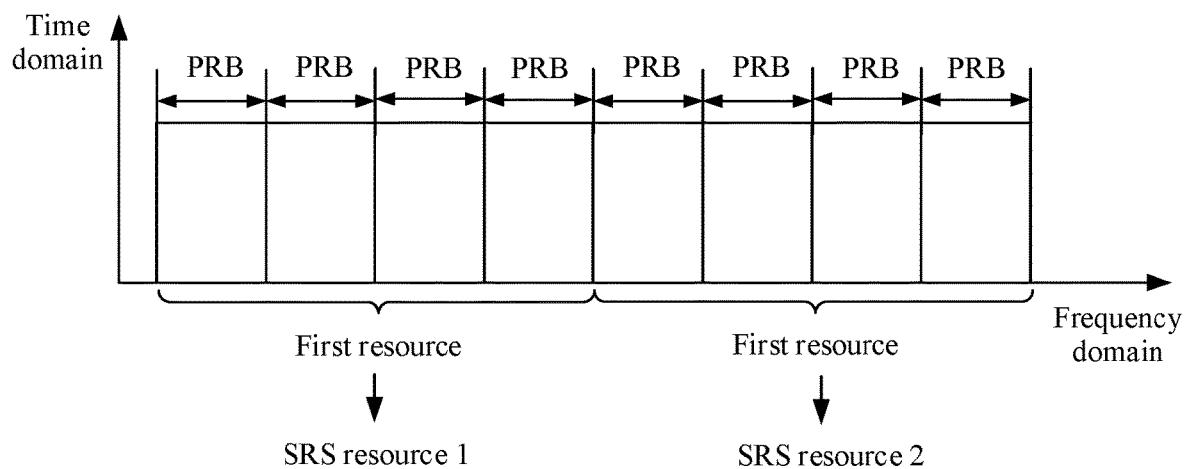

FIG. 5 shows downlink reference signal resources that correspond to the plurality of first resources in the uplink reference signal resources and that are determined according to the FDRA rule. FIG. 5 shows eight PRBs, that is, $n_{PRB}$ is, for example, 8. If the value of the first precoding granularity is wideband, the first four PRBs are one first resource, and the last four PRBs are one first resource. The figure shows two first resources in total. The former first resource belongs to an SRS resource 1 and corresponds to an NZP CSI-RS resource 1, and the latter first resource belongs to an SRS resource 2 and corresponds to an NZP CSI-RS resource 2. The SRS resource 1 and the SRS resource 2 are sequentially arranged in frequency domain, which may also be considered as alternate arrangement in one periodicity. Although FIG. 5 shows only the eight PRBs and the two first resources, this should not constitute any limitation on this application. A quantity of PRBs included in the uplink reference signal resource and the first precoding granularity are not limited in this application.

In a possible case, each downlink reference signal resource corresponds to one network device, and an uplink reference signal resource associated with each downlink reference signal resource also corresponds to one network device. When the SRS resource 1 corresponds to one network device and the SRS resource 2 corresponds to another network device, distribution of the first resources is equivalent to cycling of the two network devices in frequency domain. A difference from the example in FIG. 4 lies in that in this example, there is one cycling periodicity.

It should be noted that different downlink reference signal resources may alternatively correspond to a same network device, that is, sent by the same network device.

If the first precoding granularity is the time domain granularity, the terminal device may determine, with reference to the TDRA rule, the downlink reference signal resources corresponding to the plurality of first resources used to carry the uplink reference signal.

In a possible design, when the first precoding granularity is the time domain granularity, first, areas occupied by the plurality of uplink reference signal resources may be divided into a plurality of first resources based on the first precoding granularity, and each first resource corresponds to the first precoding granularity in time domain. Then, each first resource may be assigned to one downlink reference signal resource. For example, an odd-numbered first resource block is assigned to one downlink reference signal resource, and an even-numbered first resource block is assigned to another downlink reference signal resource. Because there is a correspondence between the downlink reference signal resource and the uplink reference signal resource, the terminal device may determine that the odd-numbered first resource belongs to one uplink reference signal resource, and the even-numbered first resource belongs to another uplink reference signal resource.

The first precoding granularity may be a slot-level granularity. For example, the first precoding granularity includes one or more slots, which are also referred to as a slot group, where each slot group includes one or more slots. Alternatively, the first precoding granularity may be an OFDM symbol-level granularity. For example, the first precoding granularity includes one or more OFDM symbols, which are also referred to as an OFDM symbol group, where each OFDM symbol group includes one or more OFDM symbols.

In another possible design, when the first precoding granularity is the time domain granularity, areas occupied by the plurality of uplink reference signal resources may alternatively be divided into two halves, the first half is assigned to one downlink reference signal resource, and the second half is assigned to another downlink reference signal resource. Because there is a correspondence between the downlink reference signal resource and the uplink reference signal resource, the terminal device may determine that the first half of resources belongs to one uplink reference signal resource, and the second half of resources belongs to another uplink reference signal resource. In this case, a same frequency domain resource is multiplexed for the two uplink reference signal resources in the resource multiplexing manner of TDM. Each uplink reference signal resource may be used as one first resource.

It should be understood that, for an accompanying drawing of determining, according to the TDRA rule, the downlink reference signal resources corresponding to the plurality of first resources, refer to the foregoing accompanying drawing of determining, according to the FDRA rule, the downlink reference signal resources corresponding to the plurality of first resources. For brevity, the accompanying drawings are not described one by one herein.

It should be further understood that, only for ease of understanding, the foregoing shows several examples of cycling of two SRS resources in frequency domain or time domain. However, the resource allocation rule is not limited thereto. For example, the terminal device may alternatively determine, according to a rule such as random selection, the downlink reference signal resource corresponding to each first resource. In this case, the SRS resource to which the first resource belongs is not necessarily cycled in frequency domain or time domain. For brevity, the accompanying drawings are not described one by one herein.

Optionally, the method further includes: Step 203: The terminal device receives indication information of the resource allocation rule. Correspondingly, in operation 203, the network device sends the indication information of the resource allocation rule.

For example, the indication information of the resource allocation rule may be sent by the network device #1 and/or the network device #2 shown in FIG. 3A and FIG. 3B. This is not limited in this application.

In an implementation, the network device and the terminal device may pre-agree on an indication bit corresponding to each resource allocation rule, and the network device may send, to the terminal device, the indication bit corresponding to the currently used resource allocation rule that is determined, so that the terminal device performs the operation in operation 201 according to the corresponding resource allocation rule.

Optionally, the resource allocation rule is predefined. For example, the resource allocation rule may be predefined in a protocol. As shown in the foregoing example with reference to FDRA and TDRA, when the first precoding granularity meets different conditions, the terminal device may perform the operation in operation 201 according to a corresponding resource allocation rule.

Step 204: The terminal device determines, based on the downlink reference signal resource corresponding to each first resource, a precoding matrix corresponding to each first resource.

In this embodiment of this application, the terminal device may determine, based on measurement of the downlink reference signal resource corresponding to each first resource, the precoding matrix corresponding to each resource. Therefore, the terminal device may determine a plurality of precoding matrices used for uplink reference signal transmission, and there is a correspondence between the plurality of precoding matrices and the plurality of downlink reference signal resources.

Specifically, the terminal device performs channel measurement based on a downlink reference signal received on each of the plurality of downlink reference signal resources, and may determine the precoding matrix corresponding to the downlink reference signal resource. The precoding matrix may be used to precode an uplink reference signal carried on an uplink reference signal resource corresponding to the downlink reference signal resource.

When one downlink reference signal resource corresponds to one uplink reference signal resource, one precoding matrix may be determined based on measurement of the downlink reference signal resource, that is, a rank is 1. When one downlink reference signal resource corresponds to a plurality of uplink reference signal resources, a plurality of precoding matrices may be determined based on measurement of the downlink reference signal resource, that is, a rank is greater than 1.

For example, a downlink reference signal resource 1 corresponds to an uplink reference signal resource 1, and a downlink reference signal resource 2 corresponds to an uplink reference signal resource 2. A precoding matrix determined by the terminal device based on measurement of the downlink reference signal resource 1 is denoted as a precoding matrix 1, and a precoding matrix determined by the terminal device based on measurement of the downlink reference signal resource 2 is denoted as a precoding matrix 2. In this case, the terminal device may determine that a precoding matrix corresponding to a first resource that belongs to the uplink reference signal resource 1 is the precoding matrix 1, and a precoding matrix corresponding to a first resource that belongs to the uplink reference signal resource 2 is the precoding matrix 2.

Figure 6:
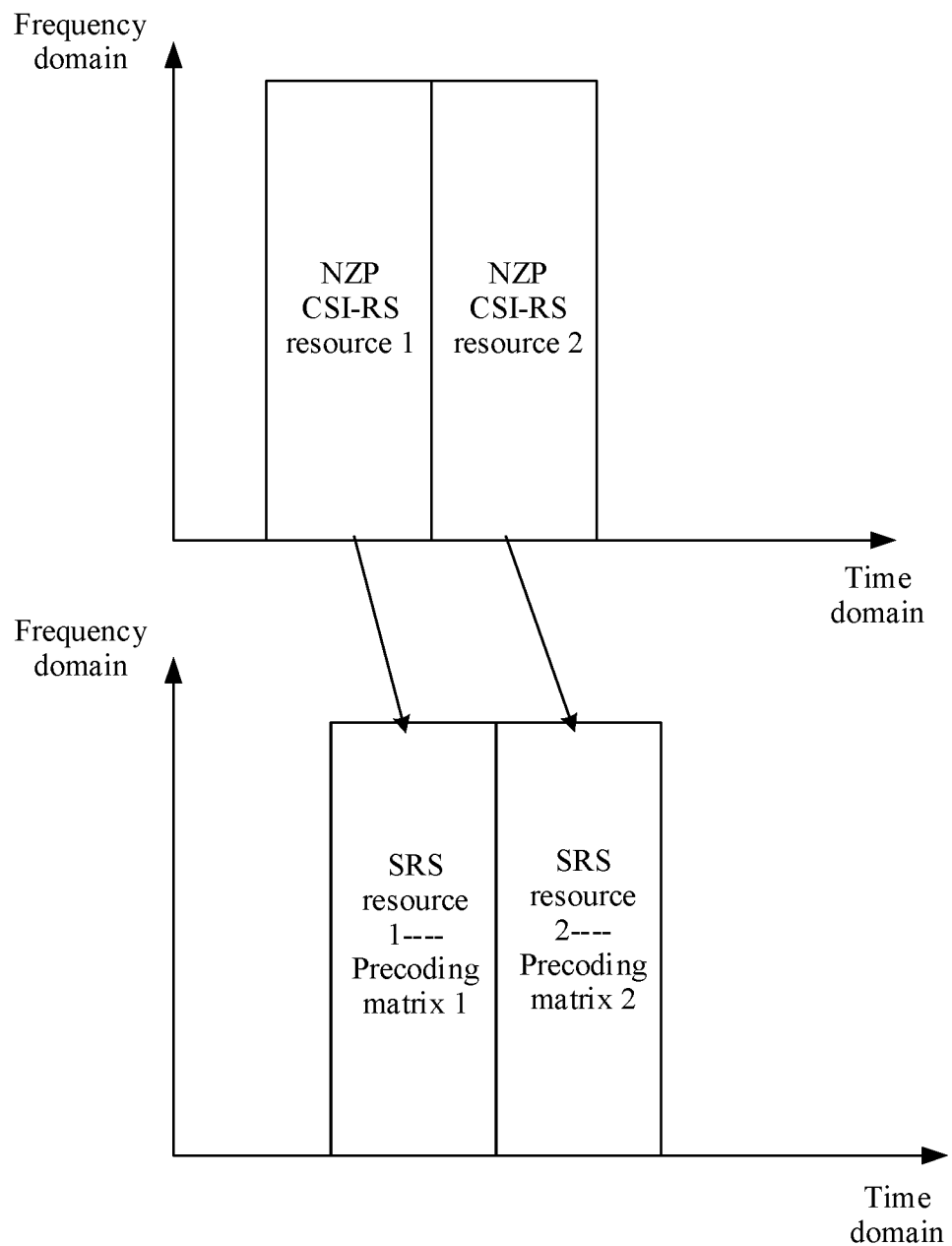
FIG. 6 to FIG. 8 each are a schematic diagram of a correspondence between a plurality of downlink reference signal resources, a plurality of precoding matrices, and a plurality of first resources.

FIG. 6 shows an example of a correspondence between a plurality of downlink reference signal resources, a plurality of precoding matrices, and a plurality of first resources. FIG. 6 shows two NZP CSI-RS resources, including an NZP CSI-RS resource 1 and an NZP CSI-RS resource 2. The NZP CSI-RS resource 1 corresponds to an SRS resource 1, and the NZP CSI-RS resource 2 corresponds to an SRS resource 2. In other words, each downlink reference signal resource corresponds to one uplink reference signal resource, and a rank is 1.

In the figure, the SRS resource 1 and the SRS resource 2 are used as two different first resources and are sequentially arranged in time domain. In other words, a first precoding granularity of the SRS resource shown in FIG. 6 is one SRS resource. To be specific, each SRS resource is one first resource and corresponds to a same precoding matrix.

A precoding matrix determined by the terminal device based on measurement of the NZP CSI-RS resource 1 is, for example, denoted as a precoding matrix 1, and a precoding matrix determined by the terminal device based on measurement of the NZP CSI-RS resource 2 is, for example, denoted as a precoding matrix 2. Therefore, it may be determined that the precoding matrix 1 corresponds to the SRS resource 1, and may be used to precode an SRS carried on the SRS resource 1, and the precoding matrix 2 corresponds to the SRS resource 2, and may be used to precode an SRS carried on the SRS resource 2. It may be understood that a correspondence between a plurality of SRS resources and a plurality of precoding matrices shown in FIG. 6 is the correspondence between the plurality of first resources and the plurality of precoding matrices. It can be learned that the precoding matrix 1 and the precoding matrix 2 in FIG. 6 may be used to alternately precode SRSs carried on different SRS resources, that is, a quantity of cycling times is 1. A cycling granularity is the first precoding granularity.

Figure 7:
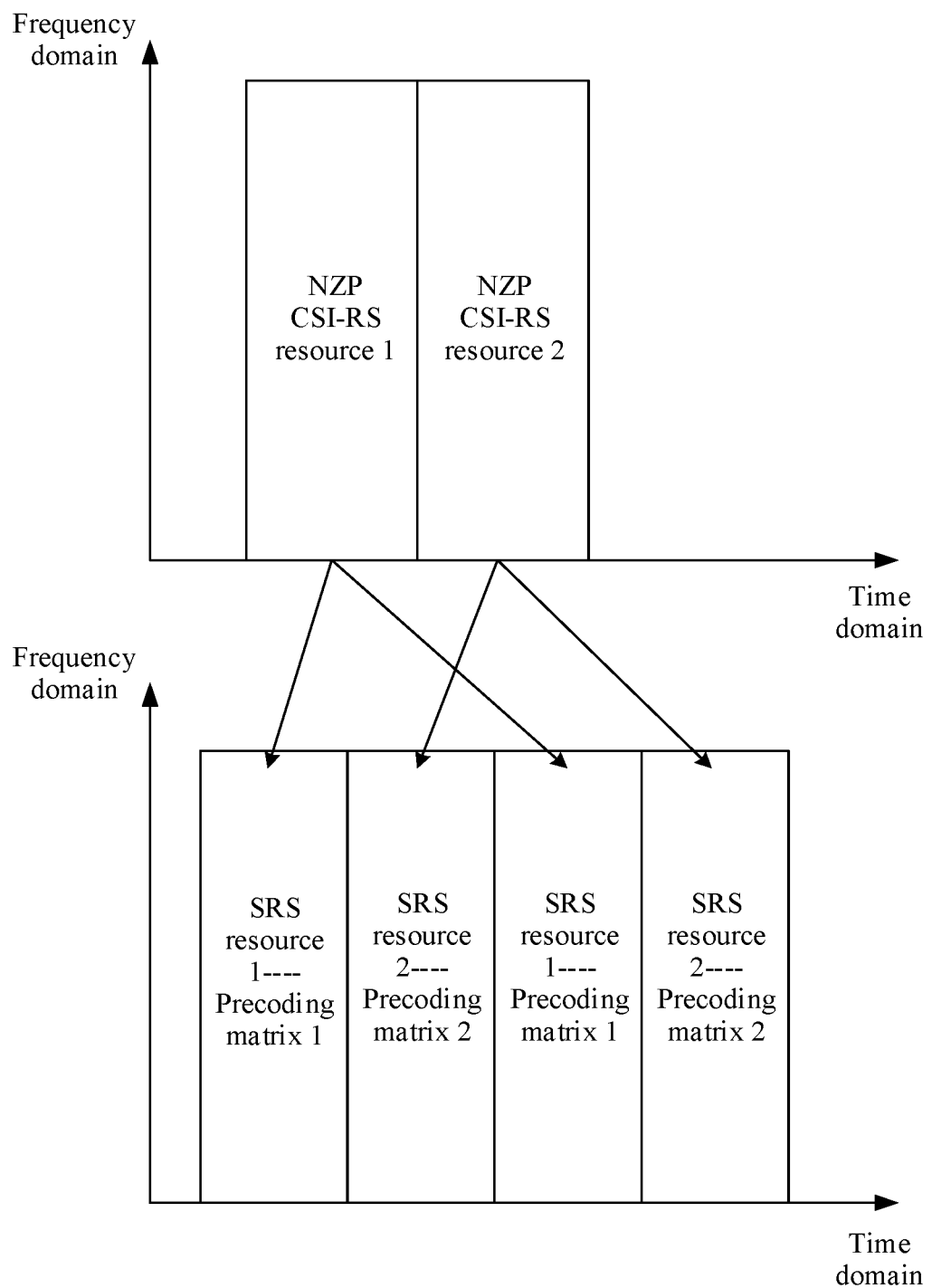

FIG. 7 shows another example of a correspondence between a plurality of downlink reference signal resources, a plurality of precoding matrices, and a plurality of first resources. FIG. 7 shows two NZP CSI-RS resources, including an NZP CSI-RS resource 1 and an NZP CSI-RS resource 2. The NZP CSI-RS resource 1 corresponds to an SRS resource 1, and the NZP CSI-RS resource 2 corresponds to an SRS resource 2. A rank is still 1.

A difference from what is shown in FIG. 6 lies in that, a first precoding granularity of the SRS resource shown in FIG. 7 is less than one SRS resource. The SRS resource 1 and The SRS resource 2 in the figure each are divided into a plurality of first resources, and the first resources in the SRS resource 1 and the SRS resource 2 are alternately distributed in time domain. Although only two first resources belonging to the SRS resource 1 and two first resources belonging to the SRS resource 2 are shown in the figure, this is merely an example for ease of understanding, and should not constitute any limitation on this application. A quantity of first resources included in each SRS resource is not limited in this application.

A precoding matrix determined by the terminal device based on measurement of the NZP CSI-RS resource 1 is, for example, denoted as a precoding matrix 1, and a precoding matrix determined by the terminal device based on measurement of the NZP CSI-RS resource 2 is, for example, denoted as a precoding matrix 2. Therefore, it may be determined that the precoding matrix 1 corresponds to the SRS resource 1, and may be used to precode an SRS carried on the SRS resource 1, and the precoding matrix 2 corresponds to the SRS resource 2, and may be used to precode an SRS carried on the SRS resource 2. It may be understood that each SRS resource in FIG. 7 includes a plurality of first resources. The terminal device determines a correspondence between the SRS resource and the precoding matrix, that is, determines a correspondence between each first resource in the SRS resource and the precoding matrix. It can be learned that the precoding matrix 1 and the precoding matrix 2 in FIG. 7 are cycled for a plurality of times based on a size of the first resource as a granularity, that is, the first precoding granularity is a cycling granularity.

For another example, a downlink reference signal resource 1 corresponds to an uplink reference signal resource 1 and an uplink reference signal resource 2. Precoding matrices determined by the terminal device based on measurement of the downlink reference signal resource 1 are denoted as a precoding matrix 1 and a precoding matrix 2. In this case, the terminal device may determine that a precoding matrix corresponding to a first resource that belongs to the uplink reference signal resource 1 is the precoding matrix 1 or the precoding matrix 2, and a precoding matrix corresponding to a first resource that belongs to the uplink reference signal resource 2 is also the precoding matrix 1 or the precoding matrix 2. For the first resource in each uplink reference signal resource, the terminal device may further determine, according to a precoding selection rule, a precoding matrix corresponding to the first resource in each uplink reference signal resource.

Optionally, operation 204 further includes: The terminal device determines, according to the precoding selection rule, the precoding matrix corresponding to each first resource.

Herein, the precoding selection rule may include but is not limited to a rule such as precoder cycling, random selection, or throughput maximization. For ease of understanding, the following describes the foregoing precoding selection rule with reference to the correspondence between the first resource and the precoding matrix in this embodiment of this application.

Precoder cycling may mean that at least two predetermined precoding matrices correspond to at least two first resources, and signals carried on the at least two first resources are alternately precoded by using the at least two precoding matrices, so that the precoding matrices for the signals carried on the at least two first resources are periodically arranged. For example, the plurality of first resources include a resource #1 to a resource #2N that are sequentially arranged in time domain or frequency domain, and uplink reference signals on the plurality of first resources may be precoded by using the precoding matrix 1 and the precoding matrix 2. For example, an odd-numbered resource may correspond to the precoding matrix 1, and an even-numbered resource may correspond to the precoding matrix 2, so that periodic arrangement such as the precoding matrix 1, the precoding matrix 2, the precoding matrix 1, the precoding matrix 2, . . . is presented in time domain or frequency domain.

It may be understood that if the precoding matrix 1 is determined based on measurement of the downlink reference signal resource 1 sent by the network device #1, and the precoding matrix 2 is determined based on measurement of the downlink reference signal resource 2 sent by the network device #2, a precoder cycling process is equivalent to a network device cycling process. To be specific, the resource #1 to the resource #2N are alternately used to send uplink reference signals to the network device #1 and the network device #2 in a unit of the first precoding granularity.

Random selection may mean that for each first resource, one precoding matrix is randomly selected from a plurality of predetermined precoding matrices to correspond to the first resource. The plurality of precoding matrices may be precoding matrices determined based on measurement of a plurality of downlink reference signal resources.

For example, the plurality of predetermined precoding matrices include the precoding matrix 1 and the precoding matrix 2, the precoding matrix 1 is determined based on measurement of the downlink reference signal resource 1 sent by the network device #1, and the precoding matrix 2 is determined based on the downlink reference signal resource 2 sent by the network device #2. In this case, for each first resource, one precoding matrix is randomly selected from the plurality of precoding matrices, that is, one of the network device #1 and the network device #2 is randomly selected. In other words, the plurality of first resources are randomly allocated to the network device #1 or the network device #2, to send the uplink reference signals to the network device #1 and the network device #2.

Throughput maximization may mean that a precoding matrix is determined to maximize a throughput at the first precoding granularity. In this embodiment, for each first resource, a precoding matrix that can enable a throughput on the first resource to reach a maximum may be determined from one or more predetermined precoding matrices to correspond to the first resource.

For example, the plurality of predetermined precoding matrices include the precoding matrix 1 and the precoding matrix 2, the precoding matrix 1 is determined based on measurement of the downlink reference signal resource 1 sent by the network device #1, and the precoding matrix 2 is determined based on the downlink reference signal resource 2 sent by the network device #2. In this case, for each first resource, determining the precoding matrix used to obtain a maximum throughput from the plurality of precoding matrices may be selecting one of the precoding matrix 1 and the precoding matrix 2, so that the throughput on the first resource reaches the maximum. In other words, whether each first resource is allocated to the network device #1 or the network device #2 is determined, to send the uplink reference signals to the network device #1 and the network device #2.

The foregoing plurality of precoding selection rules may be separately used, or may be used in combination. For example, precoder cycling is combined with random precoding selection, or precoder cycling is combined with throughput maximization.

In addition to the foregoing listed rules, for example, the precoding selection rule may further include: sequentially using, based on eigenvalues, corresponding eigenvectors for a plurality of uplink reference signal resources corresponding to a same downlink reference signal resource.

It should be understood that the foregoing listed precoding selection rules are merely examples, and should not constitute any limitation on this application. The precoding selection rule is not limited in this application.

Figure 8:
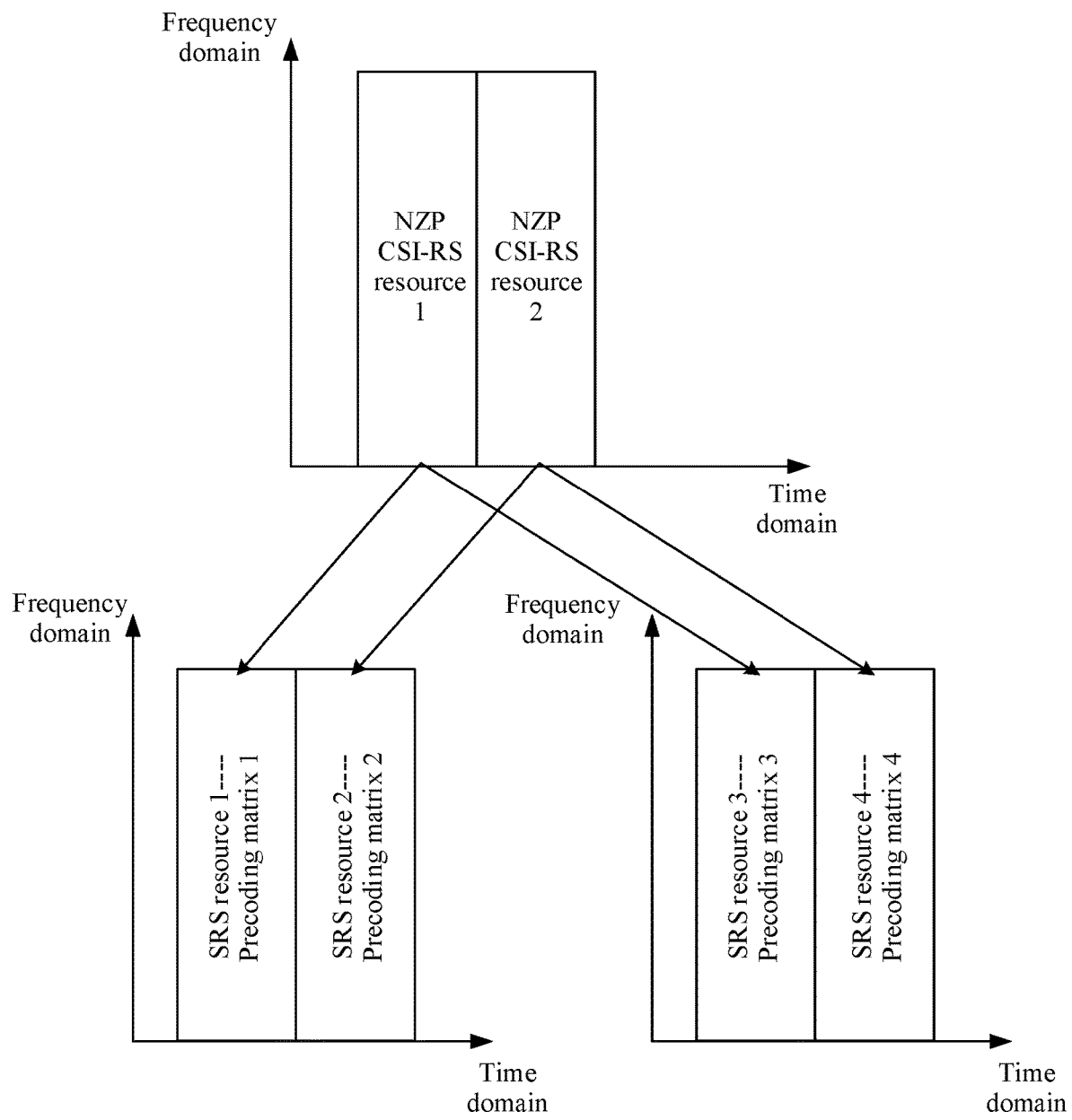

FIG. 8 shows still another example of a correspondence between a plurality of downlink reference signal resources, a plurality of precoding matrices, and a plurality of first resources. FIG. 8 shows two NZP CSI-RS resources, including an NZP CSI-RS resource 1 and an NZP CSI-RS resource 2. The NZP CSI-RS resource 1 corresponds to an SRS resource 1 and an SRS resource 3, and the NZP CSI-RS resource 2 corresponds to an SRS resource 2 and an SRS resource 4. In other words, each downlink reference signal resource corresponds to two uplink reference signal resources, and a rank is 2.

In the figure, the SRS resource 1 and the SRS resource 2 are used as two different first resources and are sequentially arranged in time domain, and the SRS resource 3 and the SRS resource 4 are used as two different first resources and are sequentially arranged in time domain. In other words, a first precoding granularity of the SRS resource shown in FIG. 8 is one SRS resource. To be specific, each SRS resource is one first resource and corresponds to a same precoding matrix.

It should be understood that a time-frequency area occupied by the SRS resource 1 and the SRS resource 2 that are used as a resource entirety may overlap or not overlap a time-frequency area occupied by the SRS resource 3 and the SRS resource 4 that are used as a resource entirety. A measurement resource corresponding to the SRS resource 1 and the SRS resource 2 that are used as a resource entirety may overlap or do not overlap a measurement resource corresponding to the SRS resource 3 and the SRS resource 4 that are used as a resource entirety. This is not limited in this application. It may be understood that when time-frequency areas occupied by two resource entireties overlap, resource multiplexing may be performed in a code division manner. When measurement resources corresponding to the two resource entireties overlap, resource multiplexing may be performed in a time division, frequency division, or code division manner.

In a possible case, the time-frequency areas occupied by the two resource entireties may be distinguished in the time division or frequency division manner, and the measurement resources corresponding to the two resource entireties may overlap. Therefore, it may be considered that the measurement resources are multiplexed for the two resource entireties in the time division or frequency division manner.

Figure 9:
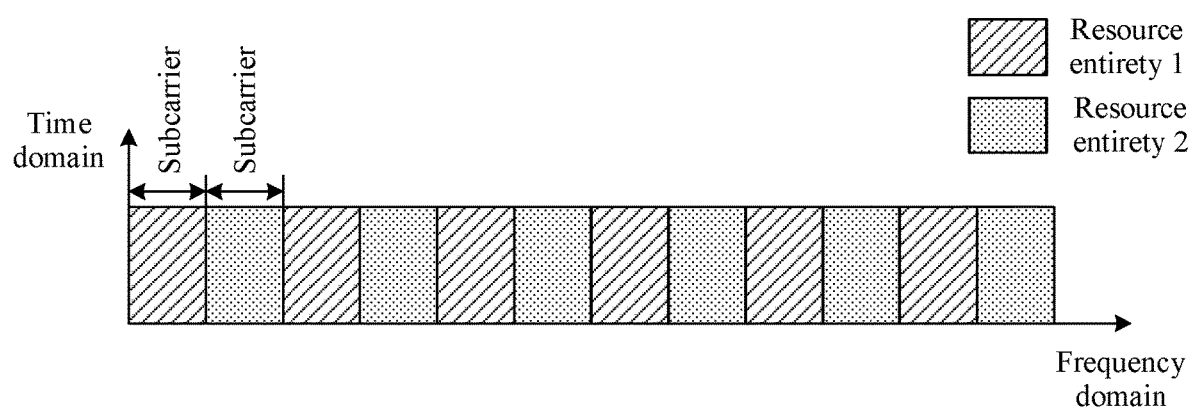
FIG. 9 is a schematic diagram in which an SRS resource 1 and an SRS resource 2 are used as a resource entirety, and an SRS resource 3 and an SRS resource 4 are used as a resource entirety.

For ease of understanding, FIG. 9 is used for further description herein. As shown in FIG. 9, an SRS resource 1 and an SRS resource 2 are used as a resource entirety, and occupy an odd-numbered subcarrier in frequency domain, as shown by a resource entirety 1 in the figure; and an SRS resource 3 and an SRS resource 4 are used as a resource entirety, and occupy an even-numbered subcarrier in frequency domain, as shown by a resource entirety 2 in the figure. It can be learned that the SRS resource 1 and the SRS resource 2 are used as a resource entirety and are distributed in a comb shape, and the SRS resource 3 and the SRS resource 4 are used as a resource entirety and are also distributed in a comb shape. However, the two resource entireties are exactly arranged in a staggered manner. Therefore, it may be considered that the two resource entireties do not overlap each other. However, in some possible designs, during measurement, the network device may use a frequency band spanned by each resource entirety as one measurement bandwidth for measurement. In this case, it may be considered that measurement bandwidths corresponding to the two resource entireties overlap, and measurement resources are multiplexed for the two resource entireties in the frequency division manner.

An example in which the measurement resources are multiplexed for the two resource entireties shown in FIG. 9 in the frequency division manner is merely shown for ease of understanding. The measurement resources may alternatively be multiplexed for the two resource entireties in the time division manner. A person skilled in the art may perform equivalent transformation based on the example in FIG. 9 to obtain two time division multiplexed resource entireties.

Based on the foregoing design, the network device may measure two layers based on at least partially overlapping time domain and/or frequency domain resources. Therefore, this helps obtain a more accurate signal-to-noise ratio (SNR), and further determine an appropriate MCS.

In another possible case, time-frequency areas occupied by the two resource entireties overlap, and a same time-frequency area is multiplexed for the two resource entireties in the code division manner. In this case, measurement resources corresponding to the two resource entireties also overlap. For brevity, no additional figure is provided herein for description.

It is assumed that precoding matrices determined by the terminal device based on measurement of an NZP CSI-RS resource 1 are, for example, denoted as a precoding matrix 1 and a precoding matrix 3, and precoding matrices determined by the terminal device based on measurement of an NZP CSI-RS resource 2 are, for example, denoted as a precoding matrix 2 and a precoding matrix 4. The terminal device may determine, according to the foregoing listed precoding selection rule, a precoding matrix corresponding to each first resource.

For example, based on eigenvalues, the terminal device may use a stronger eigenvector in eigenvectors determined based on measurement of the NZP CSI-RS resource 1 for a $1^{st}$ SRS resource associated with the NZP CSI-RS resource 1, namely, the SRS resource 1, and use a weaker eigenvector for a $2^{nd}$ SRS resource associated with the NZP CSI-RS resource 1, namely, the SRS resource 3. If an eigenvalue corresponding to the precoding matrix 1 is greater than an eigenvalue corresponding to the precoding matrix 3, it may be considered that the precoding matrix 1 is stronger, may correspond to the SRS resource 1, and is used to precode an SRS carried on the SRS resource 1; and the precoding matrix 3 is weaker, may correspond to the SRS resource 3, and is used to precode an SRS carried on the SRS resource 3.

For the SRS resource 2 and the SRS resource 4 that are associated with the NZP CSI-RS resource 2, a precoding matrix corresponding to each of the SRS resource 2 and the SRS resource 4 may also be determined by using the foregoing same method. A correspondence between each SRS resource and the precoding matrix is shown in FIG. 8.

It may be understood that a correspondence between a plurality of SRS resources and a plurality of precoding matrices shown in FIG. 8 is the correspondence between the plurality of first resources and the plurality of precoding matrices. It can be learned that the precoding matrix 1 and the precoding matrix 2 may be used to alternately precode SRSs at one layer, and the precoding matrix 3 and the precoding matrix 4 may be used to alternately precode SRSs at another layer, that is, a quantity of cycling times is 1. Each SRS resource may correspond to one precoding matrix, that is, a cycling granularity is one SRS resource, that is, the cycling granularity is the first precoding granularity.

For another example, the terminal device may randomly select, according to the random selection rule from the precoding matrix determined based on measurement of each NZP CSI-RS resource, one precoding matrix used for the SRS resource associated with each NZP CSI-RS resource. For example, one of the precoding matrix 1 and the precoding matrix 3 is randomly selected to correspond to the SRS resource 1, and is used to precode an SRS carried on the SRS resource 1, and one of the precoding matrix 1 and the precoding matrix 3 is randomly selected to correspond to the SRS resource 3, and is used to precode an SRS carried on the SRS resource 3. One of the precoding matrix 2 and the precoding matrix 4 is randomly selected to correspond to the SRS resource 2, and is used to precode an SRS carried on the SRS resource 2, and one of the precoding matrix 2 and the precoding matrix 4 is randomly selected to correspond to the SRS resource 4, and is used to precode an SRS carried on the SRS resource 4.

Although not shown in the figure, it may be understood that the precoding matrix corresponding to the SRS resource 1 and the precoding matrix corresponding to the SRS resource 3 may be a same precoding matrix. For example, the SRS resources both correspond to the precoding matrix 1 or both correspond to the precoding matrix 3. Alternatively, the precoding matrices may be different precoding matrices. For example, one SRS resource corresponds to the precoding matrix 1, and the other SRS resource corresponds to the precoding matrix 3. The precoding matrix corresponding to the SRS resource 2 and the precoding matrix corresponding to the SRS resource 4 may be a same precoding matrix. For example, the SRS resources both correspond to the precoding matrix 2 or both correspond to the precoding matrix 4. Alternatively, the precoding matrices may be different precoding matrices. For example, one SRS resource corresponds to the precoding matrix 2, and the other SRS resource corresponds to the precoding matrix 4.

Certainly, the terminal device may alternatively determine, according to another precoding selection rule, the precoding matrix corresponding to each SRS resource. For brevity, examples are not listed one by one herein.

Figure 10:
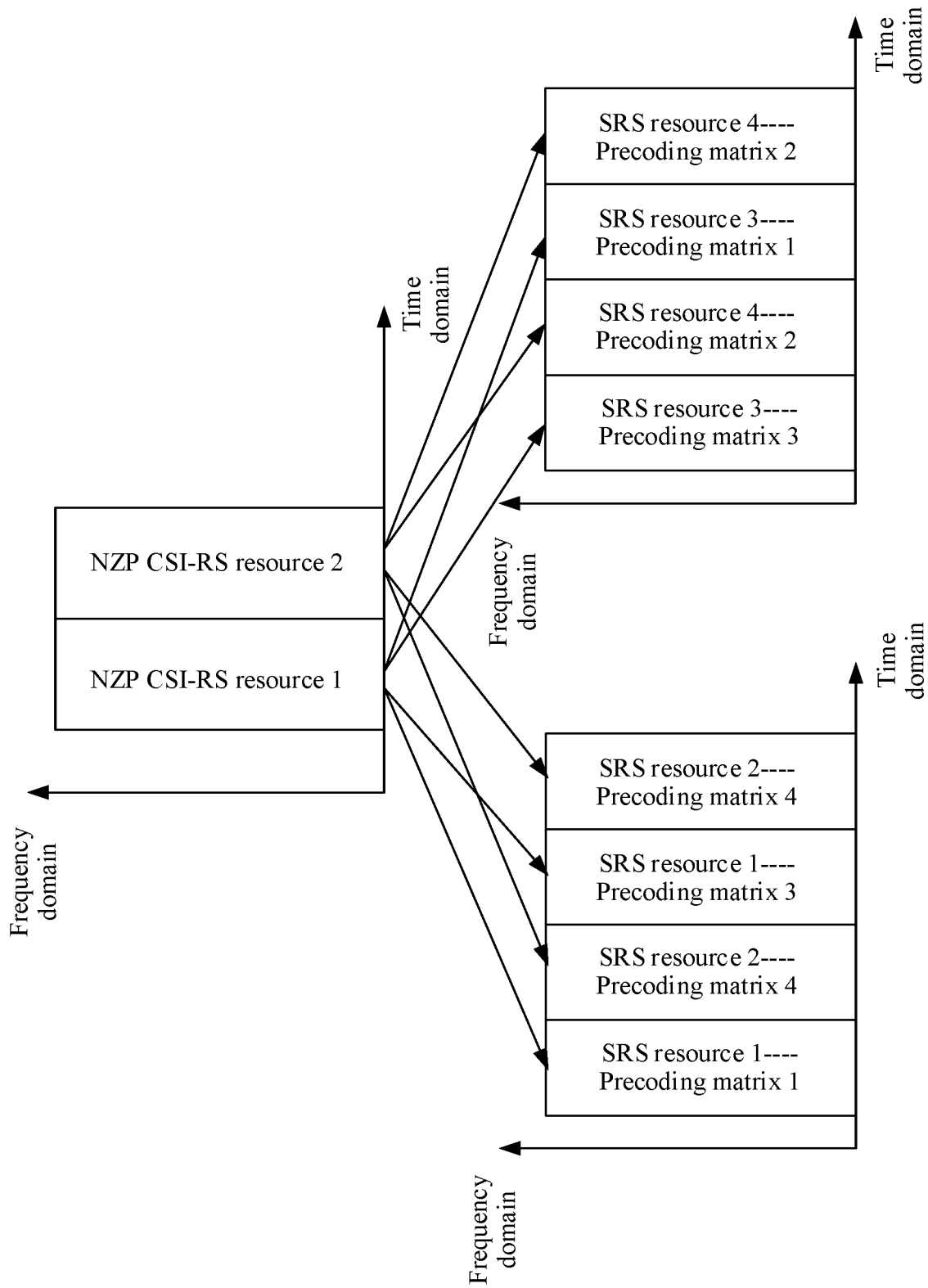
FIG. 10 and FIG. 11 each are a schematic diagram of a correspondence between a plurality of downlink reference signal resources, a plurality of precoding matrices, and a plurality of first resources.
Figure 11:
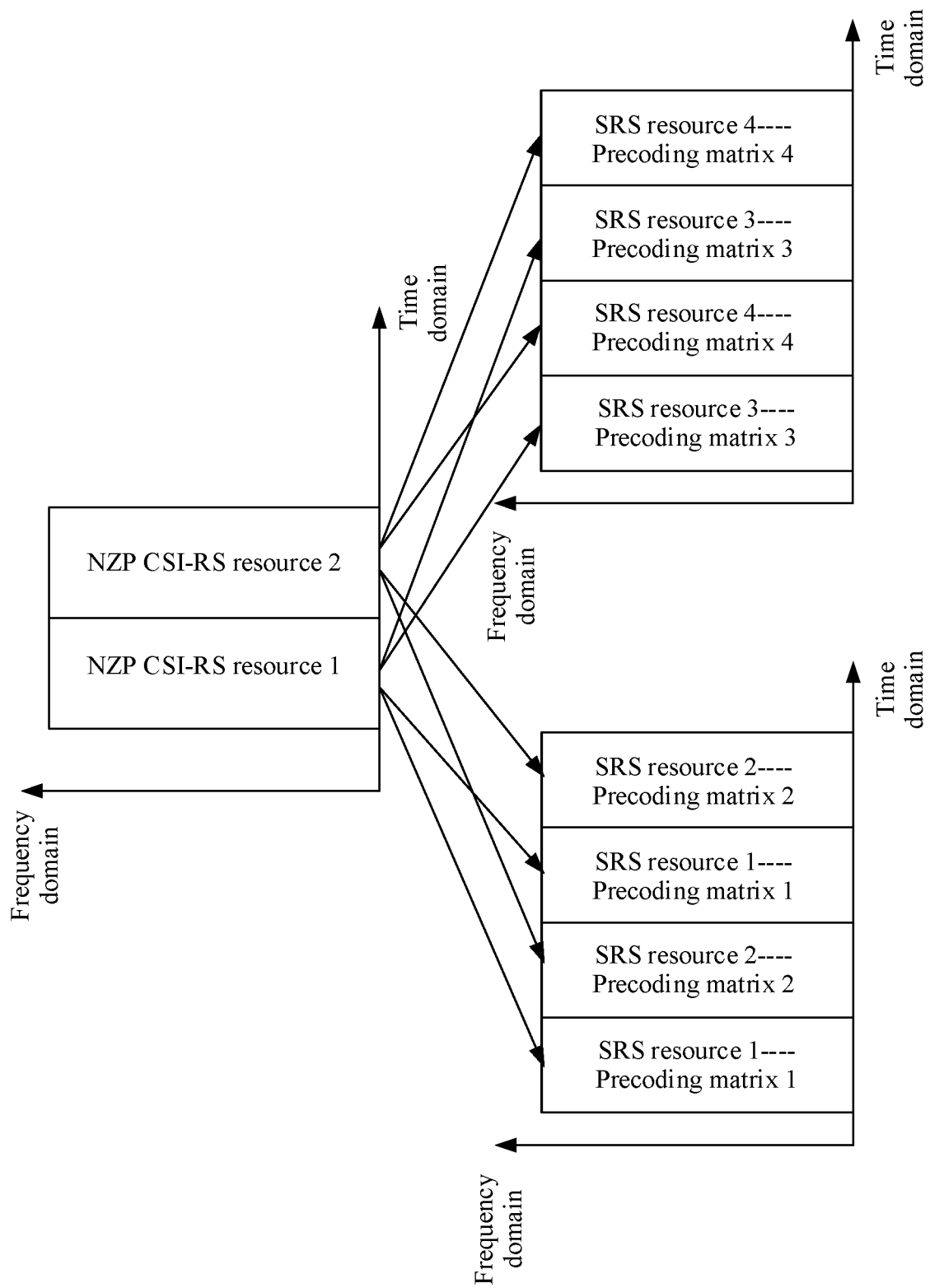

FIG. 10 and FIG. 11 shows another two examples of correspondences between a plurality of downlink reference signal resources, a plurality of precoding matrices, and a plurality of first resources. FIG. 10 and FIG. 11 each show two NZP CSI-RS resources, including an NZP CSI-RS resource 1 and an NZP CSI-RS resource 2. The NZP CSI-RS resource 1 corresponds to an SRS resource 1 and an SRS resource 3, and the NZP CSI-RS resource 2 corresponds to an SRS resource 2 and an SRS resource 4. A rank is still 2.

A difference from what is shown in FIG. 8 lies in that, a first precoding granularity of the SRS resource shown in each of FIG. 10 and FIG. 11 is less than one SRS resource. Each SRS resource in the figure is divided into a plurality of first resources, first resources in the SRS resource 1 and the SRS resource 2 are alternately arranged in time domain, and first resources in the SRS resource 3 and the SRS resource 4 are also alternately arranged in time domain. Although only two first resources belonging to each SRS resource are shown in the figure, this is merely an example for ease of understanding, and should not constitute any limitation on this application. A quantity of first resources included in each SRS resource is not limited in this application.

It should be understood that for a relationship between a time-frequency area occupied by the SRS resource 1 and the SRS resource 2 that are used as a resource entirety and a time-frequency resource occupied by the SRS resource 3 and the SRS resource 4 that are used as a resource entirety, and a relationship between measurement resources corresponding to the SRS resources, refer to foregoing related descriptions with reference to FIG. 9. For brevity, details are not described herein again.

It is assumed that precoding matrices determined by the terminal device based on measurement of the NZP CSI-RS resource 1 are, for example, denoted as a precoding matrix 1 and a precoding matrix 3, and precoding matrices determined by the terminal device based on measurement of the NZP CSI-RS resource 2 are, for example, denoted as a precoding matrix 2 and a precoding matrix 4. The terminal device may determine, according to the foregoing listed precoding selection rule, a precoding matrix corresponding to each first resource For example, the terminal device may determine, according to the random selection rule, the precoding matrix corresponding to each first resource. FIG. 9 shows an example of determining, according to the random selection rule, the precoding matrix corresponding to each first resource. The terminal device may randomly select, according to the random selection rule, one precoding matrix for each first resource to correspond to the first resource. For each first resource in the SRS resource 1 and the SRS resource 3, the terminal device may perform random selection from the precoding matrix 1 and the precoding matrix 3. As shown in FIG. 10, a $1^{st}$ first resource in the SRS resource 1 corresponds to the precoding matrix 1, and a $2^{nd}$ first resource corresponds to the precoding matrix 3; and a $1^{st}$ first resource in the SRS resource 3 corresponds to the precoding matrix 3, and a $2^{nd}$ first resource corresponds to the precoding matrix 1. For the first resources in the SRS resource 2 and the SRS resource 4, the terminal device may perform random selection from the first resource from the precoding matrix 2 and the precoding matrix 4. As shown in FIG. 10, both of the two first resources in the SRS resource 2 correspond to the precoding matrix 4, and both of the two first resources in the SRS resource 4 correspond to the precoding matrix 2. It should be understood that the correspondence between the plurality of first resources and the plurality of precoding matrices shown in FIG. 10 is merely an example, and should not constitute any limitation on this application. For example, the terminal device may alternatively map each first resource in the SRS resource 1 to the precoding matrix 1, map each first resource in the SRS resource 3 to the precoding matrix 3, map the $1^{st}$ first resource in the SRS resource 2 to the precoding matrix 2, map the $2^{nd}$ first resource in the SRS resource 2 to the precoding matrix 4, map the $1^{st}$ first resource in the SRS resource 4 to the precoding matrix 4, and map the $2^{nd}$ first resource in the SRS resource 4 to the precoding matrix 2. For brevity, examples are not listed one by one herein.

For another example, the terminal device may determine, according to the precoder cycling rule, the precoding matrix corresponding to each first resource. FIG. 11 shows an example of determining, according to the precoder cycling rule, the precoding matrix corresponding to each first resource. Because the SRS resources in FIG. 11 form an alternate arrangement pattern, the terminal device may randomly select one precoding matrix for each SRS resource to correspond to the SRS resource, so that the precoding matrix corresponding to each first resource in FIG. 11 is cycled in time domain. For each SRS resource, the precoding matrix corresponding to the SRS resource may be determined according to the random selection rule. For example, the SRS resource 1 is mapped to the precoding matrix 1, and the SRS resource 2 is mapped to the precoding matrix 2, so that the precoding matrix 1, the precoding matrix 2, the precoding matrix 1, and the precoding matrix 2 are cycled at the $1^{st}$ layer; and the SRS resource 3 is mapped to the precoding matrix 3, and the SRS resource 4 is mapped to the precoding matrix 4, so that the precoding matrix 3, the precoding matrix 4, the precoding matrix 3, and the precoding matrix 4 are cycled at the $2^{nd}$ layer, as shown in FIG. 11. It should be understood that the correspondence between the plurality of first resources and the plurality of precoding matrices shown in FIG. 11 is merely an example, and should not constitute any limitation on this application. For example, the terminal device may alternatively map the SRS resource 1 to the precoding matrix 1, and map the SRS resource 2 to the precoding matrix 4, so that the precoding matrix 1, the precoding matrix 4, the precoding matrix 1, and the precoding matrix 4 are cycled at the $1^{st}$ layer; and map the SRS resource 3 to the precoding matrix 3, and map the SRS resource 4 to the precoding matrix 2, so that the precoding matrix 3, the precoding matrix 2, the precoding matrix 3, and the precoding matrix 2 are cycled at the $2^{nd}$ layer. For brevity, examples are not listed one by one herein.

It should be understood that the correspondences between the plurality of downlink reference signal resources, the plurality of precoding matrices, and the plurality of first resources listed above with reference to the accompanying drawings are merely examples for ease of understanding, and should not constitute any limitation on this application.

For example, the precoding selection rule may be indicated by the network device in advance by using signaling. Optionally, the method further includes: Step 205: The terminal device receives indication information of the precoding selection rule. Correspondingly, in operation 205, the network device sends the indication information of the precoding selection rule.

For example, the indication information of the resource allocation rule may be sent by the network device #1 and/or the network device #2 shown in FIG. 3A and FIG. 3B This is not limited in this application.

In an implementation, the network device and the terminal device may pre-agree on an indication bit corresponding to the precoding selection rule, and the network device may send, to the terminal device, the indication bit corresponding to the currently used precoding selection rule that is determined, so that the terminal device performs the operation in operation 204 according to the corresponding precoding selection rule.

Optionally, the precoding selection rule is predefined. For example, the precoding selection rule may be predefined in a protocol. The terminal device may perform the operation in operation 204 according to the predefined precoding selection rule.

Step 206: The terminal device sends a precoded uplink reference signal. Correspondingly, in operation 206, each network device receives the precoded uplink reference signal.

The terminal device may precode, based on the precoding matrix corresponding to each first resource determined in operation 204, an uplink reference signal carried on each first resource. For example, the terminal device may precode, based on the correspondences between the first resources and the precoding matrices shown above with reference to FIG. 6 to FIG. 11, uplink reference signals mapped to different time-frequency resources, to obtain precoded uplink reference signals.

It should be understood that the terminal device may map the uplink reference signal to the time-frequency resource after precoding the uplink reference signal, or may map the uplink reference signal to the time-frequency resource before precoding the uplink reference signal. This is not limited in this application.

Figure 12:
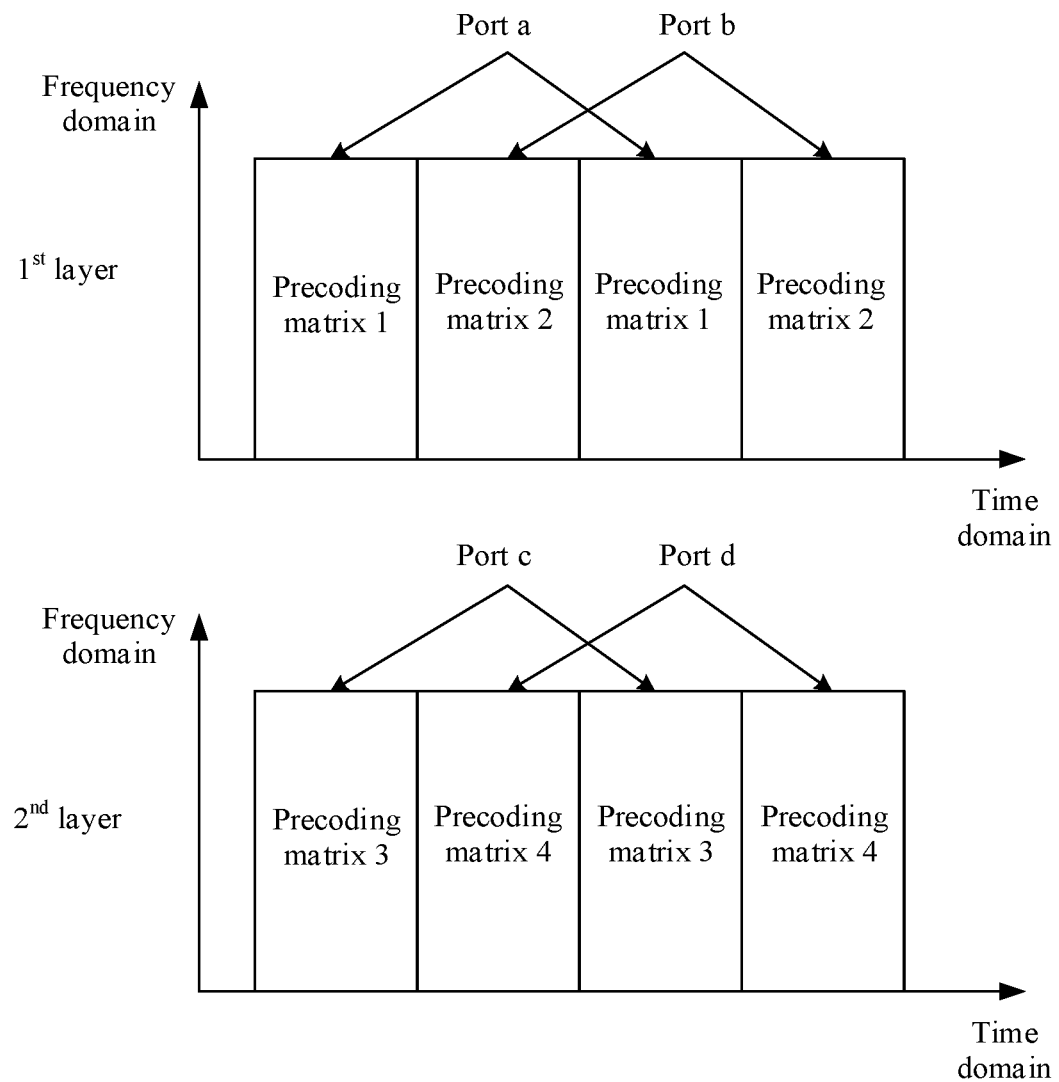
FIG. 12 is a schematic diagram of a correspondence between a plurality of first resources, a plurality of precoding matrices, and a plurality of ports.

The foregoing example described with reference to FIG. 11 is used. The terminal device may precode, based on the precoding matrix 1, an uplink reference signal mapped to the $1^{st}$ layer and an odd-numbered first resource, and precode, based on the precoding matrix 4, an uplink reference signal mapped to the $1^{st}$ layer and an even-numbered first resource. The terminal device may precode, based on the precoding matrix 3, an uplink reference signal mapped to the $2^{nd}$ layer and an odd-numbered first resource, and precode, based on the precoding matrix 4, an uplink reference signal mapped to the $2^{nd}$ layer and the even-numbered first resource. Therefore, a pattern shown in FIG. 12 is formed. The pattern describes a correspondence between a plurality of first resources, a plurality of precoding matrices, and a plurality of ports.

The terminal device may send precoded uplink reference signals by using a plurality of uplink reference signal resources. The network device may receive the precoded uplink reference signals based on the plurality of uplink reference signal resources. The network device that receives the precoded uplink reference signal may be, for example, the network device #1 and/or the network device #2 shown in FIG. 3A and FIG. 3B. This is not limited in this application.

Step 207: The network device performs channel measurement based on the precoded uplink reference signal.

As described above, the network device that receives the precoded uplink reference signal on each uplink reference signal resource may be at least one of the network device #1 and the network device #2 in FIG. 3A and FIG. 3B. One or more network devices that receive the precoded uplink reference signal may perform channel measurement.

Each network device may perform channel measurement based on the received precoded uplink reference signal, to further determine information such as an MCS and an SRS port used for uplink transmission.

The following uses the network device #1 as an example for description. It should be understood that an operation of the network device #2 is similar to that of the network device #1. Herein, only for brevity, an operation process of the network device #1 is used as an example for description.

The network device #1 may calculate parameters such as a signal-to-noise ratio (SNR) and a signal to interference plus noise ratio (SINR) based on the received precoded uplink reference signal, further determine channel quality, for example, a channel quality indicator (CQI), and determine an MCS corresponding to the precoded uplink reference signal.

For example, the network device #1 performs channel measurement based on a precoded uplink reference signal received on the uplink reference signal resource 1, and may determine a corresponding MCS based on channel quality determined through channel measurement.

In a subsequent uplink data transmission process, if an arrangement manner of precoding matrices for an uplink transmission resource is also consistent with an arrangement manner of precoding matrices for an uplink reference signal resource, the MCS determined by the network device #1 based on the received precoded uplink reference signal is more accurate, and is more applicable to subsequent uplink data transmission. This helps improve uplink transmission performance.

Optionally, the method further includes: Step 208: The terminal device receives fourth indication information, where the fourth indication information is used to indicate an MCS used for uplink data transmission. Correspondingly, in operation 208, the network device sends the fourth indication information, where the fourth indication information is used to indicate the MCS used for uplink data transmission.

For example, the network device #1 may further determine, based on the received precoded uplink reference signal, a maximum quantity of transport layers for subsequent uplink transmission and precoding matrices that can be used for each transport layer.

For example, the network device #1 may determine the maximum quantity of transport layers based on channel measurement. For example, the maximum quantity of transport layers is determined by performing singular value decomposition on a channel. The network device #1 may further determine, according to a criterion such as throughput maximization, a precoding matrix to be used for each transport layer and each first resource in each uplink reference signal resource. In the non-codebook based uplink transmission scheme, a precoding matrix of the terminal device is transparent to the network device. However, because one uplink reference signal port (or a port for short) may be configured for each uplink reference signal resource, for example, one SRS port may be configured for each SRS resource, there is a one-to-one correspondence between the uplink reference signal resource and the uplink reference signal port, and a precoding matrix used for each uplink reference signal resource is predetermined. It can be learned from the foregoing descriptions with reference to FIG. 12 that, the correspondence between each first resource in the uplink reference signal resource and the precoding matrix has been predetermined. Therefore, the network device may perform measurement based on received uplink reference signals of different ports, to determine to use a precoding matrix corresponding to one or more specific ports.

Optionally, the method further includes: Step 209: The terminal device receives second indication information, where the second indication information is used to indicate a precoding matrix used for uplink data transmission in the plurality of precoding matrices. Correspondingly, in operation 209, the network device sends the second indication information.

In this embodiment, because there are a plurality of correspondences between the plurality of precoding matrices and the first resources in the uplink reference signal resources, the network device may indirectly indicate, based on the uplink reference signal resource corresponding to the received precoded reference signal, precoding matrices to be used by the terminal device for uplink data transmission in a subsequent uplink transmission process. Alternatively, the network device may indirectly indicate, based on an uplink reference signal port (for example, the foregoing SRS port) corresponding to the received precoded uplink reference signal, precoding matrices to be used by the terminal device for uplink data transmission in subsequent uplink transmission.

In a possible design, the second indication information may be, for example, an index value in an SRS reference signal resource identifier (SRI) indication for non-codebook based PUSCH transmission in the 3GPP technical specification (TS) 38.212. The SRI indication for non-codebook based PUSCH transmission may be used to indicate an SRI corresponding to each index value when the maximum quantity ($L_{max}$, where $L_{max}$ is a positive integer) of transport layers has different values.

The following table shows an example of the SRI indication for non-codebook based on PUSCH transmission when the maximum quantity of transport layers is 2 ($L_{max}=2$).

| Index value | SRI(s), $N_{SRS} = 2$ | Index value | SRI(s), $N_{SRS} = 3$ | Index value | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | Reserved | 3 | 0, 1 | 3 | 3 |
|  |  | 4 | 0, 2 | 4 | 0, 1 |
|  |  | 5 | 1, 2 | 5 | 0, 2 |
|  |  | 6 and 7 | Reserved | 6 | 0, 3 |
|  |  |  |  | 7 | 1, 2 |
|  |  |  |  | 8 | 1, 3 |
|  |  |  |  | 9 | 2, 3 |
|  |  |  |  | 10 to 15 | Reserved |

The index value in the table is an index value mapped to a bit indicator field, $N_{SRS}$ is a quantity of SRS resources, and $N_{SRS}$ is a positive integer. When the quantity of SRS resources is determined, each index value corresponds to one or more SRI(s), that is, each index value indicates one or more SRS resources. Because the correspondence between each SRS resource and the precoding matrix may be determined by the terminal device based on operation 204 described above, the network device may indirectly indicate, by indicating the maximum quantity $L_{max}$ of transport layers, the quantity $N_{SRS}$ of SRS resources, and the index value by using the second indication information, the precoding matrix used for uplink transmission. The terminal device may determine, based on the second indication information, the precoding matrix selected for uplink transmission.

When a plurality of downlink reference signal resources are configured, a plurality of pieces of second indication information may be used to indicate one or more precoding matrices selected from a precoding matrix corresponding to each downlink reference signal. For example, the plurality of pieces of second indication information may be separately carried in different DCI. To be specific, the terminal device may receive a plurality of pieces of DCI. Each piece of DCI carries one piece of second indication information, and each piece of second indication information corresponds to one or more SRIs. The plurality of pieces of second indication information may be a plurality of information elements carried in a same piece of DCI. For example, the DCI includes the plurality of pieces of second indication information, and each piece of second indication information corresponds to one or more SRIs.

The correspondence between the plurality of first resources and the plurality of precoding matrices shown in FIG. 11 is used as an example. FIG. 12 shows SRS ports corresponding to the plurality of precoding matrices. For example, the precoding matrix 1 for the SRS resource 1 corresponds to a port a, the precoding 2 for the SRS resource 2 corresponds to a port b, the precoding 3 for the SRS resource 3 corresponds to a port c, and the precoding 4 for the SRS resource 4 corresponds to a port d.

If the network device determines that the quantity of transport layers used for subsequent uplink transmission is 1, and selected SRS ports are the port a and the port b, that is, selected precoding matrices are the precoding matrix 1 and the precoding matrix 2, the SRS resource 1 and the SRS resource 2 may be respectively indicated by using two pieces of second indication information. If the network device determines that the quantity of transport layers used for subsequent uplink transmission is 1, and selected SRS ports are the port a and the port d, that is, selected precoding matrices are the precoding matrix 1 and the precoding matrix 4, the SRS resource 1 and the SRS resource 4 may be respectively indicated by using two pieces of second indication information. If the network device determines that the quantity of transport layers used for subsequent uplink transmission is 2, and SRS ports selected for the $1^{st}$ transport layer are the port a and the port d, that is, precoding matrices selected for the $1^{st}$ transport layer are the precoding matrix 1 and the precoding matrix 4, and SRS ports selected for the $2^{nd}$ transport layer are the port c and the port b, that is, precoding matrices selected for the $2^{nd}$ transport layer are the precoding matrix 3 and the precoding matrix 2, the SRS resource 1 and the SRS resource 3 may be indicated by using one piece of second indication information, and the SRS resource 4 and the SRS resource 2 are indicated by using another piece of second indication information.

It should be understood that the foregoing related descriptions about determining, by the network device, the SRS port used for uplink transmission may also be omitted. In other words, the network device may directly determine the precoding matrix used for subsequent uplink transmission.

It should be further understood that a specific manner in which the network device indicates, by using the second indication information, the precoding matrix used for uplink transmission is merely an example, and should not constitute any limitation on this application. For example, when uplink reference signal resources corresponding to different downlink reference signal resources can be distinguished, the precoding matrix used for uplink transmission may alternatively be indicated by using one piece of second indication information.

Step 210: The terminal device determines a precoding matrix corresponding to each second resource in an uplink transmission resource.

The uplink transmission resource may be a resource used for uplink data transmission. The uplink transmission resource may be, for example, a PUSCH. The uplink transmission resource may include a plurality of second resources.

Herein, the second resource is a resource determined based on a second precoding granularity. A time domain or frequency domain size of the second resource may be determined based on the second precoding granularity. The second precoding granularity herein is a precoding granularity corresponding to uplink data. The second precoding granularity may indicate a size of contiguous resources corresponding to a same precoding matrix in the uplink transmission resource.

Similar to the first precoding granularity, the second precoding granularity may be a granularity in frequency domain, which is referred to as a frequency domain granularity for short; or may be a granularity in time domain, which is referred to as a time domain granularity for short. If the first precoding granularity is the frequency domain granularity, a frequency domain size of the second resource is a size of the second precoding granularity. If the second precoding granularity is the time domain granularity, a time domain size of the second resource is a size of the second precoding granularity.

By way of example but not limitation, if the first precoding granularity is the frequency domain granularity, the first precoding granularity may be one or more PRBs, one or more RB groups (RB groups, RBGs, where each RBG may include a plurality of PRBs), or a precoding resource block group (PRG). If the first precoding granularity is the time domain granularity, the first precoding granularity may be one or more slots (which are, for example, referred to as a slot group), one or more mini slots (which are, for example, referred to as a mini slot group), or one or more OFDM symbols (which are also referred to as an OFDM symbol group). It should be understood that specific names of the frequency domain granularities and the time domain granularities are not limited in this application.

In a possible design, the second precoding granularity is the same as the first precoding granularity. In another possible design, the second precoding granularity is different from the first precoding granularity.

The second precoding granularity may be indicated by the network device, or may be predefined in a protocol. This is not limited in this application.

If the second precoding granularity is indicated by the network device, optionally, the method further includes: The terminal device receives indication information of the second precoding granularity. Correspondingly, the network device sends the indication information of the second precoding granularity. The network device that sends the indication information of the second precoding granularity may be, for example, the foregoing network device that sends the second indication information. This is not limited in this application.

It should be understood that, when the second precoding granularity is the same as the first precoding granularity, the second precoding granularity may also be implicitly indicated by using the indication information of the first precoding granularity. In other words, the first precoding granularity and the second precoding granularity are not distinguished, and both are referred to as precoding granularities. The precoding granularity may be indicated by using one piece of signaling. The signaling may be referred to as, for example, indication information of the precoding granularity.

As described above, when the second precoding granularity is predefined in the protocol, for example, the time domain granularity and the frequency domain granularity are predefined in the protocol, the network device may also indicate, by indicating the resource multiplexing manner, whether the currently used second precoding granularity is the time domain granularity or the frequency domain granularity. In this case, it may also be considered that the second precoding granularity is implicitly indicated by indicating the resource multiplexing manner.

Before sending the uplink data, the terminal device may establish a mapping relationship between the SRS resource indicated in the second indication information and a PUSCH transport layer and a DMRS port that correspond to the SRS resource. Each SRS resource may be mapped to one PUSCH transport layer, and corresponds to one DMRS port.

The terminal device may send a PUSCH by using an antenna port that is the same as an SRS port corresponding to the SRS resource indicated in the second indication information. Because there is a correspondence between the SRS port and a precoding matrix, that the terminal device sends the PUSCH by using the antenna port corresponding to the SRS port may be understood as that the terminal device sends the PUSCH by using the precoding matrix corresponding to the SRS port.

The terminal device may further determine, based on the second indication information and the previously determined correspondence between the plurality of first resources and the plurality of precoding matrices, a precoding matrix corresponding to each of the plurality of second resources. Specifically, for example, the terminal device may determine the correspondence between the plurality of first resources and the plurality of precoding matrices by using the foregoing method. Based on the correspondence, the terminal device may obtain an arrangement pattern of the plurality of precoding matrices for the plurality of first resources, for example, as shown in FIG. 12. If the terminal device determines, based on the second indication information, one or more SRS ports used for uplink data transmission, a precoding matrix corresponding to the one or more SRS ports and a relative position of a corresponding first resource in the plurality of first resources are determined. The terminal device may continue to use the determined precoding matrix and the determined relative position of the first resource in the plurality of first resources for the uplink transmission resource, that is, use the precoding matrix indicated by the second indication information, and map the precoding matrix to the plurality of second resources, so that a relative position of the second resource corresponding to each precoding matrix in the plurality of second resources is the same as a relative position of the first resource corresponding to each precoding matrix in the plurality of first resources.

Figure 13:
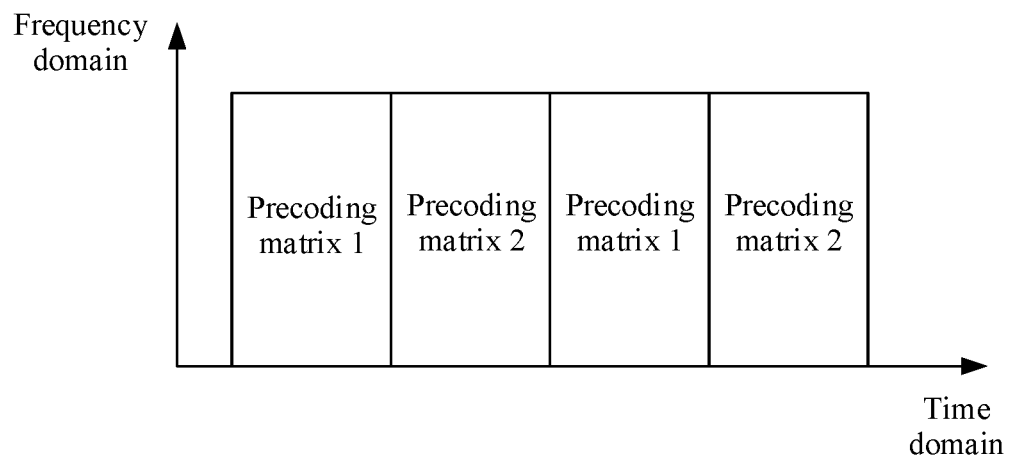
FIG. 13 to FIG. 16 each are a schematic diagram of a correspondence between a plurality of second resources and a plurality of precoding matrices.
Figure 14:
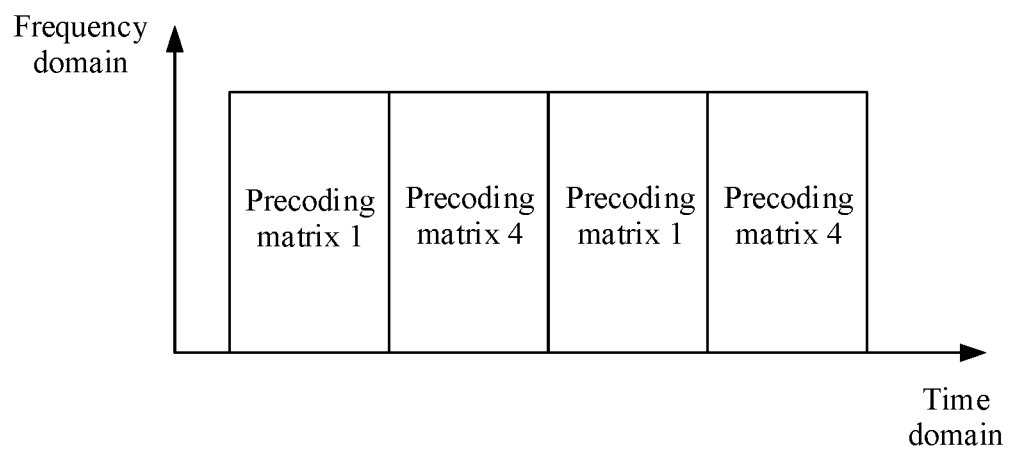
Figure 15:
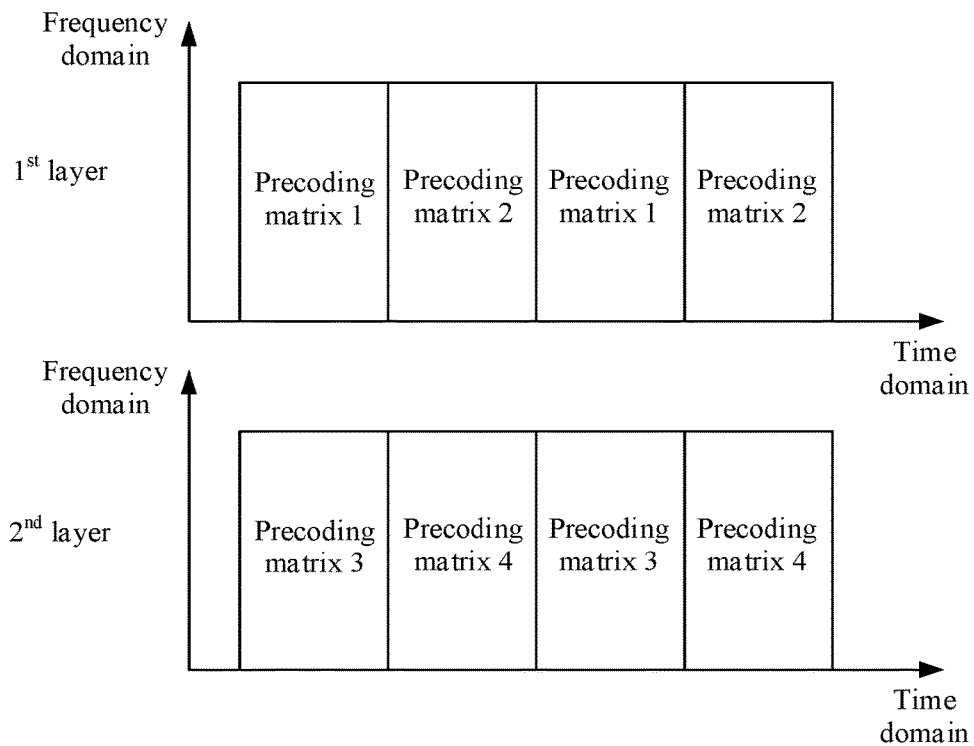

The following uses the correspondence between the plurality of first resources, the plurality of precoding matrices, and the plurality of ports in FIG. 12 as an example to describe, with reference to FIG. 13 to FIG. 15, a process in which the terminal device determines the precoding matrix corresponding to each second resource. FIG. 13 to FIG. 15 each show a correspondence between the plurality of second resources and the plurality of precoding matrices that is determined based on the correspondence shown in FIG. 12 and the second indication information.

It is assumed that the network device (for example, the network device #1) indicates the port a by using one piece of second indication information, and indicates the port b by using another piece of second indication information. In this case, the terminal device may determine that the quantity of transport layers used for subsequent uplink transmission is 1, and may further determine, based on the precoding matrix 1 corresponding to the port a, the precoding matrix 2 corresponding to the port b, and relative positions of the first resources corresponding to the precoding matrix 1 and the precoding matrix 2 in the plurality of first resources, relative positions of second resources corresponding to the precoding matrix 1 and the precoding matrix 2 in the plurality of second resources. Therefore, it can be learned that for the precoding matrices corresponding to the plurality of second resources in the uplink transmission resource, the precoding matrix 1, the precoding matrix 2, the precoding matrix 1, and the precoding matrix 2 are also cycled, as shown in FIG. 13.

For another example, it is assumed that the network device indicates the port a by using one piece of second indication information, and indicates the port d by using another piece of second indication information. In this case, the terminal device may determine that the quantity of transport layers used for subsequent uplink transmission is 1, and may further determine, based on the precoding matrix 1 corresponding to the port a, the precoding matrix 4 corresponding to the port d, and relative positions of the first resources corresponding to the precoding matrix 1 and the precoding matrix 4 in the plurality of first resources, relative positions of second resources corresponding to the precoding matrix 1 and the precoding matrix 4 in the plurality of second resources. Therefore, it can be learned that for the precoding matrices corresponding to the plurality of second resources in the uplink transmission resource, the precoding matrix 1, the precoding matrix 4, the precoding matrix 1, and the precoding matrix 4 are also cycled, as shown in FIG. 14.

For still another example, it is assumed that the network device indicates the port a and the port b by using one piece of second indication information, and indicates the port c and the port d by using another piece of second indication information. In this case, the terminal device may determine that the quantity of transport layers used for subsequent uplink transmission is 2, may further determine, based on the precoding matrix 1 corresponding to the port a, the precoding matrix 2 corresponding to the port b, and relative positions of the first resources corresponding to the precoding matrix 1 and the precoding matrix 2 in the plurality of first resources, relative positions of second resources corresponding to the precoding matrix 1 and the precoding matrix 2 in the plurality of second resources, and may further determine, based on the precoding matrix 3 corresponding to the port c, the precoding matrix 4 corresponding to the port d, and relative positions of the first resources corresponding to the precoding matrix 3 and the precoding matrix 4 in the plurality of first resources, relative positions of second resources corresponding to the precoding matrix 1 and the precoding matrix 2 in the plurality of second resources and relative positions of second resources corresponding to the precoding matrix 3 and the precoding matrix 4 in the plurality of second resources, as shown in FIG. 15.

Figure 16:
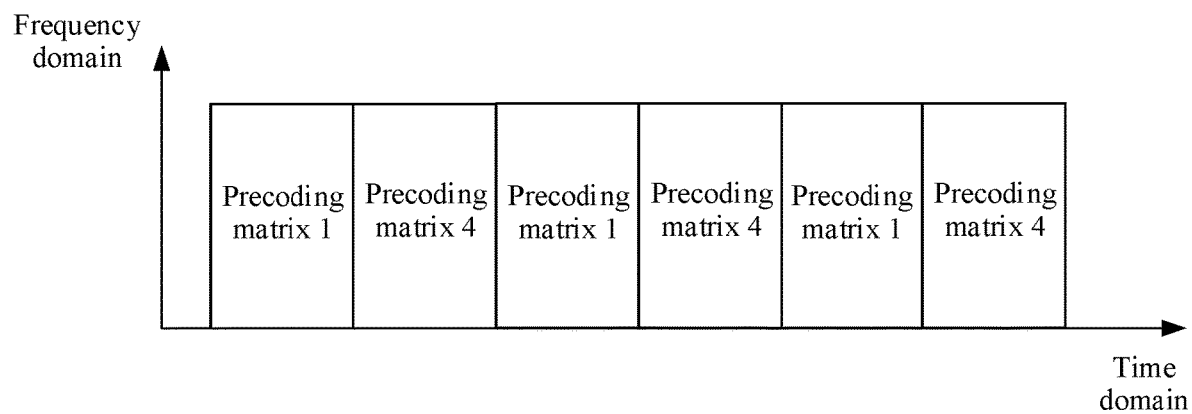

It should be understood that a quantity of second resources included in the uplink transmission resource shown in the figure is the same as a quantity of first resources included in the uplink reference signal resource. However, this should not constitute any limitation on this application. For example, the uplink transmission resource may include a larger quantity of second resources. For example, if the terminal device determines, according to a precoder cycling selection rule, a precoding matrix used for an uplink reference signal, the terminal device may alternately use a plurality of cycled precoding matrices for a larger quantity of second resources based on the correspondence between the first resource and the precoding matrix. FIG. 15 shows the correspondence between the plurality of second resources and the plurality of precoding matrices. FIG. 16 shows more cycling periodicities extended based on the pattern shown in FIG. 14.

In another implementation, the terminal device may determine, based on the second precoding granularity and the resource allocation rule, downlink reference signal resources corresponding to the plurality of second resources in the uplink transmission resource. The terminal device may first determine a size of each second resource based on the second precoding granularity, and then determine, according to the resource allocation rule, for example, the FDRA rule or the TDRA rule described above, the downlink reference signal resource corresponding to each second resource. It should be understood that the resource allocation rule followed by the terminal device to determine the downlink reference signal resource corresponding to each second resource is the same as the resource allocation rule followed by the terminal device to determine the downlink reference signal resource corresponding to each first resource. A specific process in which the terminal device determines, according to the resource allocation rule, the downlink reference signal resource corresponding to each second resource may be similar to the foregoing specific process in which the terminal device determines, according to the resource allocation rule, the downlink reference signal resource corresponding to each first resource, except that the precoding granularity changes from the first precoding granularity to the second precoding granularity. For brevity, details are not described herein with reference to specific examples.

The terminal device may further determine, based on the downlink reference signal resource corresponding to each second resource, one or more precoding matrices corresponding to each second resource. The one or more precoding matrices corresponding to each second resource are obtained based on measurement of the downlink reference signal resource corresponding to the second resource. This is similar to the correspondence between the first resource and the precoding matrix.

Then, the terminal device may determine, based on the SRS port indicated by the second indication information, the precoding matrix selected for uplink data transmission. As described above, the terminal device may know in advance the precoding matrix corresponding to each SRS port, that is, the precoding matrix corresponding to each SRS resource. In other words, the terminal device may determine, based on the second indication information, precoding matrices selected for uplink data transmission from the one or more precoding matrices corresponding to each second resource. Therefore, the terminal device may determine the precoding matrix corresponding to each second resource block.

It should be understood that the foregoing specific manner in which the terminal device determines the precoding matrix corresponding to each second resource is merely an example. This application includes but is not limited to what is described herein.

Step 211: The terminal device sends precoded uplink data by using the uplink transmission resource.

The terminal device may send the uplink data by using, for example, the uplink transmission resource. The network device #1 and the network device #2 each may receive the uplink data on the uplink transmission resource. For example, the network device #1 and the network device #2 may separately receive uplink data sent to the network device #1 and the network device #2, or may receive all uplink data on the uplink transmission resource. This is not limited in this application.

It should be understood that for specific processes in which the terminal device sends the uplink data by using the uplink transmission resource and the network device receives the uplink data, refer to the conventional technology. For brevity, details are not described herein. It should be further understood that the specific process in which the network device receives the uplink data is not limited in this application.

Based on the foregoing technical solution, the terminal device may predetermine the downlink reference signal resources corresponding to the plurality of first resources in the uplink reference signal resources, determine the correspondence between the precoding matrix and the first resource, and then precode, based on the correspondence between the precoding matrix and the first resource, the uplink reference signal carried on the uplink reference signal resource, so that subsequently transmitted precoded uplink reference signals have different arrangement manners. Because the precoded uplink reference signal transmitted based on the method in this embodiment of this application is precoded based on the first precoding granularity, the precoding matrix used for the uplink reference signal no longer depends on a granularity of the uplink reference signal resource, and more possible arrangement manners of precoding matrices for the uplink reference signal resource may be obtained based on the first precoding granularity. To be specific, the first precoding granularity is decoupled from the size of the uplink reference signal resource, to obtain a larger quantity of more flexible configurations of the uplink reference signal resource. This helps the network device obtain an accurate channel measurement result, and perform appropriate scheduling for subsequent uplink data transmission.

With reference to FIG. 3A and FIG. 3B to FIG. 16, the foregoing describes in detail the uplink reference signal sending and receiving method provided in this embodiment of this application. With reference to FIG. 17A and FIG. 17B to FIG. 21, the following describes in detail an uplink reference signal sending and receiving method provided in another embodiment of this application.

Figure 17A:
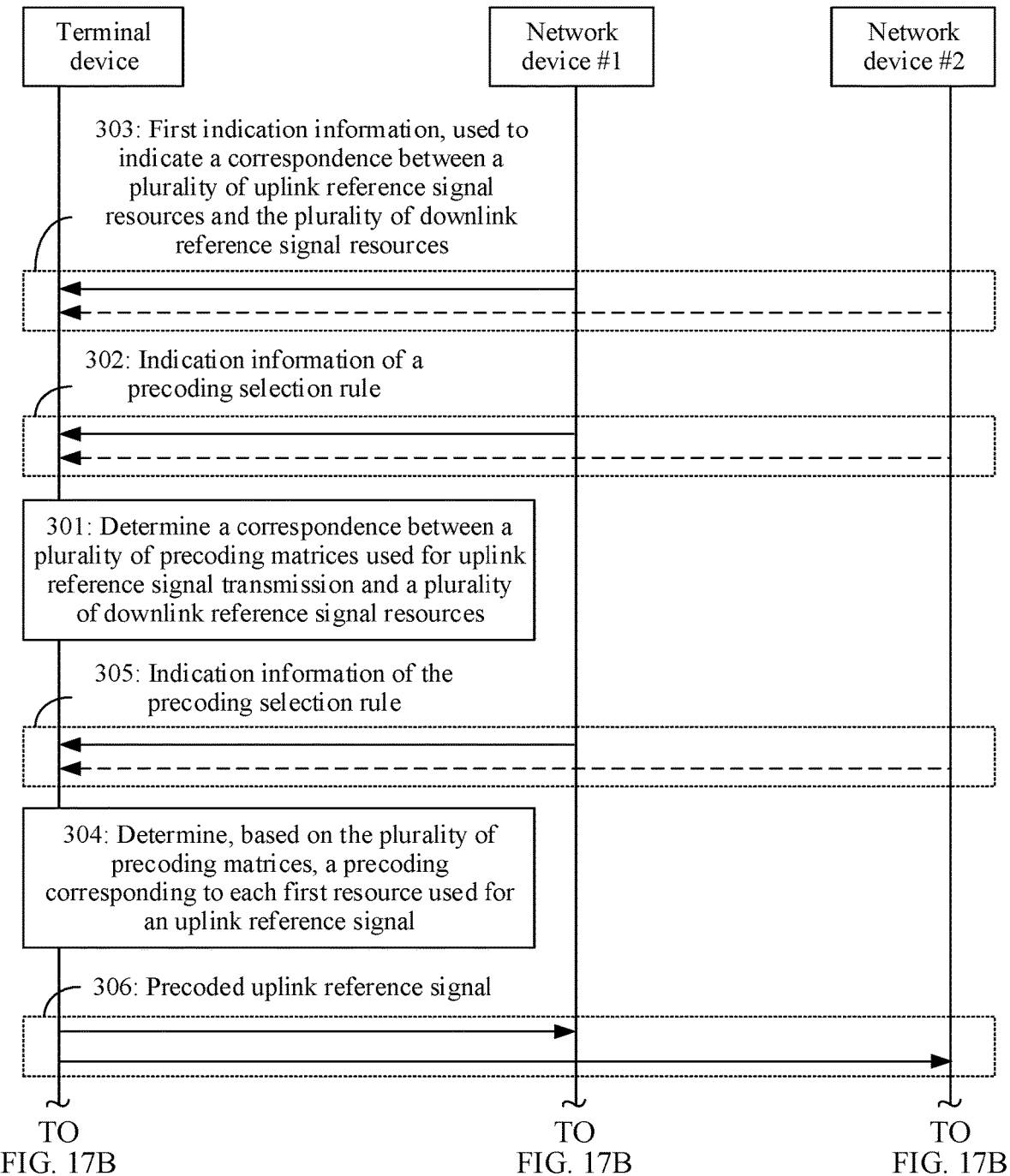
FIG. 17A and FIG. 17B are a schematic flowchart of an uplink reference signal sending and receiving method according to another embodiment of this application.
Figure 17B:
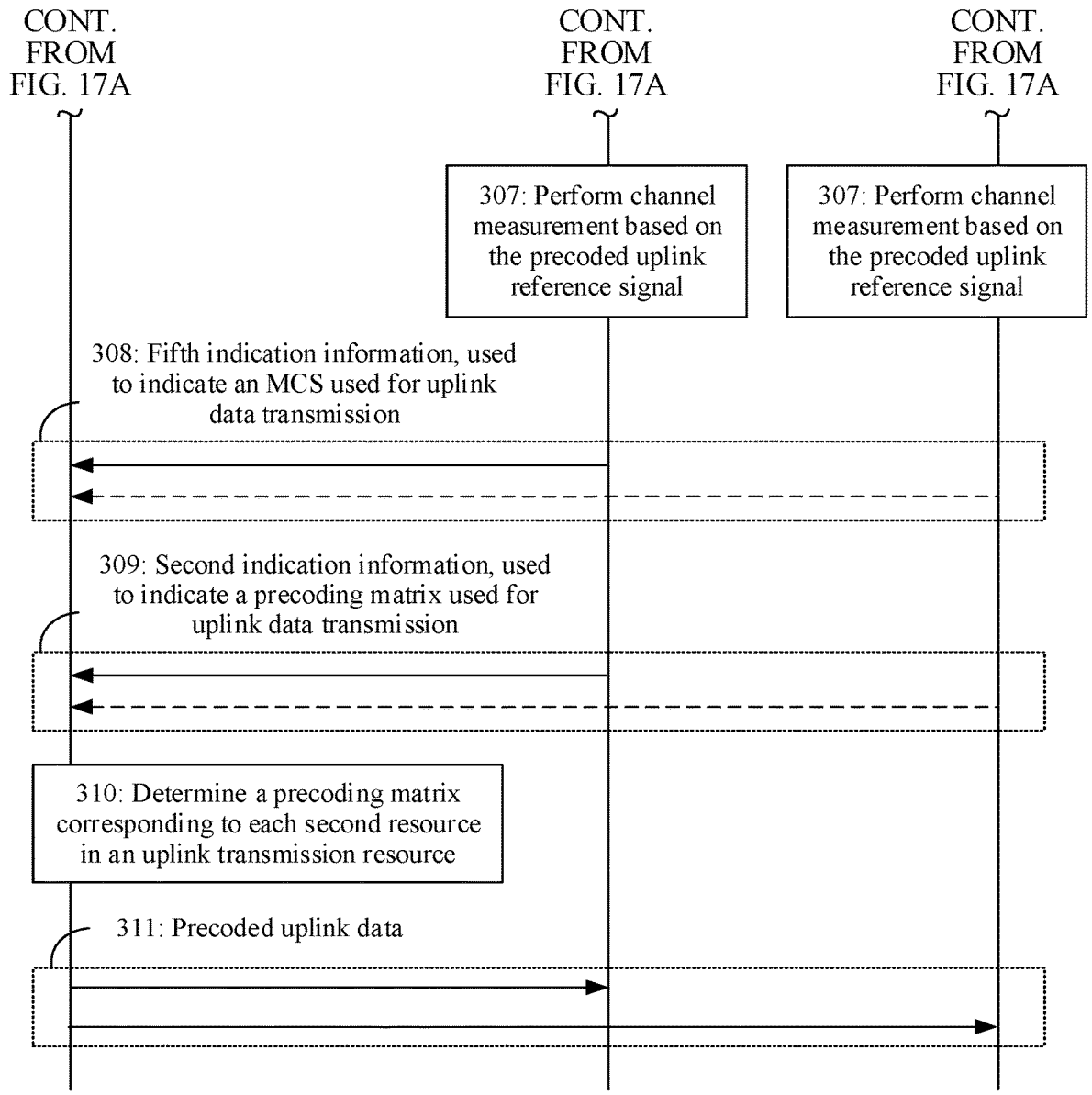

FIG. 17A and FIG. 17B are a schematic flowchart of an uplink reference signal sending and receiving method 300 according to another embodiment of this application. As shown in FIG. 17A and FIG. 17B, the method 300 includes operation 301 to operation 311. The following describes the operations in the method 300 in detail.

Step 301: A terminal device determines a correspondence between a plurality of precoding matrices used for uplink reference signal transmission and a plurality of downlink reference signal resources.

Before sending an uplink reference signal, the terminal device may first determine the correspondence between the plurality of precoding matrices used for uplink reference signal transmission and the plurality of downlink reference signal resources, to precode the uplink reference signal.

The correspondence between the plurality of precoding matrices and the plurality of downlink reference signal resources may be understood as follows: The plurality of downlink reference signal resources may correspond to a plurality of uplink reference signal resources, in other words, the plurality of downlink reference signal resources may be associated with the plurality of uplink reference signal resources. Each downlink reference signal resource may be associated with one or more uplink reference signal resources. Each uplink reference signal resource may correspond to one or more precoding matrices. An uplink reference signal carried on the uplink reference signal resource may be a precoded uplink reference signal. A precoding matrix used for the uplink reference signal may be a precoding matrix determined based on measurement of the downlink reference signal resource corresponding to the uplink reference signal resource, or a precoding matrix determined based on measurement of the downlink reference signal resource associated with the uplink reference signal resource. In other words, in operation 301, the terminal device may determine the plurality of precoding matrices used for uplink reference signal transmission, and the plurality of precoding matrices may be obtained based on measurement of the downlink reference signal resources associated with the uplink reference signal resources.

Herein, measurement of the downlink reference signal resource is channel measurement performed based on a downlink reference signal carried on the downlink reference signal resource.

For example, a downlink reference signal resource 1 corresponds to an uplink reference signal resource 1. A precoding matrix determined by the terminal device based on measurement of the downlink reference signal resource 1 is denoted as a precoding matrix 1. In this case, the terminal device may determine that the precoding matrix 1 corresponds to the reference signal resource 1.

For another example, a downlink reference signal resource 1 corresponds to an uplink reference signal resource 1 and an uplink reference signal resource 2. Precoding matrices determined by the terminal device based on measurement of the downlink reference signal resource 1 are denoted as a precoding matrix 1 and a precoding matrix 2. In this case, the terminal device may determine that one of the precoding matrix 1 and the precoding matrix 2 corresponds to the uplink reference signal resource 1, and one of the precoding matrix 1 and the precoding matrix 2 corresponds to the uplink reference signal resource 2. For example, the precoding matrix 1 corresponds to the uplink reference signal resource 1, and the precoding matrix 2 corresponds to the uplink reference signal resource 2; or the precoding matrix 1 corresponds to the uplink reference signal resource 1 and the uplink reference signal resource 2; or the precoding matrix 2 corresponds to the uplink reference signal resource 1 and the uplink reference signal resource 2; or the precoding matrix 2 corresponds to the uplink reference signal resource 1, and the precoding matrix 1 corresponds to the uplink reference signal resource 2. When a rank is 2, a correspondence between the precoding matrix and the uplink reference signal resource may be further determined with reference to a precoding selection rule. This is described in detail below with reference to a specific example, and details are not described herein.

It should be understood that the foregoing listed correspondence between the downlink reference signal resource and the uplink reference signal resource and the foregoing listed correspondence between the uplink reference signal resource and the precoding matrix are merely examples, and should not constitute any limitation on this application.

In this embodiment of this application, by way of example but not limitation, the uplink reference signal resource may be an SRS resource, the uplink reference signal may be an SRS, the downlink reference signal resource may be a CSI-RS resource, and may be an NZP CSI-RS resource, and the downlink reference signal may be an NZP CSI-RS.

FIG. 18 to FIG. 21 each show a correspondence between a plurality of downlink reference signal resources, a plurality of precoding matrices, and a plurality of uplink reference signal resources.

Figure 18:
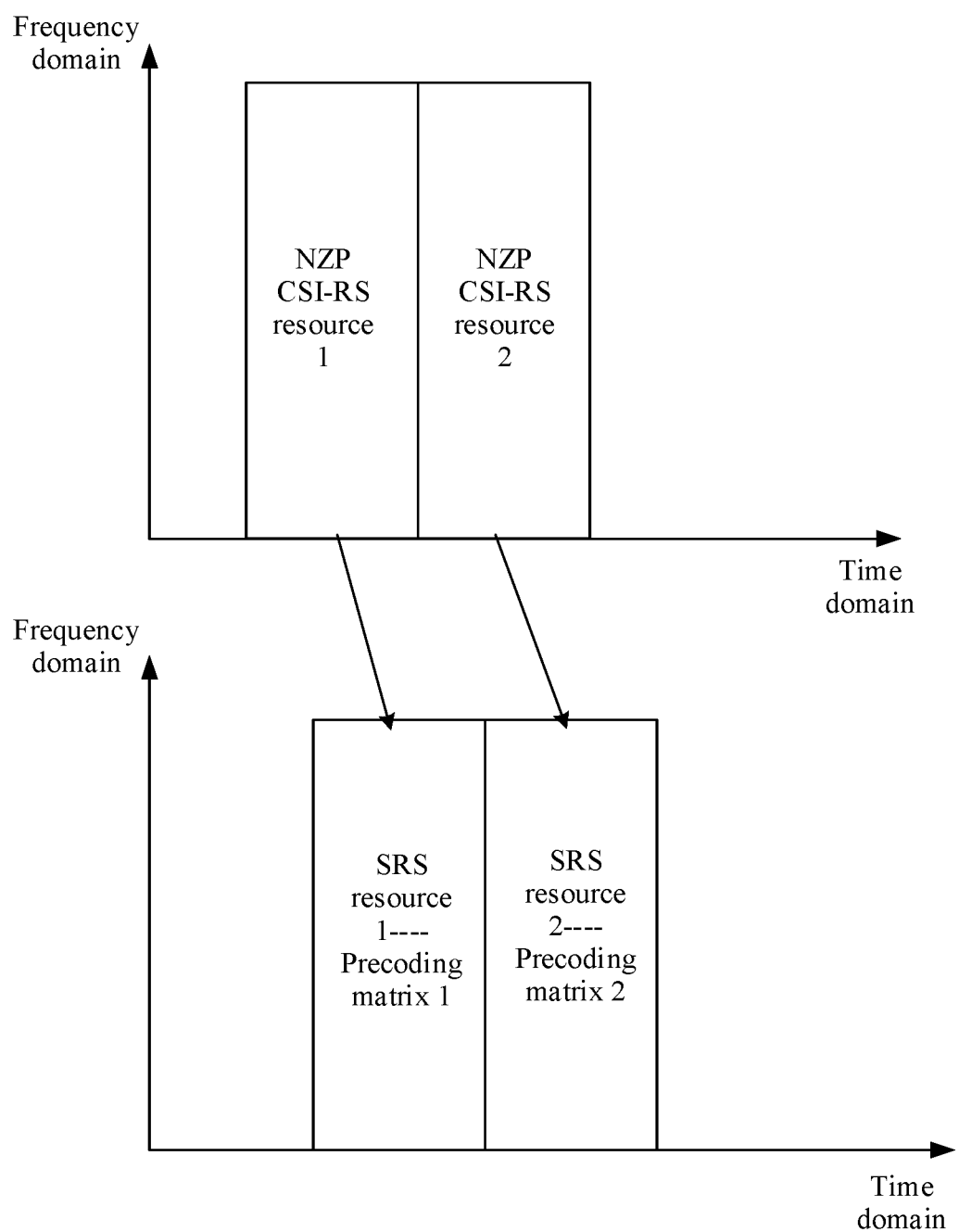
FIG. 18 to FIG. 21 each are a schematic diagram of a correspondence between a plurality of downlink reference signal resources, a plurality of precoding matrices, and a plurality of uplink reference signal resources.
Figure 19:
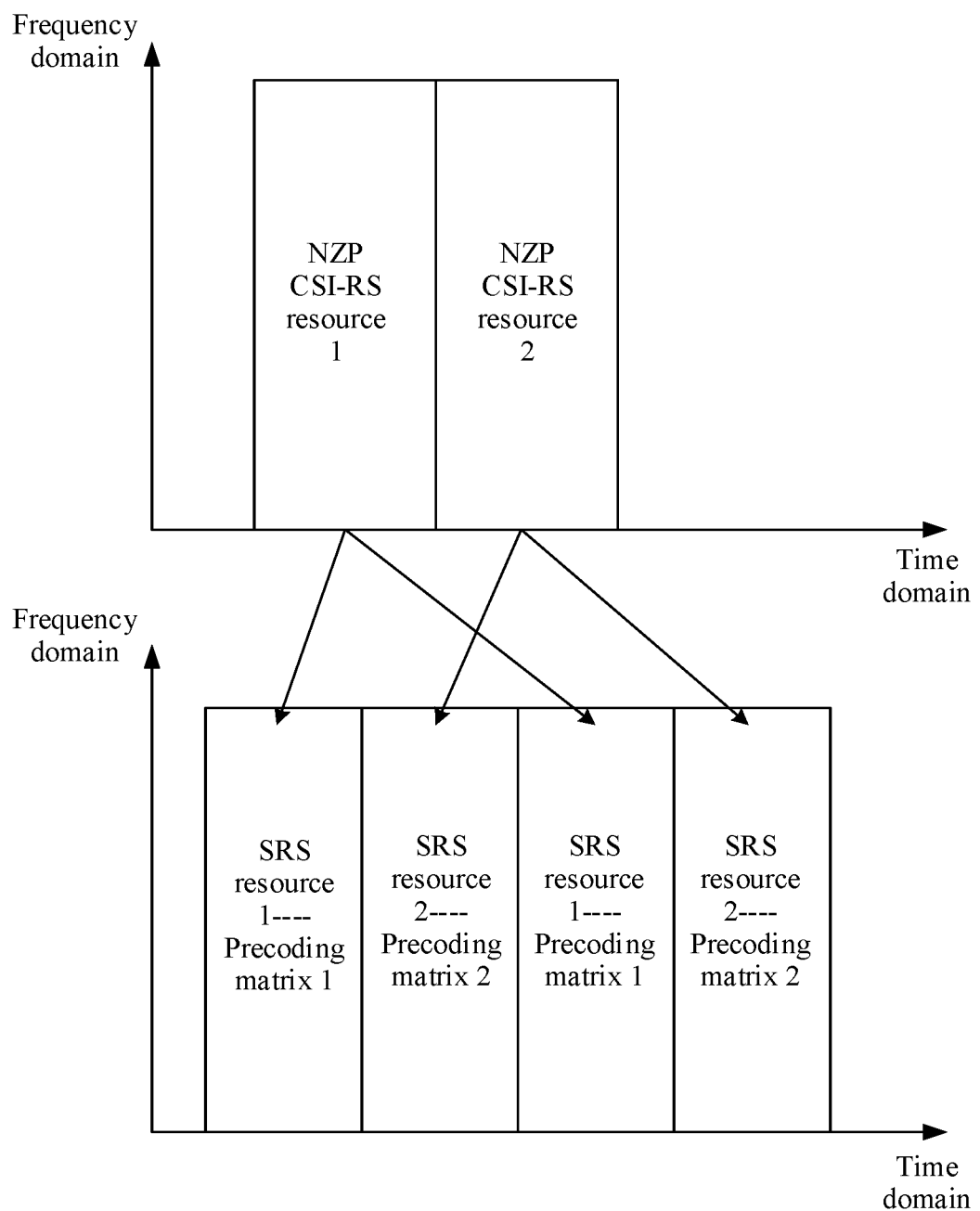

FIG. 18 and FIG. 19 each show two NZP CSI-RS resources, including an NZP CSI-RS resource 1 and an NZP CSI-RS resource 2. The NZP CSI-RS resource 1 corresponds to an SRS resource 1, and the NZP CSI-RS resource 2 corresponds to an SRS resource 2. In other words, each downlink reference signal resource corresponds to one uplink reference signal resource, and a rank is 1.

Each SRS resource shown in FIG. 18 is a contiguous resource, and the SRS resource 1 and the SRS resource 2 are sequentially arranged in frequency domain. A difference from what is shown in FIG. 18 lies in that, the SRS resources shown in FIG. 19 are discretely distributed in frequency domain, in other words, the SRS resources are distributed in a comb shape in frequency domain.

It is assumed that a precoding matrix determined by the terminal device based on measurement of the NZP CSI-RS resource 1 is denoted as a precoding matrix 1, and a precoding matrix determined by the terminal device based on measurement of the NZP CSI-RS resource 2 is denoted as a precoding matrix 2. In this case, the terminal device may determine that the precoding matrix 1 corresponds to the SRS resource 1, and the precoding matrix 2 corresponds to the SRS resource 2, as shown in FIG. 18 and FIG. 19.

Figure 20:
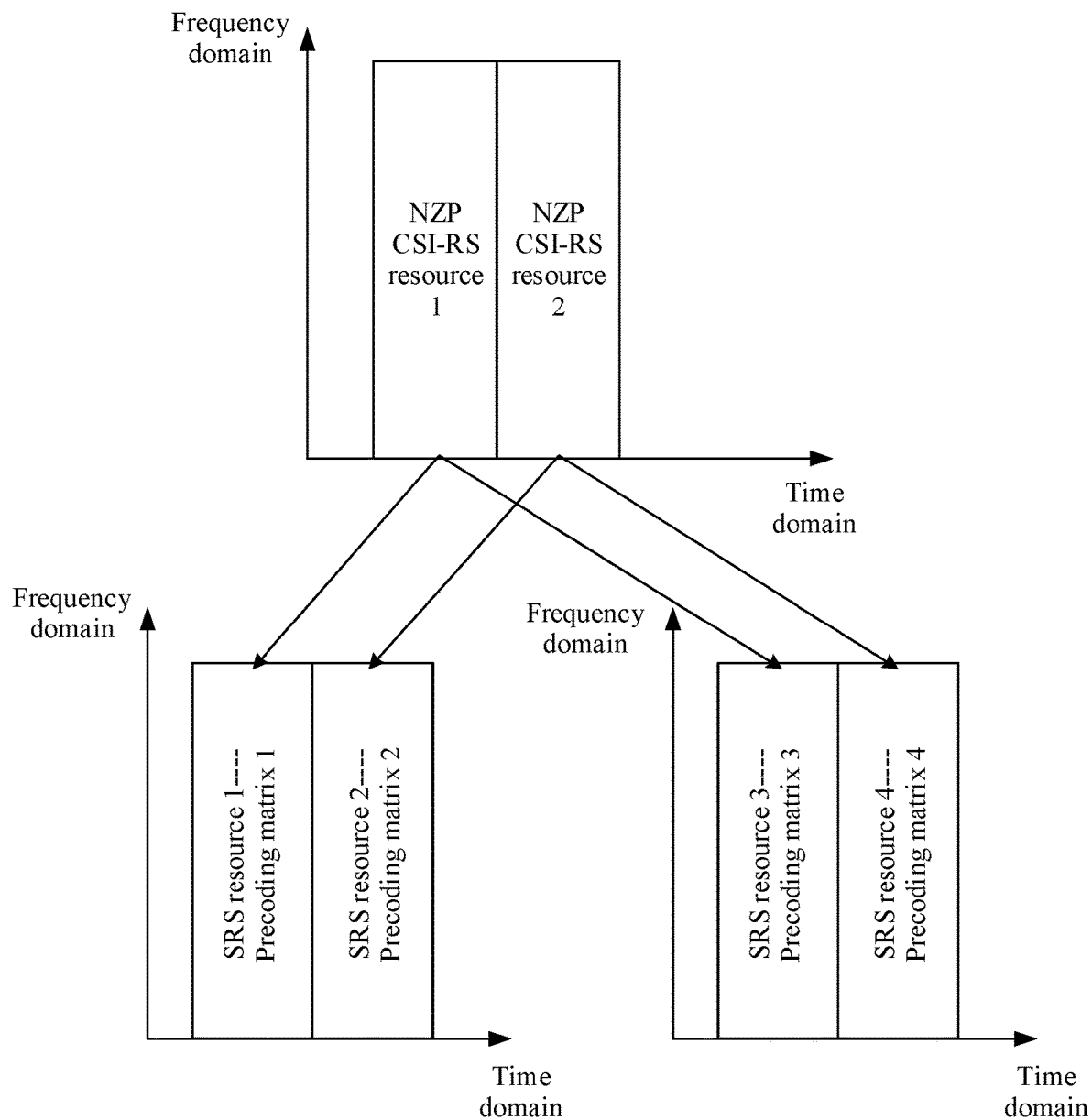
Figure 21:
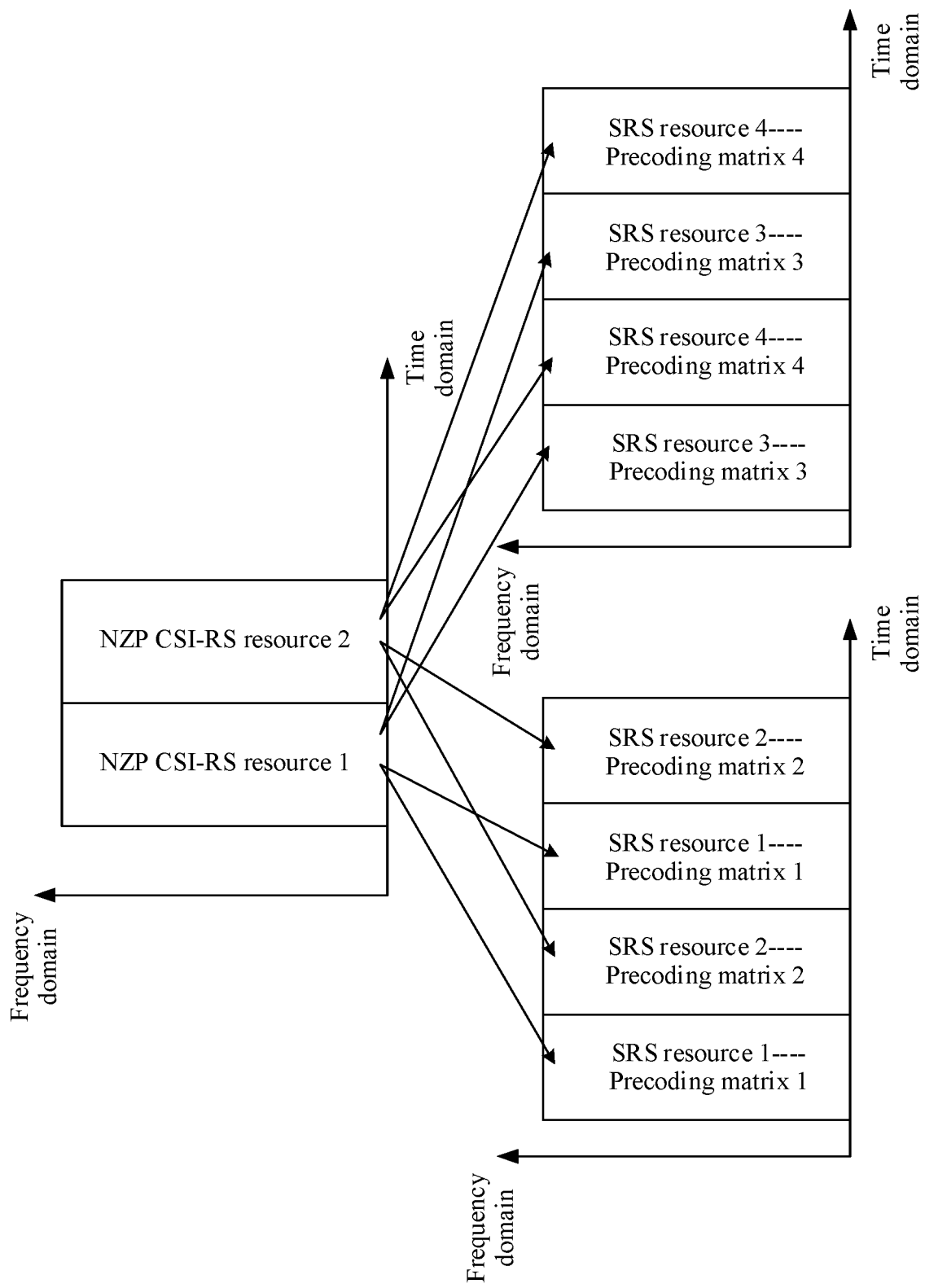

FIG. 20 and FIG. 21 each show two NZP CSI-RS resources, including an NZP CSI-RS resource 1 and an NZP CSI-RS resource 2. The NZP CSI-RS resource 1 corresponds to an SRS resource 1 and an SRS resource 3, and the NZP CSI-RS resource 2 corresponds to an SRS resource 2 and an SRS resource 4. In other words, each downlink reference signal resource corresponds to two uplink reference signal resources, and a rank is 2.

Each SRS resource shown in FIG. 20 is a contiguous resource. The SRS resource 1 and the SRS resource 2 are located at a same layer, and are sequentially arranged in frequency domain. The SRS resource 3 and the SRS resource 4 are located at a same layer, and are sequentially arranged in frequency domain. A difference from what is shown in FIG. 20 lies in that, the SRS resources shown in FIG. 21 are discretely distributed in frequency domain, in other words, the SRS resources are distributed in a comb shape in frequency domain.

It is assumed that precoding matrices determined by the terminal device based on measurement of the NZP CSI-RS resource 1 are denoted as a precoding matrix 1 and a precoding matrix 3, and precoding matrices determined by the terminal device based on measurement of the NZP CSI-RS resource 2 are denoted as a precoding matrix 2 and a precoding matrix 4. In this case, the terminal device may determine that one of the precoding matrix 1 and the precoding matrix 3 corresponds to the SRS resource 1, one of the precoding matrix 1 and the precoding matrix 3 corresponds to the SRS resource 3, one of the precoding matrix 2 and the precoding matrix 4 corresponds to the SRS resource 2, and one of the precoding matrix 2 and the precoding matrix 4 corresponds to the SRS resource 4.

Optionally, the terminal device determines, according to the precoding selection rule, the precoding matrix corresponding to each SRS resource.

As described above, the precoding selection rule may be indicated by a network device in advance by using signaling, or may be predefined in a protocol. This is not limited in this application.

Optionally, the method further includes: operation 302: The terminal device receives indication information of the precoding selection rule.

Various different precoding selection rules have been described in detail in the foregoing method 200 with reference to specific examples. For brevity, details are not described herein again.

FIG. 20 and FIG. 21 show examples in which the precoding matrix 1 corresponds to the SRS resource 1, the precoding matrix 2 corresponds to the SRS resource 2, the precoding matrix 3 corresponds to the SRS resource 3, and the precoding matrix 4 corresponds to the SRS resource 4. However, it should be understood that the figures are merely for ease of understanding, and should not constitute any limitation on this application.

The foregoing describes in detail the correspondences between the plurality of downlink reference signal resources, the plurality of precoding matrices, and the plurality of uplink reference signal resources with reference to a plurality of accompanying drawings. However, it should be understood that these accompanying drawings are examples, and should not constitute any limitation on this application. The plurality of uplink reference signal resources shown in FIG. 18 to FIG. 21 occupy a same time domain resource and different frequency domain resources, and use a resource multiplexing manner of FDM. Although not shown in the figure, a person skilled in the art may understand that the plurality of uplink reference signal resources, for example, may alternatively occupy a same frequency domain resource and different time domain resources, and use a resource multiplexing manner of TDM.

It should be noted that the SRS resources shown above with reference to the accompanying figures are merely examples. In this embodiment of this application, the terminal device determines only an area of the SRS resource, for example, determines the area based on first indication information described below. A specific position of each SRS resource in a time-frequency resource further needs to be determined based on an operation in operation 304.

It should be further noted that each SRS resource may correspond to one SRS port. As described above, each SRS resource corresponds to one precoding matrix. Therefore, each SRS port also corresponds to one precoding matrix.

It can be learned from the foregoing plurality of accompanying drawings that each downlink reference signal resource may correspond to one or more uplink reference signal resources. The uplink reference signal resource corresponding to each downlink reference signal resource may be configured, for example, by the network device.

Optionally, the method further includes: Step 303: The terminal device receives the first indication information, where the first indication information is used to indicate the correspondence between the plurality of uplink reference signal resources and the plurality of downlink reference signal resources.

It should be understood that for a specific process of operation 303, refer to related descriptions of operation 202 in the foregoing method 200. For brevity, details are not described herein again.

Step 304: The terminal device determines, based on the plurality of precoding matrices, a precoding matrix corresponding to each first resource used for an uplink reference signal.

Herein, the first resource belongs to the uplink reference signal resource, and may be used to carry the uplink reference signal. The first resource is a resource determined based on a first precoding granularity. A time domain or frequency domain size of the first resource may be determined based on the first precoding granularity.

For related descriptions of the first precoding granularity, refer to related descriptions of the first precoding granularity in operation 201 in the foregoing method 200. For brevity, details are not described herein again.

The first precoding granularity may be indicated by the network device, or may be predefined in a protocol. This is not limited in this application.

If the first precoding granularity is indicated by the network device, optionally, the method further includes: The terminal device receives indication information of the first precoding granularity. Correspondingly, the network device sends the indication information of the first precoding granularity. The network device that sends the indication information of the first precoding granularity may be, for example, the network device #1 or the network device #2 shown in FIG. 17A and FIG. 17B. This is not limited in this application.

It should be understood that, when the first precoding granularity is a frequency domain granularity, it may be considered that the resource multiplexing manner is FDM; or when the first precoding granularity is a time domain granularity, it may be considered that the resource multiplexing manner is TDM. Therefore, when the network device indicates the first precoding granularity, it may also be considered that the resource multiplexing manner is implicitly indicated.

Alternatively, when the first precoding granularity is predefined in the protocol, for example, the time domain granularity and the frequency domain granularity are predefined in the protocol, the network device may indicate, by indicating the resource multiplexing manner, whether the currently used first precoding granularity is the time domain granularity or the frequency domain granularity. In this case, it may also be considered that the first precoding granularity is implicitly indicated by indicating the resource multiplexing manner.

Optionally, the method further includes: The terminal device receives third indication information, where the third indication information is used to indicate the resource multiplexing manner.

Optionally, the resource multiplexing manner may be predefined in a protocol. This is not limited in this application.

In this embodiment, a size of the first precoding granularity is less than or equal to a size of one uplink reference signal resource, and the terminal device may divide each uplink reference signal resource into one or more first resources based on the first precoding granularity. If the first precoding granularity is less than the size of one uplink reference signal resource, one uplink reference signal resource may include a plurality of first resources; or if the first precoding granularity is equal to the size of one uplink reference signal resource, one uplink reference signal resource is one first resource.

The terminal device may determine, according to a resource allocation rule, a downlink reference signal resource corresponding to one or more first resources in each uplink reference signal resource. The resource allocation rule may be indicated by the network device in advance, or may be predefined in a protocol. This is not limited in this application.

Optionally, the method 300 further includes: Step 305: The terminal device receives indication information of the resource allocation rule.

For detailed descriptions of operation 305, refer to related descriptions in operation 203 in the foregoing method 200. For brevity, details are not described herein again.

For ease of understanding, a simple example is used herein to describe that the terminal device determines, according to the resource allocation rule, the downlink reference signal resource corresponding to the one or more first resources in each uplink reference signal resource.

If the first precoding granularity is the frequency domain granularity, the terminal device may determine, with reference to an FDRA rule, the downlink reference signal resources corresponding to the plurality of first resources used to carry the uplink reference signal. For example, the first precoding granularity is one of preset values {2, 4}, for example, 2. The terminal device may divide resources by using two PRBs as a granularity, so that a plurality of first resources can be obtained through division. An odd-numbered first resource block may be assigned to one downlink reference signal resource, and an even-numbered first resource block may be assigned to another downlink reference signal resource. In other words, the odd-numbered first resource block belongs to one uplink reference signal resource, and the even-numbered first resource block belongs to another uplink reference signal resource.

Therefore, determining, by the terminal device according to the resource allocation rule, the downlink reference signal resource corresponding to the one or more first resources in each uplink reference signal resource is equivalent to determining a position of each first resource in each uplink reference signal resource, so that a position of each uplink reference signal resource may also be determined.

For further detailed descriptions of the resource allocation rule, refer to related descriptions in the foregoing method 200. For brevity, details are not described herein again.

Because the terminal device has determined the correspondence between each uplink reference signal resource and the precoding matrix in operation 301, in operation 305, after determining the downlink reference signal resource corresponding to each first resource in each uplink reference signal resource, the terminal device may determine the precoding matrix corresponding to each first resource, that is, determine a correspondence between the plurality of precoding matrices and the plurality of first resources. For example, for the correspondence, refer to FIG. 12 to FIG. 16 in the foregoing method 200. For brevity, details are not described herein again.

Step 306: The terminal device sends a precoded uplink reference signal. Correspondingly, the network device receives the precoded uplink reference signal.

Step 307: The network device performs channel measurement based on the precoded uplink reference signal.

Step 308: The terminal device receives fourth indication information, where the fourth indication information is used to indicate an MCS used for uplink data transmission. Correspondingly, the network device sends the fourth indication information.

Step 309: The terminal device receives second indication information, where the second indication information is used to indicate a precoding matrix used for uplink data transmission. Correspondingly, the network device sends the second indication information.

Step 310: The terminal device determines a precoding matrix corresponding to each second resource in an uplink transmission resource.

Herein, the second resource is a resource determined based on a second precoding granularity. A time domain or frequency domain size of the second resource may be determined based on the second precoding granularity. The second precoding granularity herein is a precoding granularity corresponding to uplink data. The second precoding granularity may indicate a size of contiguous resources corresponding to a same precoding matrix in the uplink transmission resource.

For related descriptions of the second precoding granularity, refer to related descriptions of the second precoding granularity in operation 210 in the foregoing method 200. For brevity, details are not described herein again.

In a possible design, the second precoding granularity is the same as the first precoding granularity. In another possible design, the second precoding granularity is different from the first precoding granularity.

The second precoding granularity may be indicated by the network device, or may be predefined in a protocol. This is not limited in this application.

If the second precoding granularity is indicated by the network device, optionally, the method further includes: The terminal device receives indication information of the second precoding granularity. Correspondingly, the network device sends the indication information of the second precoding granularity. The network device that sends the indication information of the second precoding granularity may be, for example, the foregoing network device that sends the second indication information. This is not limited in this application.

It should be understood that, when the second precoding granularity is the same as the first precoding granularity, the second precoding granularity may also be implicitly indicated by using the indication information of the first precoding granularity. In other words, the first precoding granularity and the second precoding granularity are not distinguished, and both are referred to as precoding granularities. The precoding granularity may be indicated by using one piece of signaling. The signaling may be referred to as, for example, indication information of the precoding granularity.

As described above, when the second precoding granularity is predefined in the protocol, for example, the time domain granularity and the frequency domain granularity are predefined in the protocol, the network device may also indicate, by indicating the resource multiplexing manner, whether the currently used second precoding granularity is the time domain granularity or the frequency domain granularity. In this case, it may also be considered that the second precoding granularity is implicitly indicated by indicating the resource multiplexing manner.

In this embodiment, the terminal device may determine a plurality of second resources in the uplink transmission resource based on the second precoding granularity, and may further determine, based on the precoding matrix indicated by the second indication information, the precoding matrix corresponding to each second resource.

The terminal device previously determines, according to the resource allocation rule, the downlink reference signal resources corresponding to the plurality of first resources in the uplink reference signal resources, and determines the precoding matrix corresponding to each first resource. In other words, the terminal device determines a pattern used to indicate the correspondence between the plurality of first resources and the plurality of precoding matrices. A rule followed by the terminal device to determine the downlink reference signal resources corresponding to the plurality of second resources in the uplink transmission resource may be the same as a rule followed by the terminal device to determine the downlink reference signal resources corresponding to the plurality of first resources in the uplink reference signal resources. In other words, a same resource allocation rule is followed. Therefore, after determining, based on the second indication information, the precoding matrix selected for uplink data transmission, the terminal device may determine, based on the correspondence between the precoding and the first resource from the precoding matrix selected for the uplink data transmission, the precoding matrix corresponding to each second resource.

Step 311: The terminal device sends precoded uplink data. Correspondingly, the network device receives the precoded uplink data.

It should be understood that for related descriptions of operation 306 to operation 311, refer to related descriptions of operation 206 to operation 211 in the foregoing method 200. For brevity, details are not described herein again.

Based on the foregoing technical solution, the terminal device may predetermine the correspondence between the plurality of uplink reference signal resources and the plurality of precoding matrices, and further determine the downlink reference signal resource corresponding to each first resource in the uplink reference signal resource, and may further determine the correspondence between the first resource and the precoding matrix, to precode an uplink reference signal carried on the uplink reference signal resource, so that subsequently transmitted precoded uplink reference signals have different arrangement manners. Because the precoded uplink reference signal transmitted based on the method in this embodiment of this application is precoded based on the first precoding granularity, the precoding matrix used for the uplink reference signal no longer depends on a granularity of the uplink reference signal resource, and more possible arrangement manners of precoding matrices for the uplink reference signal resource may be obtained based on the first precoding granularity. To be specific, the first precoding granularity is decoupled from the size of the uplink reference signal resource, to obtain a larger quantity of more flexible configurations of the uplink reference signal resource. This helps the network device obtain an accurate channel measurement result, and perform appropriate scheduling for subsequent uplink data transmission.

It should be understood that, in the foregoing embodiments, the terminal device and/or the network device may perform a part or all of the operations in the embodiments. These operations or operations are merely examples. Other operations or variations of various operations may further be performed in embodiments of this application. In addition, the operations may be performed in a sequence different from a sequence presented in embodiments, and not all operations in embodiments of this application are necessarily performed. In addition, sequence numbers of the operations do not indicate an execution sequence. An execution sequence of the processes should be determined based on functions and internal logic of the processes, and should not constitute any limitation on the implementation process of embodiments of this application.

Figure 22:
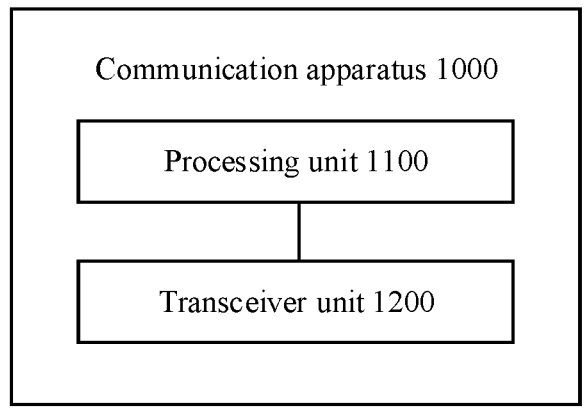
FIG. 22 and FIG. 23 each are a schematic block diagram of a communication apparatus according to an embodiment of this application.

FIG. 22 is a schematic block diagram of a communication apparatus according to an embodiment of this application. As shown in FIG. 22, the communication apparatus 1000 may include a processing unit 1100 and a transceiver unit 1200.

Optionally, the communication apparatus 1000 may correspond to the terminal device in the foregoing method embodiments, for example, may be the terminal device, or a component (such as a circuit, a chip, or a chip system) disposed in the terminal device.

It should be understood that the communication apparatus 1000 may correspond to the terminal device in the method 200 or the method 300 according to embodiments of this application. The communication apparatus 1000 may include a unit configured to perform the method performed by the terminal device in the method 200 in FIG. 3A and FIG. 3B or the method 300 in FIG. 17A and FIG. 17B. In addition, each unit in the communication apparatus 1000 and the foregoing other operations and/or functions are separately intended to implement corresponding procedures of the method 200 in FIG. 3A and FIG. 3B or the method 300 in FIG. 17A and FIG. 17B.

When the communication apparatus 1000 is configured to perform the method 200 in FIG. 3A and FIG. 3B, the processing unit 1100 may be configured to perform operation 201, operation 204, and operation 210 in the method

200, and the transceiver unit 1200 may be configured to perform operation 202, operation 203, operation 205, operation 206, operation 208, operation 209, and operation 211 in the method 200. It should be understood that a specific process in which the units perform the foregoing corresponding operations is described in detail in the foregoing method embodiments, and for brevity, details are not described herein.

When the communication apparatus 1000 is configured to perform the method 300 in FIG. 17A and FIG. 17B, the processing unit 1100 may be configured to perform operation 301, operation 304, and operation 310 in the method 300, and the transceiver unit 1200 may be configured to perform operation 302, operation 303, operation 305, operation 306, operation 308, operation 309, and operation 311 in the method 300. It should be understood that a specific process in which the units perform the foregoing corresponding operations is described in detail in the foregoing method embodiments, and for brevity, details are not described herein.

Figure 23:
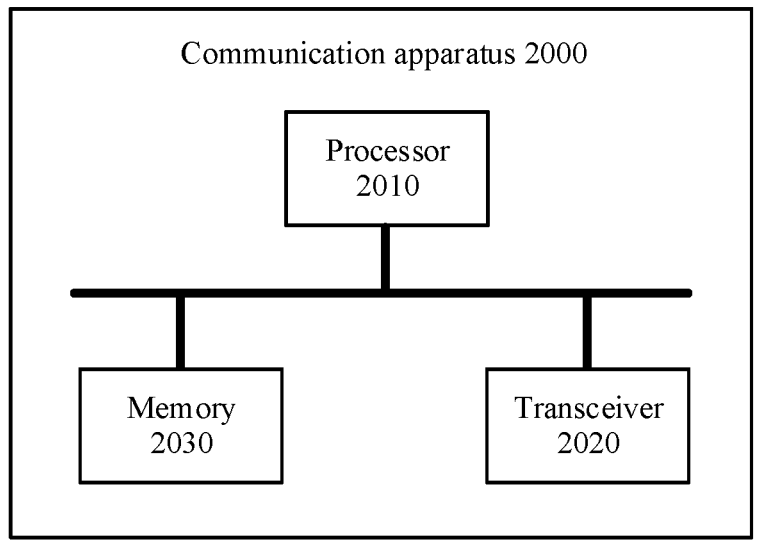
Figure 24:
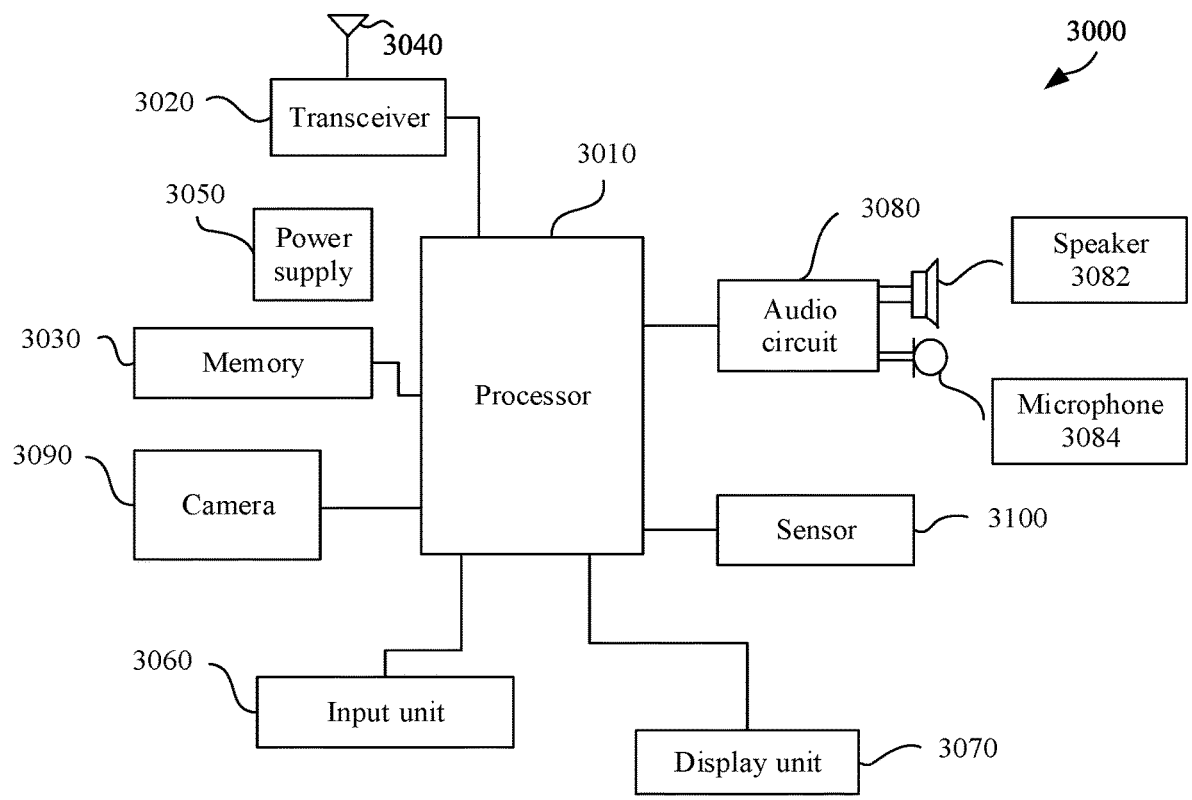
FIG. 24 is a schematic diagram of a structure of a terminal device according to an embodiment of this application.

It should be further understood that when the communication apparatus 1000 is the terminal device, the transceiver unit 1200 in the communication apparatus 1000 may be implemented by a transceiver, for example, may correspond to a transceiver 2020 in a communication apparatus 2000 shown in FIG. 23 or a transceiver 3020 in a terminal device 3000 shown in FIG. 24, and the processing unit 1100 in the communication apparatus 1000 may be implemented by at least one processor, for example, may correspond to a processor 2010 in the communication apparatus 2000 shown in FIG. 23 or a processor 3010 in the terminal device 3000 shown in FIG. 24.

It should be further understood that when the communication apparatus 1000 is the chip or the chip system disposed in the terminal device, the transceiver unit 1200 in the communication apparatus 1000 may be implemented by an input/output interface, a circuit, or the like, and the processing unit 1100 in the communication apparatus 1000 may be implemented by a processor, a microprocessor, an integrated circuit, or the like integrated into the chip or the chip system.

Optionally, the communication apparatus 1000 may correspond to the network device (for example, the network device #1 or the network device #2) in the foregoing method embodiments, for example, may be the network device, or may be a component (for example, a circuit, a chip, or a chip system) disposed in the network device.

It should be understood that the communication apparatus 1000 may correspond to the network device #1 or the network device #2 in the method 200 or the method 300 according to embodiments of this application. The communication apparatus 1000 may include a unit configured to perform the method performed by the network device #1 or the network device #2 in the method 200 in FIG. 3A and FIG. 3B or the method 300 in FIG. 17A and FIG. 17B. In addition, each unit in the communication apparatus 1000 and the foregoing other operations and/or functions are separately intended to implement corresponding procedures of the method 200 in FIG. 3A and FIG. 3B or the method 300 in FIG. 17A and FIG. 17B.

When the communication apparatus 1000 is configured to perform the method 200 in FIG. 3A and FIG. 3B, the processing unit 1100 may be configured to perform operation 207 in the method 200, and the transceiver unit 1200 may be configured to perform at least one of operation 202, operation 203, operation 205, operation 206, operation 208, operation 209, and operation 211 in the method 200. It should be understood that a specific process in which the units perform the foregoing corresponding operations is described in detail in the foregoing method embodiments, and for brevity, details are not described herein.

When the communication apparatus 1000 is configured to perform the method 300 in FIG. 17A and FIG. 17B, the processing unit 1100 may be configured to perform operation 307 in the method 300, and the transceiver unit 1200 may be configured to perform at least one of operation 302, operation 303, operation 305, operation 306, operation 308, operation 309, and operation 311 in the method 300. It should be understood that a specific process in which the units perform the foregoing corresponding operations is described in detail in the foregoing method embodiments, and for brevity, details are not described herein.

Figure 25:
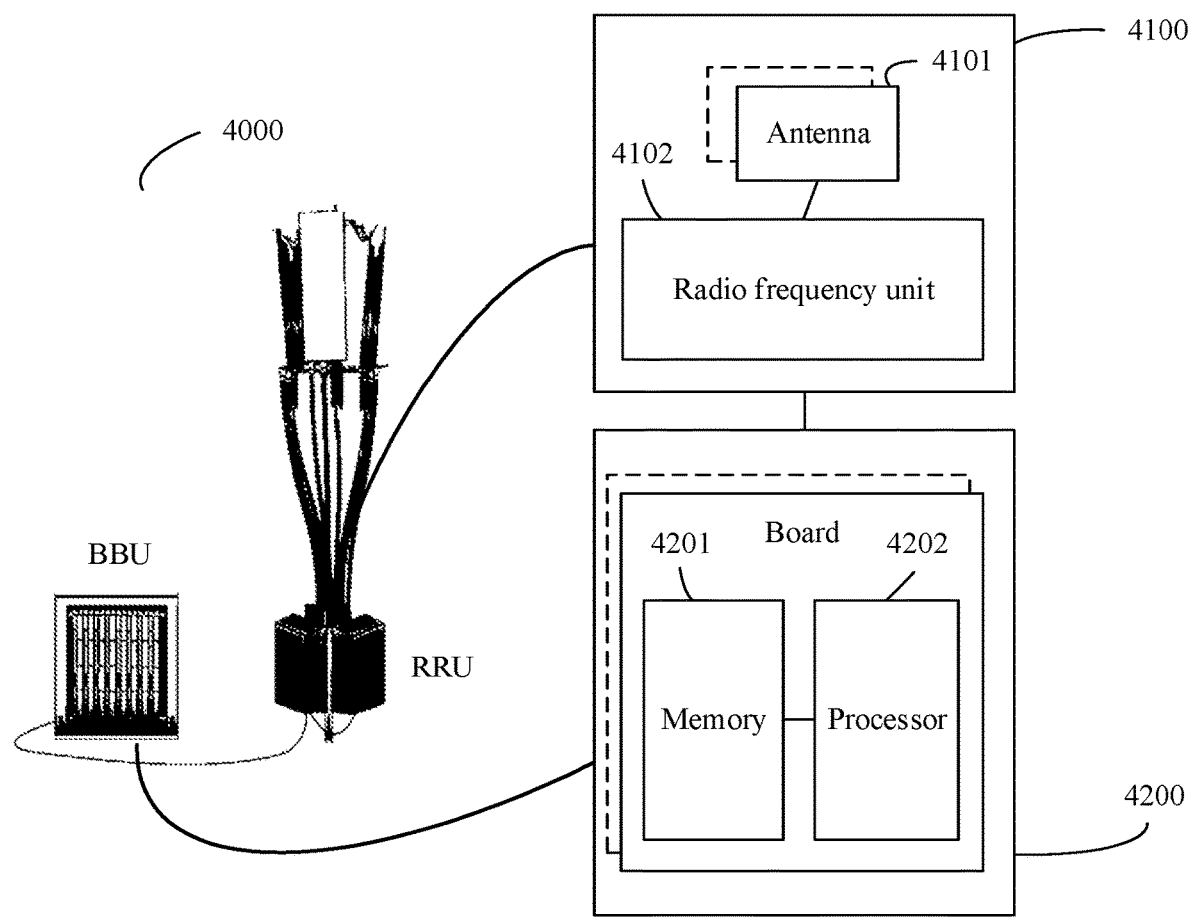
FIG. 25 is a schematic diagram of a structure of a network device according to an embodiment of this application.

It should be further understood that when the communication apparatus 1000 is the network device, the transceiver unit 1200 in the communication apparatus 1000 may be implemented by a transceiver, for example, may correspond to a transceiver 2020 in a communication apparatus 2000 shown in FIG. 23 or an RRU 4100 in a base station 4000 shown in FIG. 25, and the processing unit 1100 in the communication apparatus 1000 may be implemented by at least one processor, for example, may correspond to a processor 2010 in the communication apparatus 2000 shown in FIG. 23 or a processing unit 4200 or a processor 4202 in the base station 4000 shown in FIG. 25.

It should be further understood that when the communication apparatus 1000 is the chip or the chip system disposed in the network device, the transceiver unit 1200 in the communication apparatus 1000 may be implemented by an input/output interface, a circuit, or the like, and the processing unit 1100 in the communication apparatus 1000 may be implemented by a processor, a microprocessor, an integrated circuit, or the like integrated into the chip or the chip system.

FIG. 23 is another schematic block diagram of the communication apparatus 2000 according to an embodiment of this application. As shown in FIG. 23, the communication apparatus 2000 includes a processor 2010, a transceiver 2020, and a memory 2030. The processor 2010, the transceiver 2020, and the memory 2030 communicate with each other by using an internal connection path. The memory 2030 is configured to store instructions. The processor 2010 is configured to execute the instructions stored in the memory 2030, to control the transceiver 2020 to send a signal and/or receive a signal.

It should be understood that the communication apparatus 2000 may correspond to the terminal device in the foregoing method embodiments, and may be configured to perform operations and/or procedures performed by the network device or the terminal device in the foregoing method embodiments. Optionally, the memory 2030 may include a read-only memory and a random access memory, and provide instructions and data to the processor. A part of the memory may further include a non-volatile random access memory. The memory 2030 may be an independent component, or may be integrated into the processor 2010. The processor 2010 may be configured to execute the instructions stored in the memory 2030. In addition, when the processor 2010 executes the instructions stored in the memory, the processor 2010 is configured to perform operations and/or procedures corresponding to the network device or the terminal device in the foregoing method embodiments.

Optionally, the communication apparatus 2000 is the terminal device in the foregoing embodiments.

Optionally, the communication apparatus 2000 is the network device in the foregoing embodiments, for example, the network device #1 or the network device #2.

The transceiver 2020 may include a transmitter and a receiver. The transceiver 2020 may further include an antenna. There may be one or more antennas. The processor 2010, the memory 2030, and the transceiver 2020 may be components integrated into different chips. For example, the processor 2010 and the memory 2030 may be integrated into a baseband chip, and the transceiver 2020 may be integrated into a radio frequency chip. Alternatively, the processor 2010, the memory 2030, and the transceiver 2020 may be components integrated into a same chip. This is not limited in this application.

Optionally, the communication apparatus 2000 is a component disposed in the terminal device, for example, a circuit, a chip, or a chip system.

Optionally, the communication apparatus 2000 is a component disposed in the network device, for example, a circuit, a chip, or a chip system.

Alternatively, the transceiver 2020 may be a communication interface, for example, an input/output interface or a circuit. The transceiver 2020, the processor 2010, and the memory 2030 may be integrated into a same chip, for example, integrated into a baseband chip.

FIG. 24 is a schematic diagram of a structure of a terminal device 3000 according to an embodiment of this application. The terminal device 3000 may be used in the system shown in FIG. 1, and performs a function of the terminal device in the foregoing method embodiments. As shown in the figure, the terminal device 3000 includes a processor 3010 and a transceiver 3020. Optionally, the terminal device 3000 further includes a memory 3030. The processor 3010, the transceiver 3020, and the memory 3030 may communicate with each other by using an internal connection path, to transfer a control signal and/or a data signal. The memory 3030 is configured to store a computer program. The processor 3010 is configured to invoke the computer program from the memory 3030 and run the computer program, to control the transceiver 3020 to send and receive a signal. Optionally, the terminal device 3000 may further include an antenna 3040, configured to send, by using a radio signal, uplink data or uplink control signaling output by the transceiver 3020.

The processor 3010 and the memory 3030 may be integrated into one processing apparatus. The processor 3010 is configured to execute program code stored in the memory 3030, to implement the foregoing function. During specific implementation, the memory 3030 may alternatively be integrated into the processor 3010, or may be independent of the processor 3010. The processor 3010 may correspond to the processing unit 1100 in FIG. 22 or the processor 2010 in FIG. 23.

The transceiver 3020 may correspond to the transceiver unit 1200 in FIG. 22 or the transceiver 2020 in FIG. 23. The transceiver 3020 may include a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

It should be understood that, the terminal device 3000 shown in FIG. 24 can implement each process performed by the terminal device in the method embodiment shown in FIG. 2. Operations and/or functions of the modules in the terminal device 3000 are separately intended to implement corresponding procedures in the foregoing method embodiments. For details, refer to the descriptions in the foregoing method embodiments. To avoid repetition, detailed descriptions are appropriately omitted herein.

The processor 3010 may be configured to perform an action that is implemented inside the terminal device and that is described in the foregoing method embodiments. The transceiver 3020 may be configured to perform an action of sending to the network device or receiving from the network device by the terminal device that is described in the foregoing method embodiments. For details, refer to the descriptions in the foregoing method embodiments. Details are not described herein again.

Optionally, the terminal device 3000 may further include a power supply 3050, configured to supply power to various components or circuits in the terminal device.

In addition, to improve functions of the terminal device, the terminal device 3000 may further include one or more of an input unit 3060, a display unit 3070, an audio circuit 3080, a camera 3090, a sensor 3100, and the like. The audio circuit may further include a speaker 3082, a microphone 3084, and the like.

FIG. 25 is a schematic diagram of a structure of a network device according to an embodiment of this application, for example, may be a schematic diagram of a structure of a base station. The base station 4000 may be used in the system shown in FIG. 1, and performs a function of the network device in the foregoing method embodiments. As shown in the figure, the base station 4000 may include one or more radio frequency units such as remote radio units RRUs) 4100 and one or more baseband units (BBUs) (which may also be referred to as distributed units (DUs)) 4200. The RRU 4100 may be referred to as a transceiver unit, and may correspond to the transceiver unit 1200 in FIG. 22 or the transceiver 2020 in FIG. 23. Optionally, the RRU 4100 may also be referred to as a transceiver machine, a transceiver circuit, a transceiver, or the like, and may include at least one antenna 4101 and a radio frequency unit 4102. Optionally, the RRU 4100 may include a receiving unit and a sending unit. The receiving unit may correspond to a receiver (which is also referred to as a receiver machine or a receiver circuit), and the sending unit may correspond to a transmitter (which is also referred to as a transmitter machine or a transmitter circuit). The RRU 4100 is mainly configured to: receive and send a radio frequency signal, and perform conversion between the radio frequency signal and a baseband signal. For example, the RRU 4100 is configured to send indication information to a terminal device. The BBU 4200 is mainly configured to: perform baseband processing, control the base station, and so on. The RRU 4100 and the BBU 4200 may be physically disposed together, or may be physically disposed separately, namely, a distributed base station.

The BBU 4200 is a control center of the base station, may also be referred to as a processing unit, may correspond to the processing unit 1100 in FIG. 22 or the processor 2010 in FIG. 23, and is mainly configured to complete baseband processing functions such as channel coding, multiplexing, modulation, and spectrum spreading. For example, the BBU (the processing unit) may be configured to control the base station to perform an operation procedure related to the network device in the foregoing method embodiments, for example, generate the foregoing indication information.

In an example, the BBU 4200 may include one or more boards, and a plurality of boards may jointly support a radio access network (for example, an LTE network) of a single access standard, or may separately support radio access networks (for example, an LTE network, a 5G network, or another network) of different access standards. The BBU 4200 further includes a memory 4201 and a processor 4202. The memory 4201 is configured to store necessary instructions and data. The processor 4202 is configured to control the base station to perform a necessary action, for example, control the base station to perform the operation procedure related to the network device in the foregoing method embodiments. The memory 4201 and the processor 4202 may serve one or more boards. In other words, a memory and a processor may be disposed on each board. Alternatively, a plurality of boards may share a same memory and a same processor. In addition, a necessary circuit may be further disposed on each board.

It should be understood that the base station 4000 shown in FIG. 25 can implement processes related to the network device in the method embodiment shown in FIG. 3A and FIG. 3B or FIG. 17A and FIG. 17B. The operations and/or the functions of the modules in the base station 4000 are separately intended to implement corresponding procedures in the foregoing method embodiments. For details, refer to the descriptions in the foregoing method embodiments. To avoid repetition, detailed descriptions are appropriately omitted herein.

The BBU 4200 may be configured to perform an action that is implemented inside the network device and that is described in the foregoing method embodiments. The RRU 4100 may be configured to perform an action of sending to the terminal device or receiving from the terminal device by the network device that is described in the foregoing method embodiments. For details, refer to the descriptions in the foregoing method embodiments. Details are not described herein again.

It should be understood that the base station 4000 shown in FIG. 25 is merely a possible form of the network device, but should not constitute any limitation on this application. The method provided in this application is applicable to a network device in another form. For example, the network device includes an AAU, and may further include a CU and/or a DU; includes a BBU and an adaptive radio unit (ARU); or includes a BBU. Alternatively, the network device may be customer premises equipment (CPE), or may be in another form. A specific form of the network device is not limited in this application.

The CU and/or the DU may be configured to perform an action that is implemented inside the network device and that is described in the foregoing method embodiments, and the AAU may be configured to perform an action of sending to the terminal device or receiving from the terminal device by the network device that is described in the foregoing method embodiments. For details, refer to the descriptions in the foregoing method embodiments. Details are not described herein again.

This application further provides a processing apparatus, including at least one processor. The at least one processor is configured to execute a computer program stored in a memory, to enable the processing apparatus to perform the method performed by the terminal device or the network device in any one of the foregoing method embodiments.

An embodiment of this application further provides a processing apparatus, including a processor and a communication interface. The communication interface is coupled to the processor. The communication interface is configured to input and/or output information. The information includes at least one of an instruction and data. The processor is configured to execute a computer program, to enable the processing apparatus to perform the method performed by the terminal device or the network device in any one of the foregoing method embodiments.

An embodiment of this application further provides a processing apparatus, including a processor and a memory. The memory is configured to store a computer program, and the processor is configured to invoke the computer program from the memory and run the computer program, to enable the processing apparatus to perform the method performed by the terminal device or the network device in any one of the foregoing method embodiments.

It should be understood that the processing apparatus may be one or more chips. For example, the processing apparatus may be a field programmable gate array (FPGA), an application-specific integrated circuit (ASIC), a system on chip (SoC), a central processing unit (central processing unit, CPU), a network processor (NP), a digital signal processing circuit (DSP), a micro controller unit (MCU), a programmable logic device (PLD), or another integrated chip.

In an implementation process, the operations in the foregoing methods can be implemented by using a hardware integrated logical circuit in the processor, or by using instructions in a form of software. The operations of the methods disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

It should be noted that, the processor in embodiments of this application may be an integrated circuit chip, and has a signal processing capability. In an implementation process, the operations in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the operations, and logical block diagrams that are disclosed in embodiments of this application. The general-purpose processor may be a microprocessor, or the processor may be any conventional processor or the like. The operations of the methods disclosed with reference to embodiments of this application may be directly executed and accomplished by a hardware decoding processor, or may be executed and accomplished by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the memory in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and the methods described in this specification includes but is not limited to these memories and any memory of another appropriate type.

According to the method provided in embodiments of this application, this application further provides a computer program product. The computer program product includes computer program code. When the computer program code is run on a computer, the computer is enabled to perform the method performed by the terminal device or the method performed by the network device in the embodiment shown in FIG. 3A and FIG. 3B or FIG. 17A and FIG. 17B.

According to the method provided in embodiments of this application, this application further provides a computer-readable storage medium. The computer readable storage medium stores program code. When the program code is run on a computer, the computer is enabled to perform the method performed by the terminal device or the method performed by the network device in the embodiment shown in FIG. 3A and FIG. 3B or FIG. 17A and FIG. 17B.

According to the method provided in embodiments of this application, this application further provides a system, including one or more terminal devices and one or more network devices.

The network device and the terminal device in the foregoing apparatus embodiments correspond to the network device and the terminal device in the method embodiments. A corresponding module or unit performs a corresponding operation. For example, a communication unit (the transceiver) performs a receiving or sending operation in the method embodiments, and a operation other than the sending or receiving operation may be performed by the processing unit (the processor). For a function of a specific unit, refer to a corresponding method embodiment. There may be one or more processors.

In the foregoing embodiments, the terminal device may be used as an example of a receiving device, and the network device may be used as an example of a sending device. However, this should not constitute any limitation on this application. For example, both the sending device and the receiving device may be terminal devices. Specific types of the sending device and the receiving device are not limited in this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm operations can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for indicating a computer device (which may be a personal computer, a server, a network device, or the like) to perform all or a part of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink reference signal sending method, comprising:
   determining, according to a resource allocation rule, a plurality of downlink reference signal resources corresponding to a plurality of first resources used to carry an uplink reference signal in a plurality of uplink reference signal resources, wherein each of the plurality of uplink reference signal resources comprise two or more of the first resources, a domain size of each first resource is determined based on a first precoding granularity, and the first precoding granularity indicates a domain size of contiguous resources corresponding to a same precoding matrix in one uplink reference signal resource;
   determining, based on the downlink reference signal resource corresponding to each first resource, a precoding matrix corresponding to each first resource; and
   sending a precoded uplink reference signal, wherein the precoded uplink reference signal is obtained by precoding the uplink reference signal based on the precoding matrix corresponding to each first resource,
   wherein the downlink reference signal resource is a non-zero power channel state information reference signal (NZP CSI-RS) resource, and the uplink reference signal resource is a sounding reference signal (SRS) resource,
   wherein at least one SRS resource corresponding to each of a plurality of NZP CSI-RS resources is comprised in a SRS resource set,
   wherein the method further comprises:
      receiving second indication information, wherein the second indication information indicates one or more SRS resources in each of a plurality of SRS resource sets, and a precoding matrix corresponding to the one or more SRS resources is a precoding matrix for uplink data transmission;
      determining, based on the SRS resource indicated by the second indication information and the precoding matrices corresponding to the plurality of first resources, precoding matrices corresponding to a plurality of second resources in an uplink transmission resource, wherein the uplink transmission resource is for carrying uplink data, a time domain or frequency domain size of each second resource is determined based on a second precoding granularity, and the second precoding granularity indicates a time domain or frequency domain size of contiguous resources corresponding to a same precoding matrix in the uplink transmission resource; and
      sending precoded uplink data, wherein the precoded uplink data is obtained by precoding the uplink data based on the precoding matrix corresponding to each second resource in the uplink transmission resource.

2. The method according to claim 1, wherein the method further comprises:
   determining a plurality of precoding matrices for uplink reference signal transmission, wherein the plurality of precoding matrices is determined based on measurement of the plurality of downlink reference signal resources, and the plurality of downlink reference signal resources correspond to the plurality of uplink reference signal resources; and
   the determining a precoding matrix corresponding to each first resource further comprises determining, based on the plurality of precoding matrices, the precoding matrix corresponding to each first resource.

3. The method according to claim 2, wherein the determining, based on the plurality of precoding matrices, the precoding matrix corresponding to each first resource comprises:
   receiving indication information of the precoding selection rule;
   determining, based on a precoding selection rule and the plurality of precoding matrices, the precoding matrix corresponding to each first resource.

4. The method according to claim 2, wherein the method further comprises:
   receiving first indication information, wherein the first indication information indicates a correspondence between the plurality of uplink reference signal resources and the plurality of downlink reference signal resources.

5. The method according to claim 4, wherein each of the plurality of downlink reference signal resources corresponds to at least one of the plurality of uplink reference signal resources, each of the at least one uplink reference signal resource corresponds to one or more of the plurality of precoding matrices, and the precoding matrix corresponding to each uplink reference signal resource is obtained based on measurement of the corresponding downlink reference signal resource.

6. The method according to claim 1, wherein the method further comprises:
   receiving indication information of the resource allocation rule.

7. A communications apparatus, comprising:
   a transceiver;
   at least one processor; and
   one or more memories coupled to the at least one processor and storing programming instructions, when executed by the at least one processor, cause the communications apparatus to:
   determine, according to a resource allocation rule, a plurality of downlink reference signal resources corresponding to a plurality of first resources used to carry an uplink reference signal in a plurality of uplink reference signal resources, wherein each uplink reference signal resource comprises one or more of the first resources, a time domain or frequency domain size of each first resource is determined based on a first precoding granularity, and the first precoding granularity indicates a time domain or frequency domain size of contiguous resources corresponding to a same precoding matrix in one uplink reference signal resource;
   determine, based on a downlink reference signal resource corresponding to each first resource, a precoding matrix corresponding to each first resource; and
   send a precoded uplink reference signal, wherein the precoded uplink reference signal is obtained by precoding the uplink reference signal based on the precoding matrix corresponding to each first resource, wherein the downlink reference signal resource is a non-zero power channel state information reference signal (NZP CSI-RS) resource, and the uplink reference signal resource is a sounding reference signal (SRS) resource, wherein at least one SRS resource corresponding to each of a plurality of NZP CSI-RS resources is comprised in a SRS resource set, wherein the programming instructions, when executed by the at least one processor, further cause the communications apparatus to:

receive second indication information, wherein the second indication information indicates one or more SRS resources in each of a plurality of SRS resource sets, and a precoding matrix corresponding to the one or more SRS resources is a precoding matrix for uplink data transmission;

determine, based on the SRS resource indicated by the second indication information and the precoding matrices corresponding to the plurality of first resources, precoding matrices corresponding to a plurality of second resources in an uplink transmission resource, wherein the uplink transmission resource is for carrying uplink data, a time domain or frequency domain size of each second resource is determined based on a second precoding granularity, and the second precoding granularity indicates a time domain or frequency domain size of contiguous resources corresponding to a same precoding matrix in the uplink transmission resource; and send precoded uplink data, wherein the precoded uplink data is obtained by precoding the uplink data based on the precoding matrix corresponding to each second resource in the uplink transmission resource.

8. The communications apparatus according to claim 7, wherein the programming instructions, when executed by the at least one processor, further cause the communications apparatus to:

determine a plurality of precoding matrices used for uplink reference signal transmission, wherein the plurality of precoding matrices are determined based on measurement of a plurality of downlink reference signal resources, and the plurality of downlink reference signal resources correspond to the plurality of uplink reference signal resources; and determine, based on the plurality of precoding matrices, the precoding matrix corresponding to each first resource.

9. The communications apparatus according to claim 8, wherein the programming instructions, when executed by the at least one processor, further cause the communications apparatus to:

receive indication information of the precoding selection rule; and determine, based on a precoding selection rule and the plurality of precoding matrices, the precoding matrix corresponding to each first resource.

10. The communications apparatus according to claim 8, wherein the programming instructions, when executed by the at least one processor, further cause the communications apparatus to:

receive first indication information, wherein the first indication information is used to indicate a correspondence between the plurality of uplink reference signal resources and the plurality of downlink reference signal resources.

11. The communications apparatus according to claim 10, wherein each of the plurality of downlink reference signal resources corresponds to at least one of the plurality of uplink reference signal resources, each of the at least one uplink reference signal resource corresponds to one or more of the plurality of precoding matrices, and the precoding matrix corresponding to each uplink reference signal resource is obtained based on measurement of the corresponding downlink reference signal resource.

12. The communications apparatus according to claim 7, wherein the programming instructions, when executed by the at least one processor, further cause the communications apparatus to:

receive indication information of the resource allocation rule.

13. A non-transitory computer-readable medium comprising instructions that, when executed by at least one processor, cause the processor to:

determine, according to a resource allocation rule, a plurality of downlink reference signal resources corresponding to a plurality of first resources used to carry an uplink reference signal in a plurality of uplink reference signal resources, wherein each uplink reference signal resource comprises one or more of the first resources, a time domain or frequency domain size of each first resource is determined based on a first precoding granularity, and the first precoding granularity indicates a time domain or frequency domain size of contiguous resources corresponding to a same precoding matrix in one uplink reference signal resource;

determine, based on a downlink reference signal resource corresponding to each first resource, a precoding matrix corresponding to each first resource; and send a precoded uplink reference signal, wherein the precoded uplink reference signal is obtained by precoding the uplink reference signal based on the precoding matrix corresponding to each first resource, wherein the downlink reference signal resource is a non-zero power channel state information reference signal (NZP CSI-RS) resource, and the uplink reference signal resource is a sounding reference signal (SRS) resource, wherein at least one SRS resource corresponding to each of a plurality of NZP CSI-RS resources is comprised in a SRS resource set, wherein the programming instructions, when executed by the at least one processor, further cause the communications apparatus to:

receive second indication information, wherein the second indication information indicates one or more SRS resources in each of a plurality of SRS resource sets, and a precoding matrix corresponding to the one or more SRS resources is a precoding matrix for uplink data transmission;

determine, based on the SRS resource indicated by the second indication information and the precoding matrices corresponding to the plurality of first resources, precoding matrices corresponding to a plurality of second resources in an uplink transmission resource, wherein the uplink transmission resource is for carrying uplink data, a time domain or frequency domain size of each second resource is determined based on a second precoding granularity, and the second precoding granularity indicates a time domain or frequency domain size of contiguous resources corresponding to a same precoding matrix in the uplink transmission resource; and send precoded uplink data, wherein the precoded uplink data is obtained by precoding the uplink data based on the precoding matrix corresponding to each second resource in the uplink transmission resource.

14. The non-transitory computer-readable medium according to claim 13, wherein the programming instructions, when executed by the at least one processor, further cause the processor to:

determine a plurality of precoding matrices used for uplink reference signal transmission, wherein the plurality of precoding matrices are determined based on measurement of a plurality of downlink reference signal resources, and the plurality of downlink reference signal resources correspond to the plurality of uplink reference signal resources; and determine, based on the plurality of precoding matrices, the precoding matrix corresponding to each first resource.

15. The non-transitory computer-readable medium according to claim 14, wherein the programming instructions, when executed by the at least one processor, further cause the processor to:

receive indication information of the precoding selection rule; and determine, based on a precoding selection rule and the plurality of precoding matrices, the precoding matrix corresponding to each first resource.

16. The non-transitory computer-readable medium according to claim 14, wherein the programming instructions, when executed by the at least one processor, further cause the processor to:

receive first indication information, wherein the first indication information is used to indicate a correspondence between the plurality of uplink reference signal resources and the plurality of downlink reference signal resources.

17. The non-transitory computer-readable medium according to claim 16, wherein each of the plurality of downlink reference signal resources corresponds to at least one of the plurality of uplink reference signal resources, each of the at least one uplink reference signal resource corresponds to one or more of the plurality of precoding matrices, and the precoding matrix corresponding to each uplink reference signal resource is obtained based on measurement of the corresponding downlink reference signal resource.

18. The non-transitory computer-readable medium according to claim 13, wherein the programming instructions, when executed by the at least one processor, further cause the processor to:

receive indication information of the resource allocation rule.

* * * * *